(12) United States Patent
Zimmermann et al.

(10) Patent No.: US 11,348,300 B2
(45) Date of Patent: May 31, 2022

(54) AVATAR CUSTOMIZATION FOR OPTIMAL GAZE DISCRIMINATION

(71) Applicant: Magic Leap, Inc., Plantation, FL (US)

(72) Inventors: Joelle Zimmermann, Los Angeles, CA (US); Thomas Marshall Miller, IV, Los Angeles, CA (US); John Monos, Venice, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/218,917

(22) Filed: Mar. 31, 2021

(65) Prior Publication Data

US 2021/0312684 A1    Oct. 7, 2021

Related U.S. Application Data

(60) Provisional application No. 63/004,953, filed on Apr. 3, 2020.

(51) Int. Cl.
| | | |
|---|---|---|
| *G06T 13/40* | (2011.01) | |
| *G06T 15/80* | (2011.01) | |
| *G06T 19/00* | (2011.01) | |
| *G02B 27/01* | (2006.01) | |
| *G02B 27/00* | (2006.01) | |

(52) U.S. Cl.
CPC .......... *G06T 13/40* (2013.01); *G02B 27/0093* (2013.01); *G02B 27/0172* (2013.01); *G06T 15/80* (2013.01); *G06T 19/006* (2013.01)

(58) Field of Classification Search
CPC ................ G06T 13/40; G02B 27/0172; G02B 27/0093
See application file for complete search history.

(56) References Cited

U.S. PATENT DOCUMENTS

| | | |
|---|---|---|
| 6,850,221 B1 | 2/2005 | Tickle |
| 2006/0028436 A1 | 2/2006 | Armstrong |
| 2007/0081123 A1 | 4/2007 | Lewis |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2013/0321265 A1 | 12/2013 | Bychkov et al. |
| 2014/0071539 A1 | 3/2014 | Gao |

(Continued)

FOREIGN PATENT DOCUMENTS

WO    WO 2021/202783    10/2021

OTHER PUBLICATIONS

Stengel, M., & Magnor, M. (2016). Gaze-contingent computational displays: Boosting perceptual fidelity. IEEE Signal Processing Magazine, 33(5), 139-148.*
International Search Report and Written Opinion, for PCT Application No. PCT/US2021/025235, dated Aug. 17, 2021.

(Continued)

*Primary Examiner* — Sarah Lhymn
(74) *Attorney, Agent, or Firm* — Fish & Richardson P.C.

(57) ABSTRACT

Examples of systems and methods for rendering an avatar in a mixed reality environment are disclosed. The systems and methods may be configured to automatically select avatar characteristics that optimize gaze perception by the user, based on context parameters associated with the virtual environment.

20 Claims, 32 Drawing Sheets

(56) References Cited

U.S. PATENT DOCUMENTS

| | | | |
|---|---|---|---|
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0309263 | A2 | 10/2015 | Abovitz et al. |
| 2015/0326570 | A1 | 11/2015 | Publicover et al. |
| 2015/0346495 | A1 | 12/2015 | Welch et al. |
| 2015/0356781 | A1 | 12/2015 | Miller |
| 2016/0011419 | A1 | 1/2016 | Gao |
| 2016/0026253 | A1 | 1/2016 | Bradski et al. |
| 2016/0270656 | A1 | 9/2016 | Samec et al. |
| 2017/0206795 | A1 | 7/2017 | Kaleal, III |
| 2018/0189568 | A1* | 7/2018 | Powderly ............ G06F 3/0304 |
| 2019/0188895 | A1 | 6/2019 | Miller, IV |
| 2021/0312684 | A1* | 10/2021 | Zimmermann ........ G02B 27/01 |
| 2021/0349612 | A1* | 11/2021 | Triverio ............ G06F 3/04883 |

OTHER PUBLICATIONS

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, Aug. 4, 1997, pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Binetti, et al., "Assumptions about the positioning of virtual stimuli affect gaze direction estimates during Augmented Reality based interactions," Scientific Reports 9.1, Feb. 2019.

Chen, et al., "Gaze Gestures and Their Applications in Human-Computer Interation With a Head-Mounted Display," arXiv:1910.07428v1 [cs.HC] Oct. 16, 2019.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

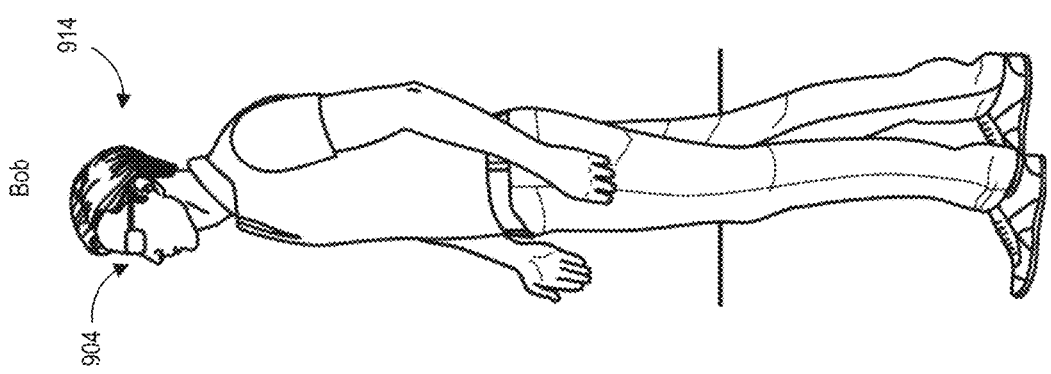
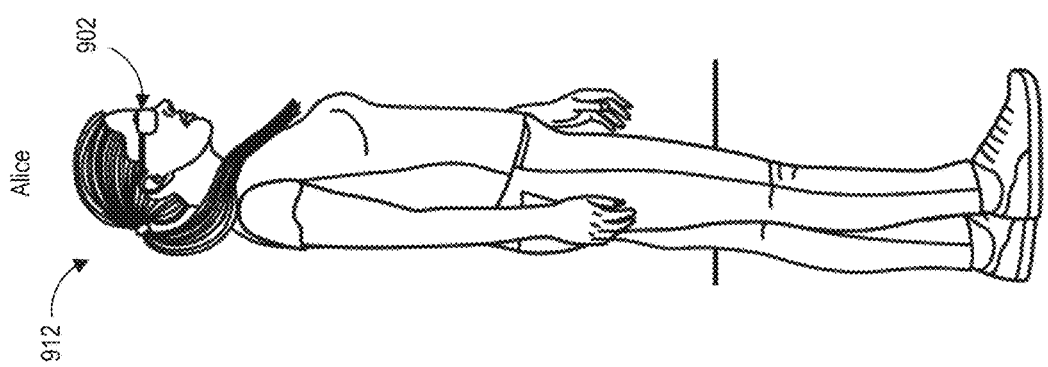
FIG. 9B

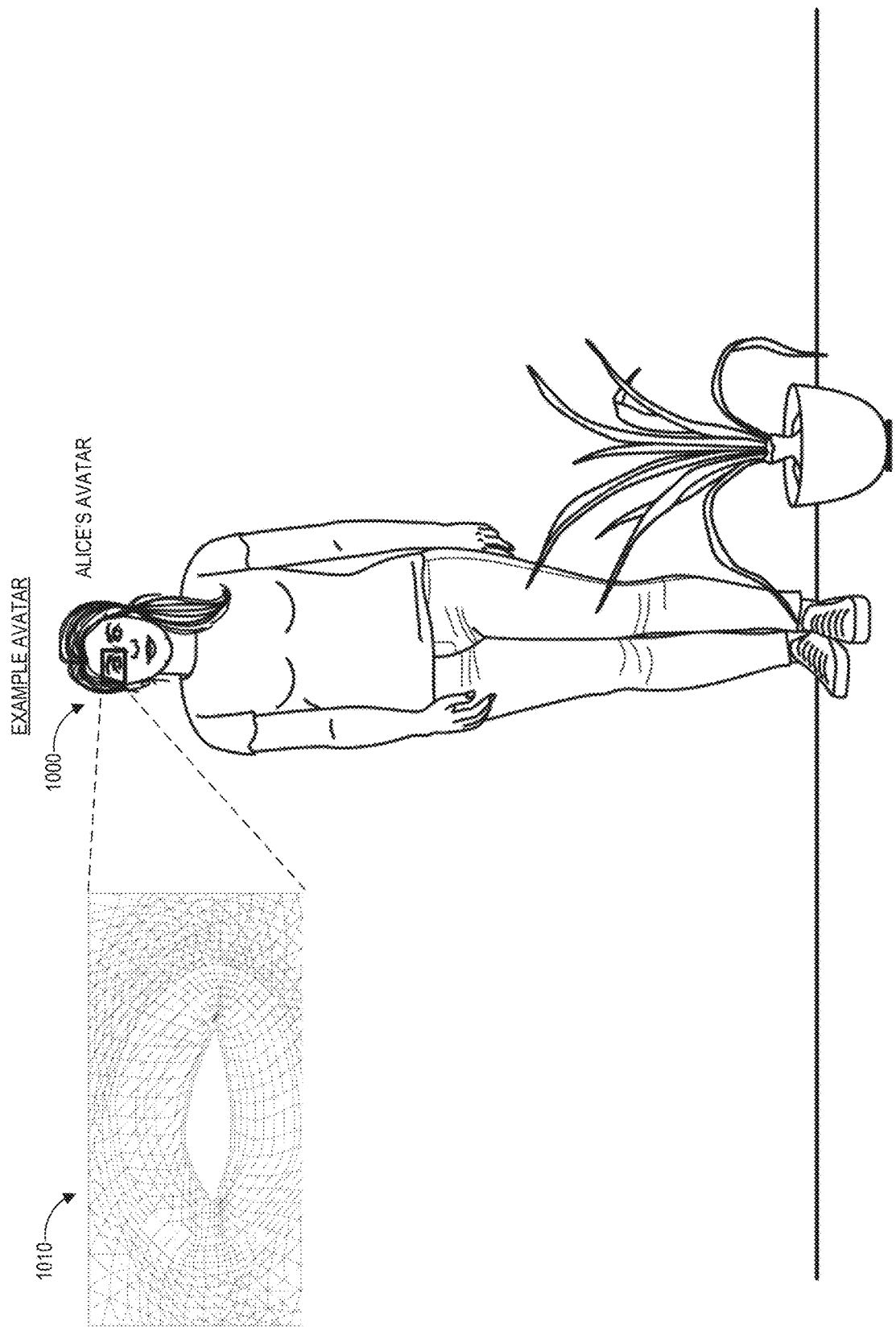

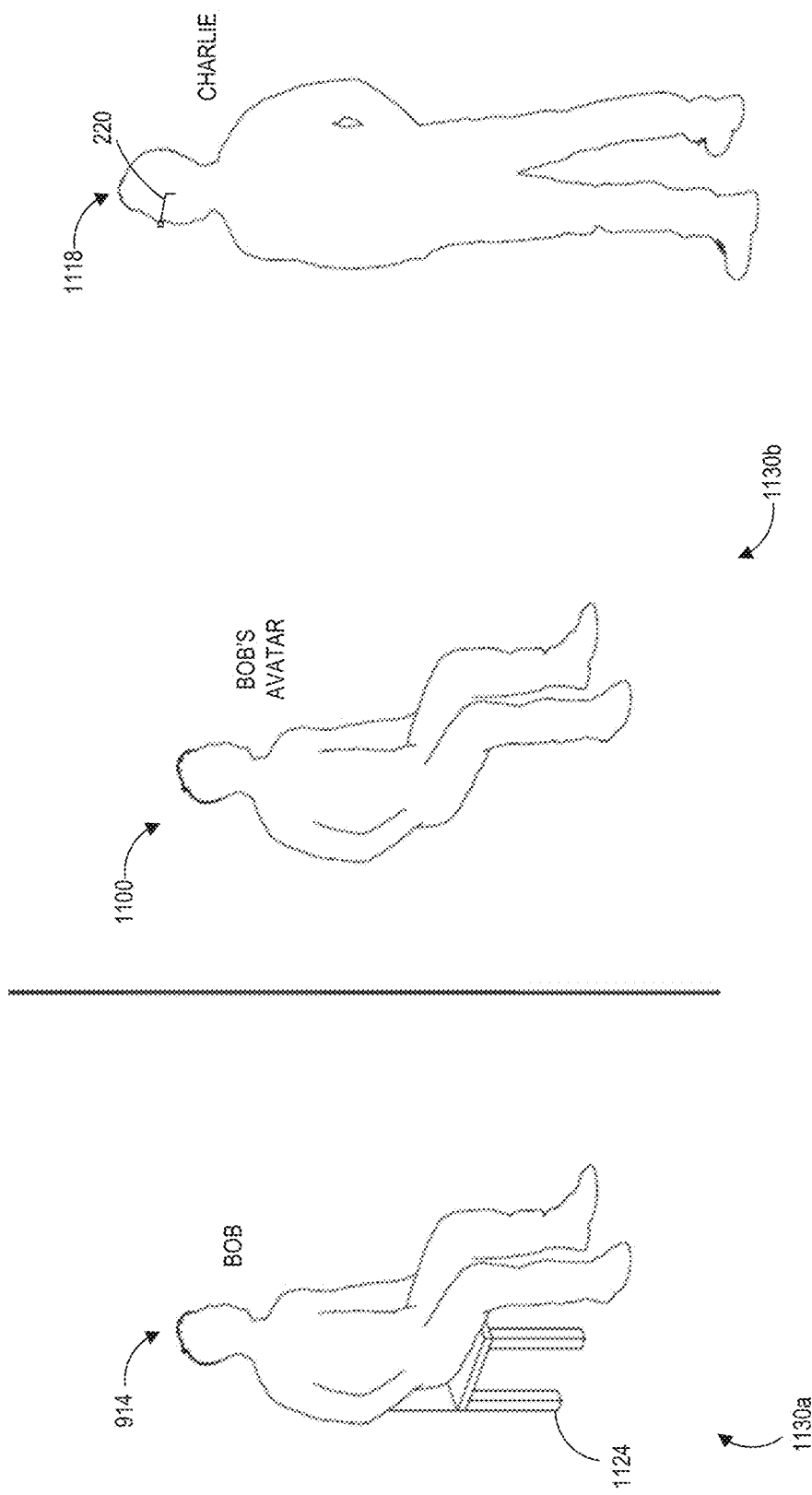

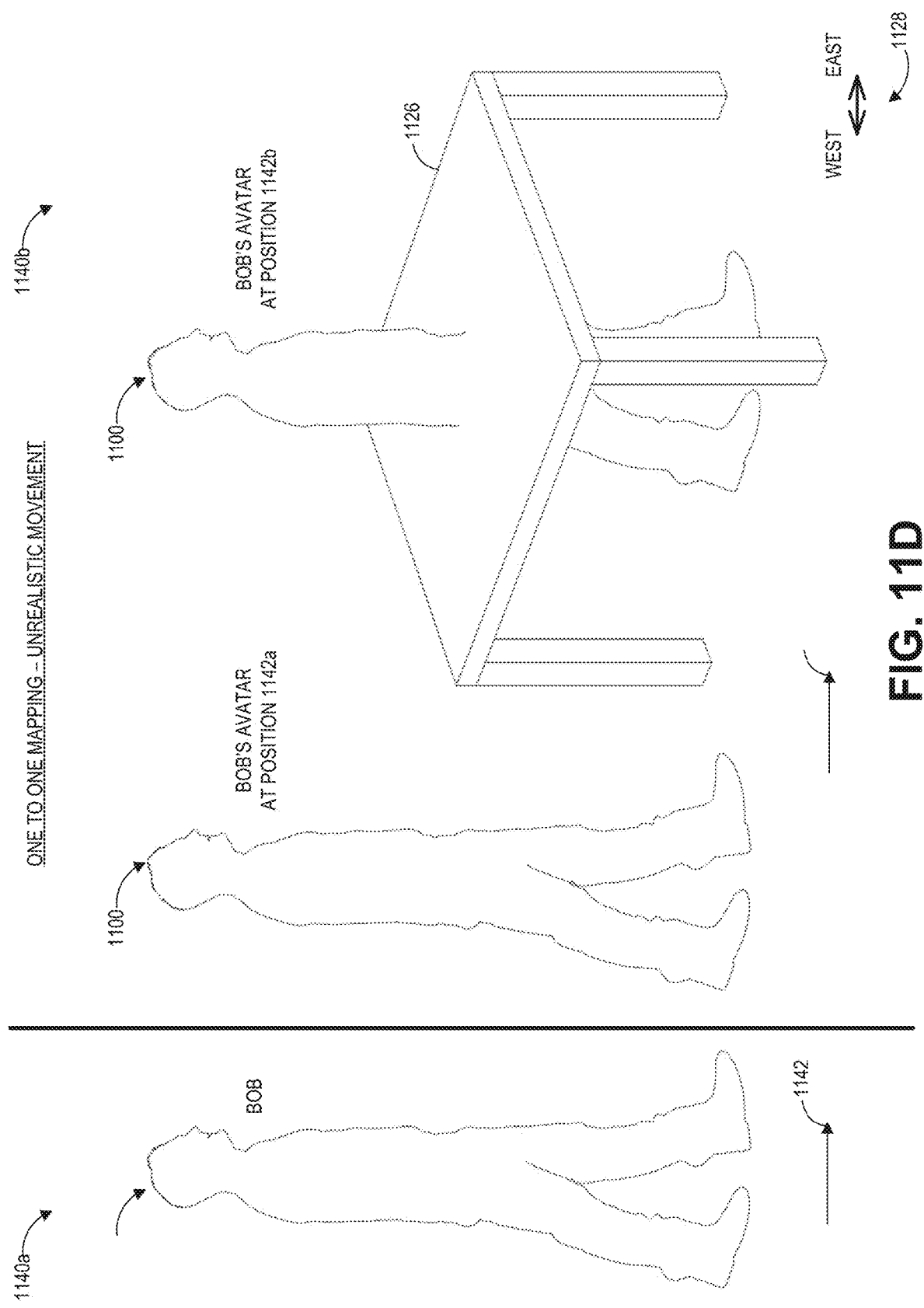

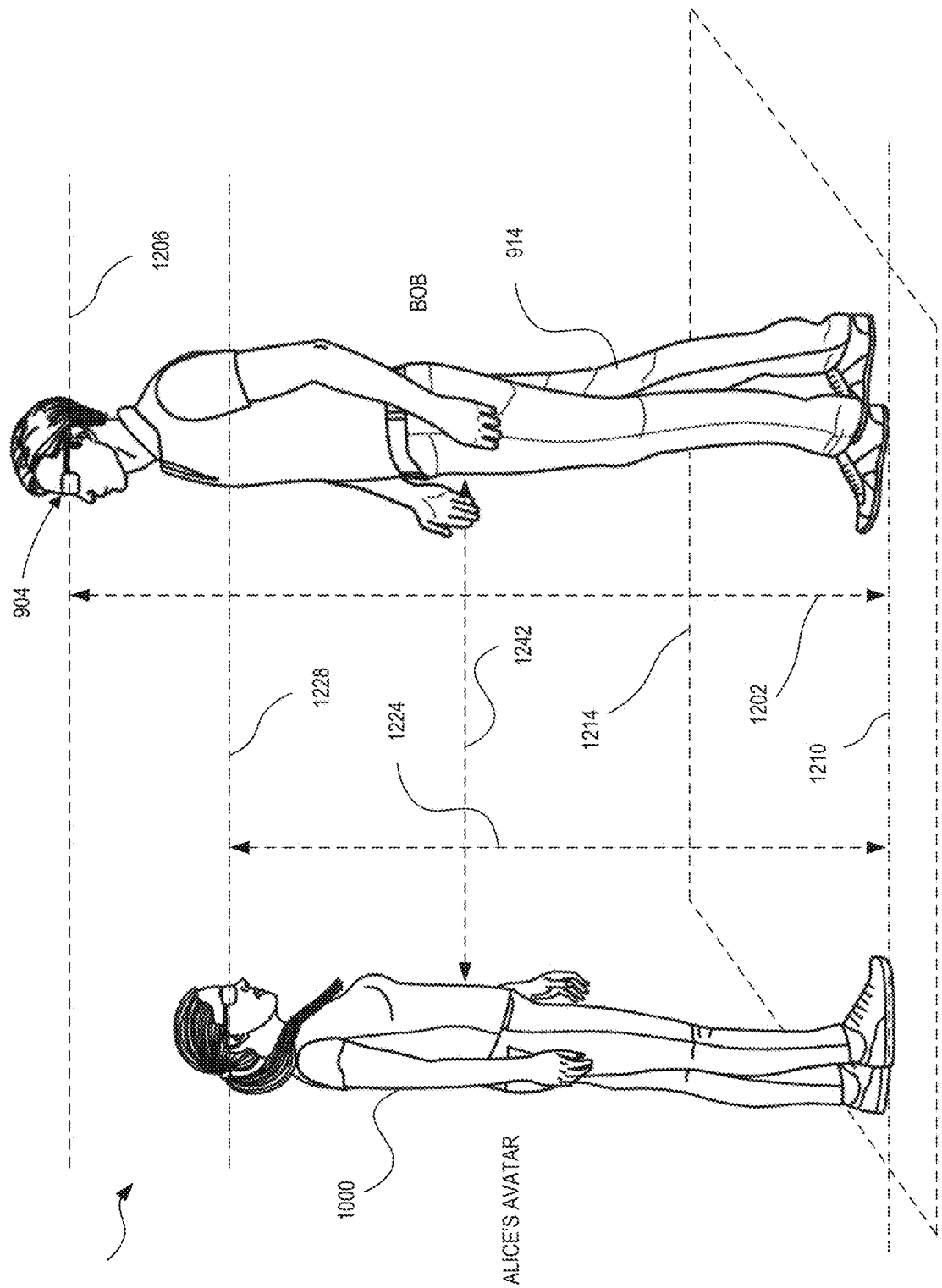

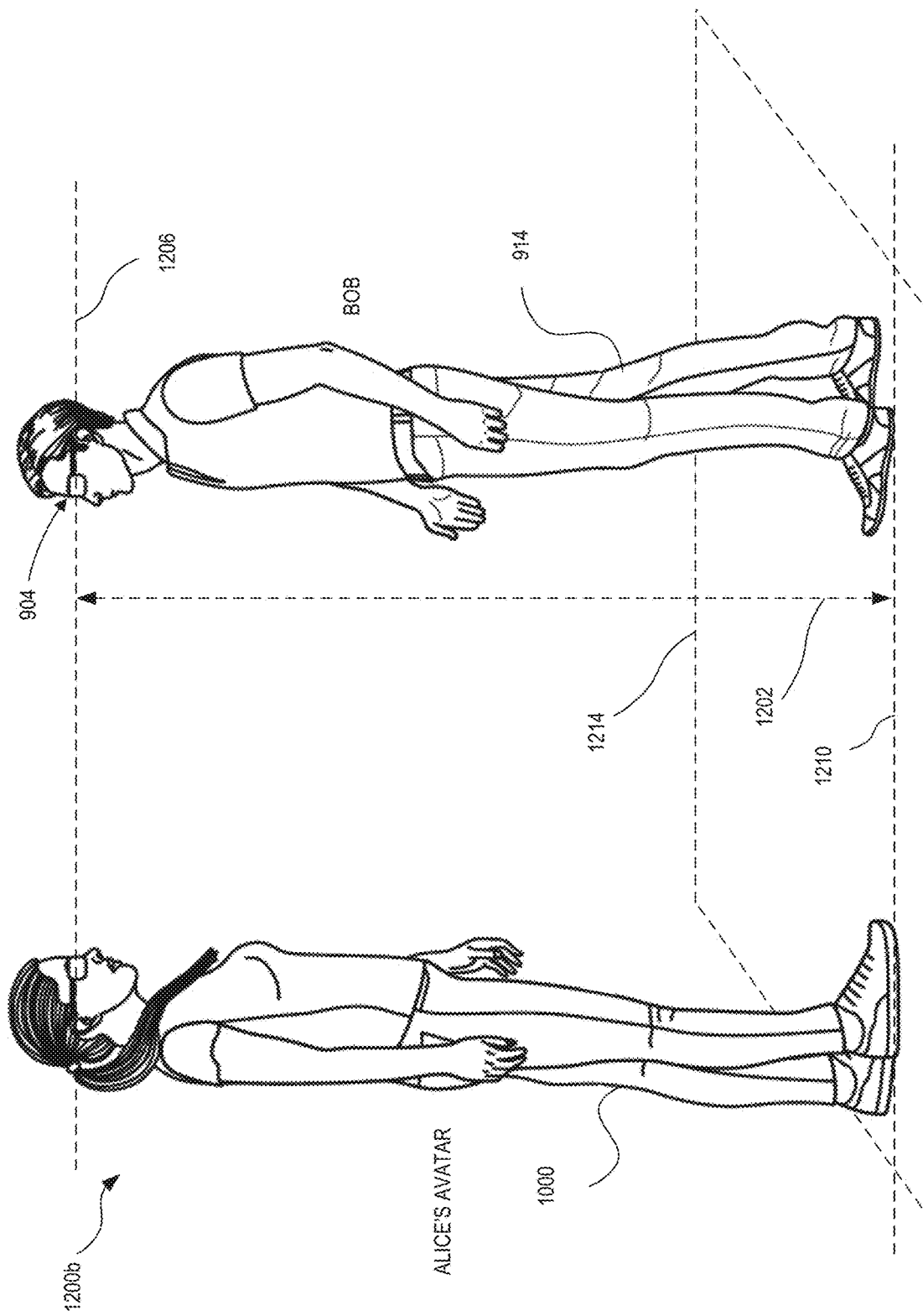

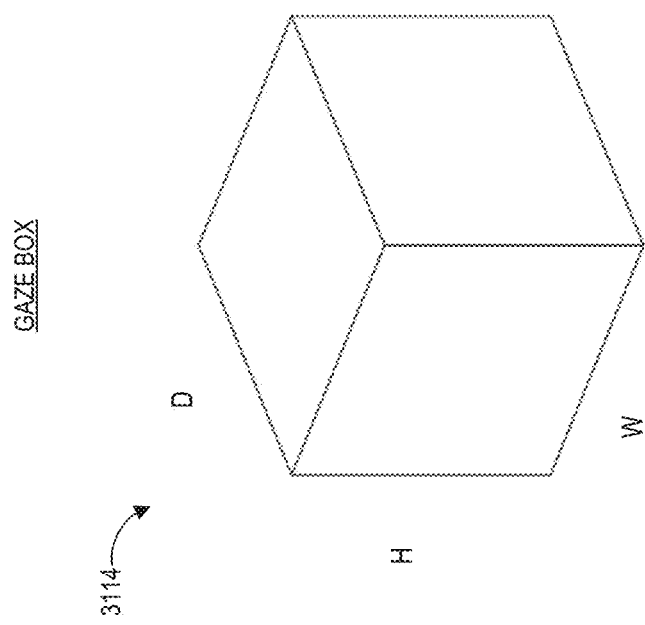
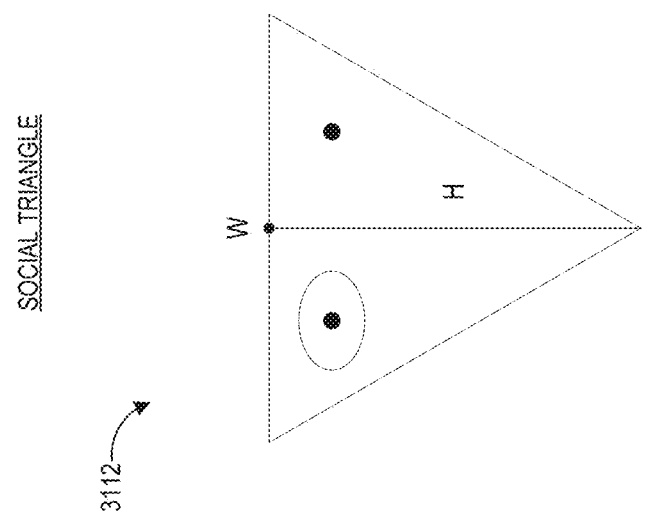
FIG. 16B

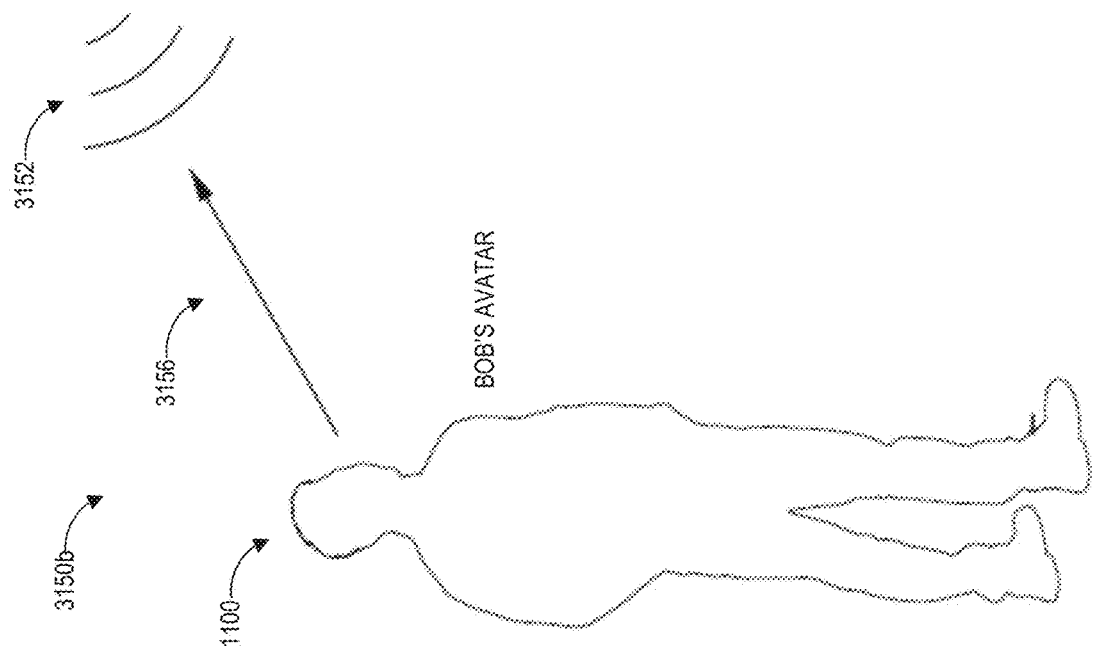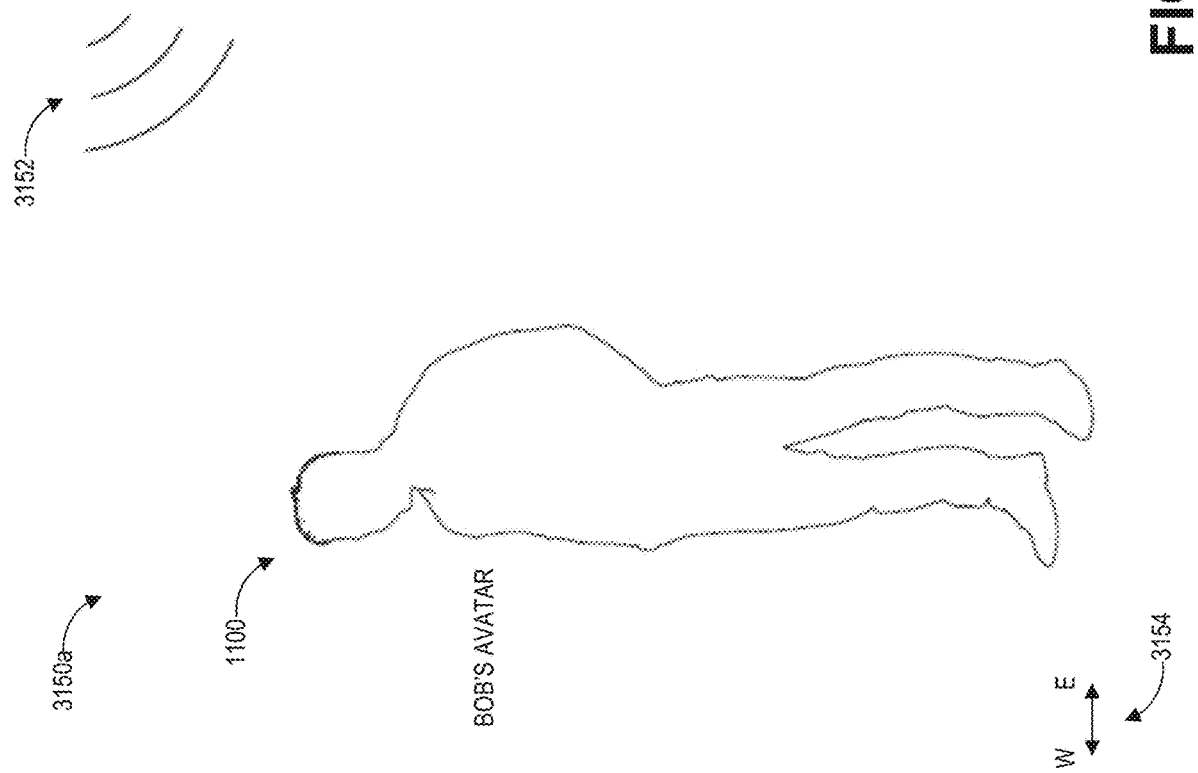
FIG. 16C

AVATAR CUSTOMIZATION FOR OPTIMAL GAZE DISCRIMINATION

CROSS-REFERENCE TO RELATED APPLICATION

This application claims priority to U.S. Provisional Application No. 63/004,953, filed on Apr. 3, 2020. The entire contents of the foregoing application is incorporated herein by reference.

FIELD

The present disclosure relates to virtual reality and augmented reality imaging and visualization systems and more particularly to selection of avatar characteristic for optimal gaze discrimination.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects coexist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR, and MR technology. For clarity purposes, VR, AR, and MR may be used interchangeably herein. Thus, any reference to VR, AR, or MR should be interpreted as applicable to any of VR, AR, and/or MR.

SUMMARY

Various examples of a mixed reality system for selecting and/or dynamically adjusting and rendering virtual avatars based on contextual information are disclosed.

In the area of social virtual human technology, there is a need for evaluation protocols for different aspects of communication. While the importance of gaze in nonverbal communication is generally accepted, methods for examining gaze realism of virtual humans are lacking. More broadly, the level of photorealism of virtual humans (e.g., avatars) that optimizes effective communication is an open question. Disclosed herein, in some embodiments, are systems and methods for evaluating eye gaze of avatars in observer-looker scenarios to evaluate gaze across several levels of photorealism in order to guide virtual human development for social AR.

Gaze plays an important role in social interaction—it reflects emotional responding and attention allocation, serves to regulate the flow of conversation, and regulates interpersonal intimacy. The ability to accurately discriminate gaze direction, in particular, mutual gaze, is important in these social interactions.

Accuracy in gaze judgements is typically greatest during direct gaze, suggesting that humans are especially sensitive to mutual gaze. Thus, accurate perception of virtual human gaze may impact a user's subjective experience and behavior, including: copresence and liking, task performance, avoiding collision while walking or interpersonal distance during an interaction. Thus, disclosed herein are systems and methods for gaze evaluation paradigms to evaluate avatar gaze, where the analysis of testing data using these evaluation paradigms may then be used to provide appropriate levels of photorealism of social AR avatars.

Disclosed herein are example avatar gaze detection testing environments that provide results usable in selection of optimal avatars (and/or specific avatar characteristics of a selected avatar) for particular contexts of VR sessions. For example, optimal avatar characteristics (e.g., a level of photorealism of the avatar) may be largely based on the particular hardware on which that avatar is to be rendered. For example, the processing speed, bandwidth, graphics capabilities, eye tracking capabilities, and the like, of a particular VR headset may be considered in determining avatar characteristics for one or more avatars to be rendered on the VR headset. Accordingly, a VR headset with higher graphics capabilities, for example, may use a high photorealism avatar (e.g., allowing higher gaze discrimination accuracy by the user) as a default, while a VR headset with lower graphics capabilities may use a lower photorealism avatar as a default.

Examples of systems and methods for rendering an avatar in a mixed reality environment are disclosed. The systems and methods may be configured to automatically scale an avatar or to render an avatar based on a determined intention of a user, an interesting impulse, environmental stimuli, or user saccade points. The disclosed systems and methods may apply discomfort curves when rendering an avatar. The disclosed systems and methods may provide a more realistic interaction between a human user and an avatar.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 9B illustrates an example telepresence session.

FIG. 10 illustrates an example of an avatar as perceived by a user of a wearable system.

FIGS. 11A-11D illustrate example scenes of an avatar in various environments, where the avatar has an unnatural appearance or interaction.

FIGS. 12A and 12B illustrate two scenes of scaling an avatar, where the avatar is spawned on the same surface as the viewer.

FIGS. 16A-16C illustrate examples of categories of interesting impulses that may occur or be present in a viewer's environment.

Figure 1:
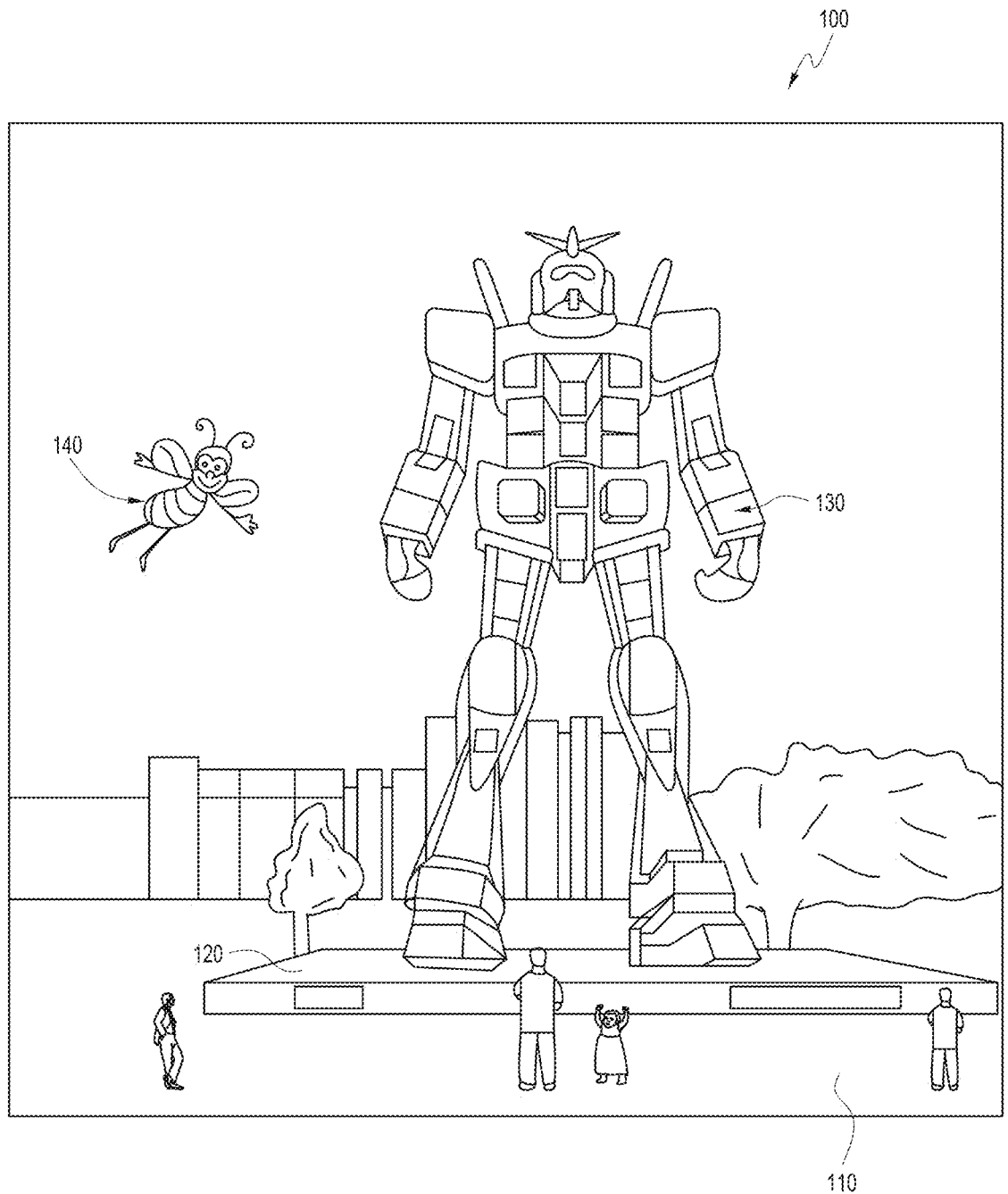
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Context (also referred to herein as "Context Parameters" or "Contextual Information"): any characteristic of or related to a virtual reality environment. Examples of context parameters may include user device characteristics, such as a type of device (e.g., a virtual reality headset, augmented reality headset, mobile computing device, smart phone, etc.), characteristics of the user device (e.g., graphics card specifications, screen size, etc.), environment of the avatar (e.g., lighting conditions in an area where the avatar is currently positioned or will be positioned), accuracy of an eye tracking system associated with an avatar in the virtual environment, and/or other characteristics of or related to the virtual environment. Other examples of context may include user preferences, position of the user, presence of objects in the rendering environment, and the like.

Avatar Characteristics: any aspects of an avatar (e.g., representative of a human or a virtual human) that may be used in rendering the avatar on one or more user devices. For example, avatar characteristics may be determined prior to initially rendering the avatar, as the avatar is initially rendered, or at any time that the avatar is included in a virtual environment. Avatar characteristics may identify a particular avatar, such as a low, medium, or highly photorealistic avatar. Avatar characteristics may include specific properties that affect the level of photorealism of the avatar, such as shading of portions of the avatar (e.g., face or eye), ratio of visible iris to sclera, contrast of iris or sclera, eye movements (e.g., saccade type), size, appearance, position, orientation, movement, pose, expression, and the like.

Overview

A virtual avatar may be a virtual representation of a real or fictional person (or creature or personified object) in an AR/VR/MR environment. For example, during a telepresence session in which two AR/VR/MR users are interacting with each other, a viewer can perceive an avatar of another user in the viewer's environment and thereby create a tangible sense of the other user's presence in the viewer's environment. The avatar can also provide a way for users to interact with each other and do things together in a shared virtual environment. For example, a student attending an online class can perceive other students' or teachers' avatars in a virtual classroom and can interact with the avatars of the other students or the teacher.

When placing an avatar in a user's physical environment for an AR/VR/MR environment, a size of the avatar needs to be determined. When spawning (the initial rendering of the avatar) in a three-dimensional (3D) space, the avatar could, in practice, be any size (e.g., tiny, human-sized, or gigantic). The avatar could maintain a 1:1 size to its human counterpart, but this may not make sense in certain environments (due to, for example, lack of space, privacy concerns, etc.). An improperly sized avatar can create awkward social interactions or create user fatigue when interacting with an avatar. For example, if an avatar is too big or too small relative to a viewer, the viewer may need to position his head or body at an uncomfortable position in order to engage in an eye-to-eye conversation with the avatar. Further, an improperly sized avatar can convey the wrong social message such as an implied superiority (e.g., when the avatar is bigger than the user) or inferiority (e.g., when the avatar is smaller than the user) between the avatar's human counterpart and the viewer. Additional examples related to problems caused by an improperly sized avatar are further described with reference to FIG. 11A and examples of solutions to this problem are described with reference to FIGS. 12A-18B.

Advantageously, in some embodiments, the wearable system described herein can automatically determine an appropriate size for an avatar at spawning and can re-scale the avatar throughout some or all parts of the interaction with other users (or avatars) based on contextual information regarding the interaction. Some example contextual information can include the position of the user, the rendering location of the avatar in the environment of the other user, a relative height difference between the user and the avatar, presence of objects in the rendering environment (e.g., whether there are chairs for an avatar to sit on or whether movement of the avatar would cause the avatar to pass through solid objects such as tables), etc. The wearable system can automatically scale the avatar in a manner that increases or maximizes direct eye contact based on the contextual information, and therefore facilitates avatar-human communication. Details for scaling the avatar based on contextual information are further described in FIGS. 12A-12B.

An avatar can be animated based on its human counterpart, where a human's interaction is mapped to his avatar. A one-to-one mapping between a user and an avatar can be employed in an AR/VR/MR environment, such that the avatar's action is a direct mapping of a user's action. For example, if a user looks left, its avatar also looks left. If the user stands up, its avatar stands up. If a user walks in a certain direction, its avatar walks in that direction. This one-to-one mapping may work in a VR environment because the participants of the VR environment (including the user's virtual avatar) are seeing the same shared virtual content. However, in an AR/MR environment, each user's physical environment and the way the other user's avatar appears within it might be different, because the two (or more) users may be in very different environments. For example, Bob might be in a living room in a house, and Alice might be in a room in an office building. Bob might see Alice's avatar across from Bob in Bob's environment (the living room), whereas Alice sees Bob's avatar located to the left of Alice in Alice's environment (the office room). As another example, since avatars are virtual objects and can be resizable, Bob can shrink the size of Alice's avatar and place it on a table in his living room, whereas Alice might be in a large office room and may choose to have Bob's avatar stand in the corner and be life-sized.

Such sizing may result in Bob looking down at Alice's avatar when Bob is talking to her avatar. If a one-to-one mapping is applied to Bob's avatar based on Bob's action, Bob's avatar rendered in Alice's office may look unusual to Alice, because Bob's avatar would be looking at the floor while talking to Alice (since the real Bob is looking down at Alice's avatar). On the other hand, it may be desirable that certain aspects of the user be preserved and mapped to the avatar in another user's environment. For example, a user nodding his or her head in agreement or shaking his or her head in disagreement can be conveyed to the other user by mapping such motions to the avatar. Additional examples describing problems in one-to-one mapping are further provided with reference to FIGS. 11B-11D.

Advantageously, in some embodiments, the wearable system can analyze an interaction of a user and break the interaction into a world component and a local component. A world component can include the portion of the interaction that interacts with an environment. For example, a world motion may include walking from point A to point B, climbing up a ladder, sitting or standing, facing a certain direction, and interacting with an object (virtual or physical) in the environment. As further described herein, the world component can be described with respect to a world reference frame which is associated with an environment. A local component can include an action relative to a user (which can be described relative to a body-fixed reference frame). For example, if Alice is nodding her head or shaking her head, that motion has meaning based on the angle of her head with respect to her torso (or body). As another example, Alice can turn around 180 degrees and nod her head. These two motions can be considered as local because they are localized with respect to her torso and may not require interactions with the environment. As yet another example, waving a hand can be a local motion, because it can be defined with respect to the user's body. Some movements may have a local portion and a world portion. For example, a user may gesture by pointing a finger, which has local attributes relative to the user's body as well as world aspects if the user is pointing at an object in the user's environment. For example, if Alice is pointing to the avatar of Bob in Alice's environment, the intent determined from Alice's hand gesture is that Alice points to Bob. In Bob's environment, Alice might appear in a different relative location or orientation to Bob and if her hand gesture were rendered in one-to-one correspondence, Alice's avatar might not point at Bob and thus might not reflect Alice's intent. The wearable device of Bob can map Alice's intent to Bob's environment so that Alice's avatar is rendered as pointing at Bob.

The wearable system can extract intent of a user's interaction based on contextual information associated with the user's environment, the user's movements, the user's intentions, and so forth. The wearable system can accordingly map the world motion of the user's interaction to an avatar's action based on the avatar's environment and map the local action of the user's interaction directly to the avatar. The mapping of the world motion can include adjusting one or more characteristics of the avatar such as, e.g., the movement, position, orientation, size, facial expression, pose, eye gaze, etc., to be compatible with the physical environment in which the avatar is rendered (rather than simply mapping the characteristics in a direct one-to-one fashion).

For example, when Alice walks to a chair and sits down on the chair, the wearable system can automatically find a chair in Bob's environment (or another sit-able surface if there is no chair) by accessing information from the world map of Bob's environment and rendering Alice as sitting on the chair. As another example, the wearable system may determine that Alice intends to interact with an object of interest (e.g., a tree or a virtual book) in her environment. The wearable system can automatically reorient Alice's avatar to interact with the object of interest in Bob's environment, where the location of the object of interest may not be the same as that in Alice's environment. For example, if a direct one-to-one mapping of the virtual book would cause it to be rendered inside or underneath a table in Bob's environment, Bob's wearable system may instead render the virtual book as lying on top of the table, which will provide Bob with a more natural interaction with Alice and the virtual book.

While the wearable system may remap the world motions, the wearable system can preserve local motions, such as nodding, hand tilting or shakes (which can indicate confusion, agreement, or refusal) of a user's interaction. For example, Alice can shake her head and walk toward a chair. This interaction includes a world motion, such as walking toward a chair, and a local motion, such as shaking her head. The wearable system can adjust Alice's avatar's direction of walking based on the location of a chair in Bob's environment, but in the meantime, render Alice's avatar as shaking her head.

In certain implementations, the wearable system can also map a local component to the avatar based on intent. For example, if Alice gives a thumbs up sign, the wearable system can interpret this as an emblem gesture (e.g., a gesture that is consciously used and consciously understood and which is used as a substitute for words and is closer to sign language than everyday body language) and map a more expressive thumbs up animation to Alice's avatar in Bob's environment to convey the same intention. This can apply to other common symbolic or emblem gestures, such as, e.g., waving your hand with an open palm gesture, or giving an okay sign with the okay gesture.

In addition to or as an alternative to animating a virtual avatar based on interactions of its human counterpart, advantageously, in some embodiments, the wearable system can also animate an avatar based on the environment that the avatar is rendered in. The wearable system can render the virtual avatar such that the virtual avatar can appear to be able to make its decision based on interactions with the environment (e.g., the wearable system may display the avatar as sitting if there is a chair present in the environment but display the avatar as standing if no chair is present).

The wearable system can discover interesting impulses in the viewer's environment, such as an object of interest, an area of interest, a sound, or a component of an object of interest, and cause the avatar to automatically respond to the interesting impulse (such as, e.g., turning around to look at the interesting impulses). As one example, the wearable system of the viewer may detect a sudden loud noise, and the wearable system of the viewer can automatically reorient the avatar to look in the direction of where the loud noise came from.

The wearable system can animate the avatar based on the impulse regardless of whether the viewer is in a telepresence session with the avatar's human counterpart. In situations where the viewer is in a telepresence session, the avatar can respond to the interesting impulse in the viewer's environment even though such interesting impulse does not appear in the human counterpart's environment. For example, Alice and Bob may be in telepresence session. Alice's avatar may initially face Bob as Bob is talking. When Bob's wearable system detects a loud noise in Bob's environment, Alice's avatar may switch its attention from Bob to the direction of the loud noise (and thus may look away from Bob).

In certain implementations, the wearable system can learn the behaviors of one or more users (e.g., including the avatar's human counterpart) and drive the avatar's animation based on such learning even though the human counterpart user may or may not be present (either remotely or in the same environment). For example, the wearable system can learn (e.g., based on data from devices sensors) how the user interacts with others from the user's eye gaze direction and frequency of eye contact in relation to speaking voices or objects in the user's environment. The wearable system can accordingly drive the avatar's animation based on the learned behaviors of the user. As an example, if a user does not respond to country music (e.g., does not look at the sound source playing the country music), the avatar associated with the user may also be rendered such that the avatar does not respond to the country music.

Although the examples in this disclosure describe animating a human-shaped avatar, similar techniques can also be applied to animals, fictitious creatures, objects (e.g., the virtual book described above), etc. For example, Alice's system may detect a dog moving in her environment. Bob's wearable system can present movement of a virtual dog in Bob's environment. Bob's wearable system may display the virtual dog's movement in Bob's environment based on obstacles in Bob's environment (e.g., by having the virtual dog move on a trajectory that does not cause the virtual dog to pass through physical objects).

Accordingly, embodiments of the disclosed systems and methods may provide for a much more realistic interaction between a user of the wearable system and avatars in the user's environment.

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
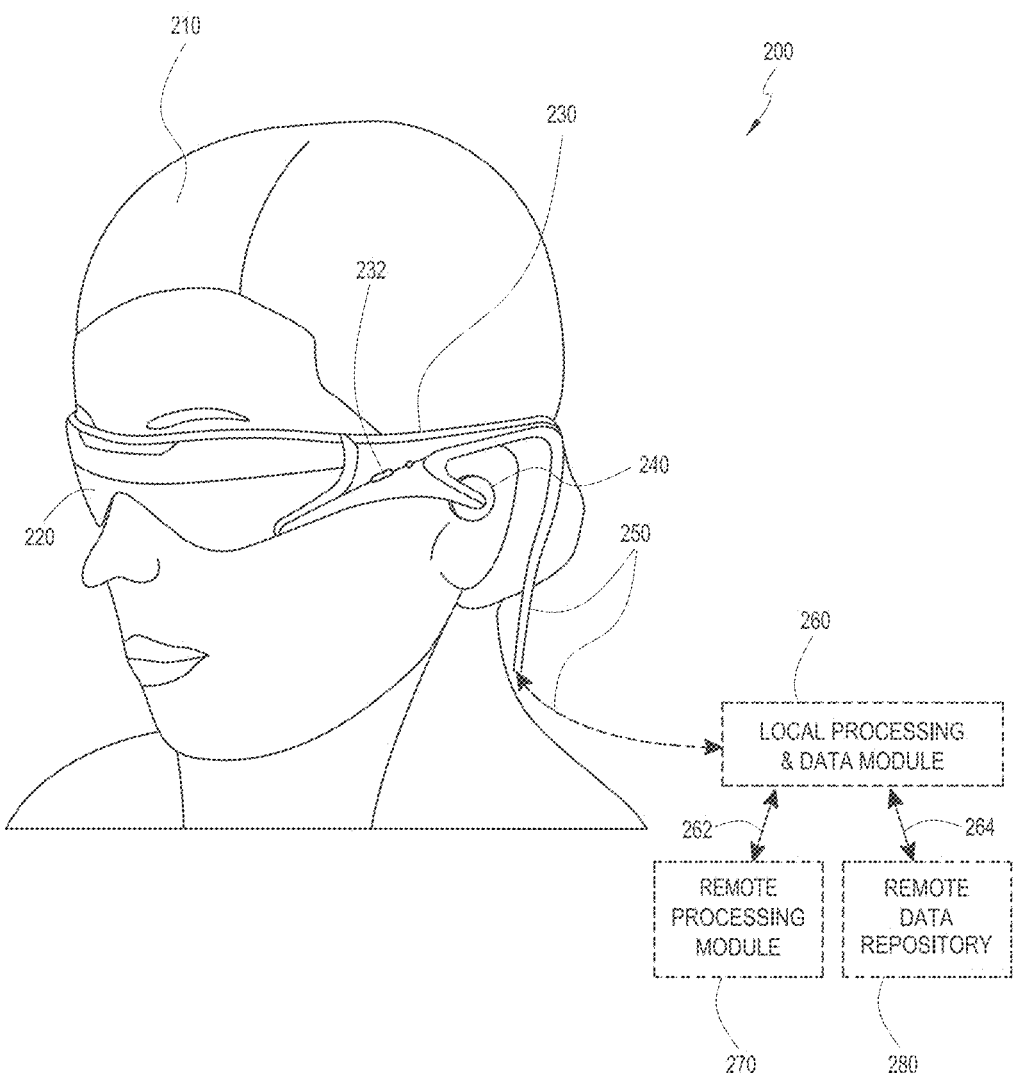
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements, or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

Example Components of a Wearable System

Figure 3:
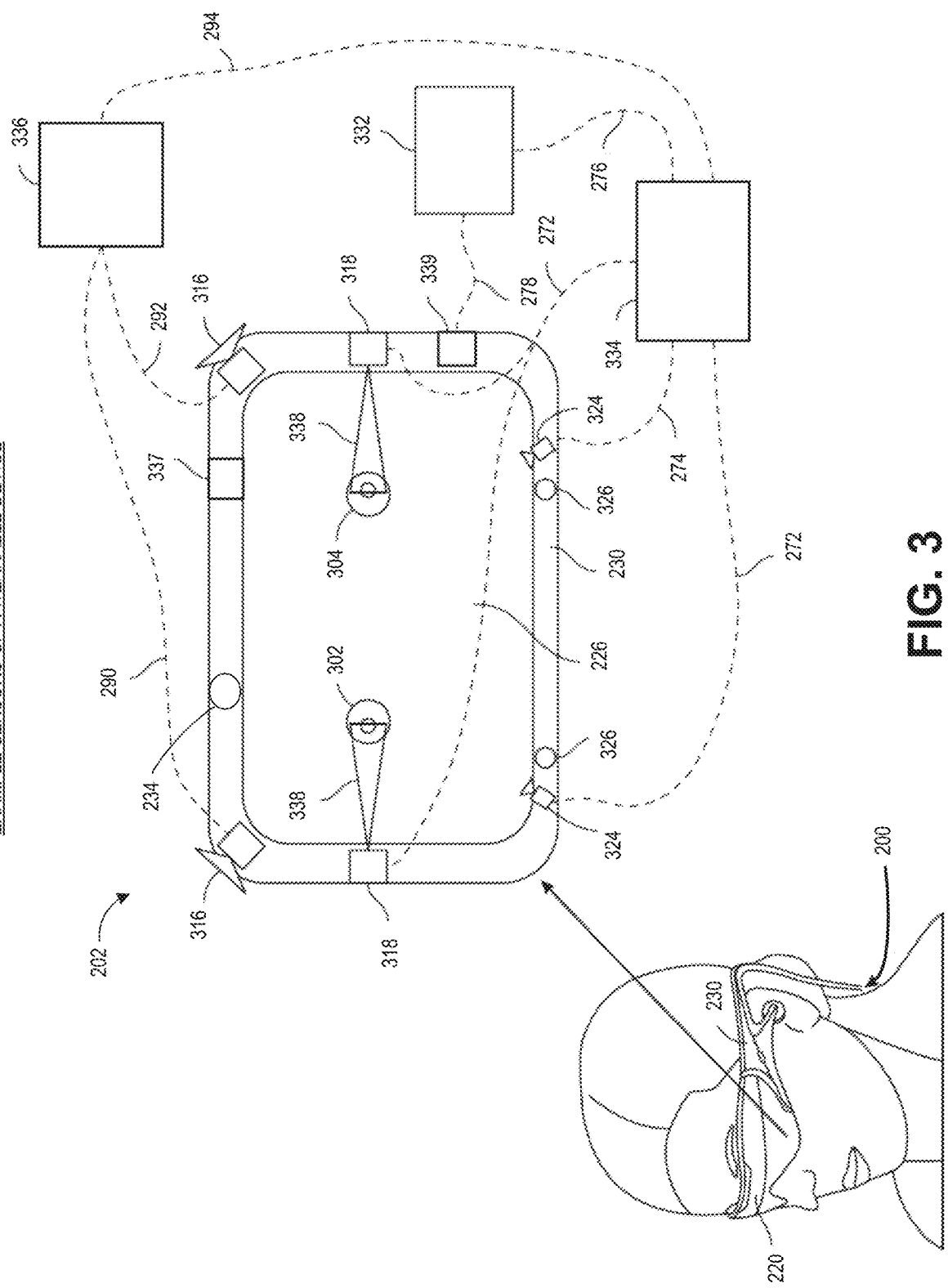
FIG. 3 schematically illustrates example components of a wearable system.

FIG. 3 schematically illustrates example components of a wearable system. FIG. 3 shows a wearable system 200 which can include a display 220 and a frame 230. A blown-up view 202 schematically illustrates various components of the wearable system 200. In certain implements, one or more of the components illustrated in FIG. 3 can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 3 provides a basic idea of some of the various components and types of data that may be collected, analyzed, and stored through the wearable system.

FIG. 3 shows an example wearable system 200 which can include the display 220. The display 220 can comprise a display lens 226 that may be mounted to a user's head or a housing or frame 230, which corresponds to the frame 230. The display lens 226 may comprise one or more transparent mirrors positioned by the housing 230 in front of the user's eyes 302, 304 and may be configured to bounce projected light 338 into the eyes 302, 304 and facilitate beam shaping, while also allowing for transmission of at least some light from the local environment. The wavefront of the projected light beam 338 may be bent or focused to coincide with a desired focal distance of the projected light. As illustrated, two wide-field-of-view machine vision cameras 316 (also referred to as world cameras) can be coupled to the housing 230 to image the environment around the user. These cameras 316 can be dual capture visible light/non-visible (e.g., infrared) light cameras. The cameras 316 may be part of the outward-facing imaging system 464 shown in FIG. 4. Image acquired by the world cameras 316 can be processed by the pose processor 336. For example, the pose processor 336 can implement one or more object recognizers 708 (e.g., shown in FIG. 7) to identify a pose of a user or another person in the user's environment or to identify a physical object in the user's environment.

With continued reference to FIG. 3, a pair of scanned-laser shaped-wavefront (e.g., for depth) light projector modules with display mirrors and optics configured to project light 338 into the eyes 302, 304 are shown. The depicted view also shows two miniature infrared cameras 324 paired with infrared light (such as light emitting diodes "LED"s), which are configured to be able to track the eyes 302, 304 of the user to support rendering and user input. The cameras 324 may be part of the inward-facing imaging system 462 shown in FIG. 4. The wearable system 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU described with reference to FIG. 2A. The depicted system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 260 shown in FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, or a depth sensing camera. In certain implementations, where the cameras 316 have depth sensing ability, the cameras 316 may also be considered as depth sensors 234.

Also shown is a processor 332 configured to execute digital or analog processing to derive pose from the gyro, compass, or accelerometer data from the sensor assembly 339. The processor 332 may be part of the local processing and data module 260 shown in FIG. 2. The wearable system 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 337 and a remote computing system (such as, e.g., the remote processing module 270, another user's ARD, etc.), which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 316 (which may be part of the outward-facing imaging system 464 shown in FIG. 4). Based on the images acquired by the world cameras 316, the wearable system 200 can detect objects in the environment (e.g., by using one or more object recognizers 708 shown in FIG. 7). The wearable system can further use data acquired by the GPS 337 to interpret the characters.

The wearable system 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 can be communicatively coupled (e.g., via wired or wireless links) to other components of the wearable system 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294, respectively.

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers 339 may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a belt pack and configured to communicate with other components of the wearable system via wireless communication, such as ultra-wideband, Wi-Fi, Bluetooth, etc., or via wired communication. The depicted housing 230 preferably is head-mountable and wearable by the user. However, some components of the wearable system 200 may be worn to other portions of the user's body. For example, the speaker 240 may be inserted into the ears of a user to provide sound to the user.

Regarding the projection of light 338 into the eyes 302, 304 of the user, in some embodiment, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the horopter in focus, and all other objects at varying degrees of defocus (e.g., using intentionally-created blurring). Preferably, the display system 220 renders to the user at a frame rate of about 60 frames per second or greater. As described above, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the wearable system 200 of some embodiments allows the user's eye to function in a more natural manner.

Such a wearable system 200 may eliminate or reduce the incidences of eye strain, headaches, and other physiological symptoms typically observed with respect to virtual reality devices. To achieve this, various embodiments of the wearable system 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Waveguide Stack Assembly

Figure 4:
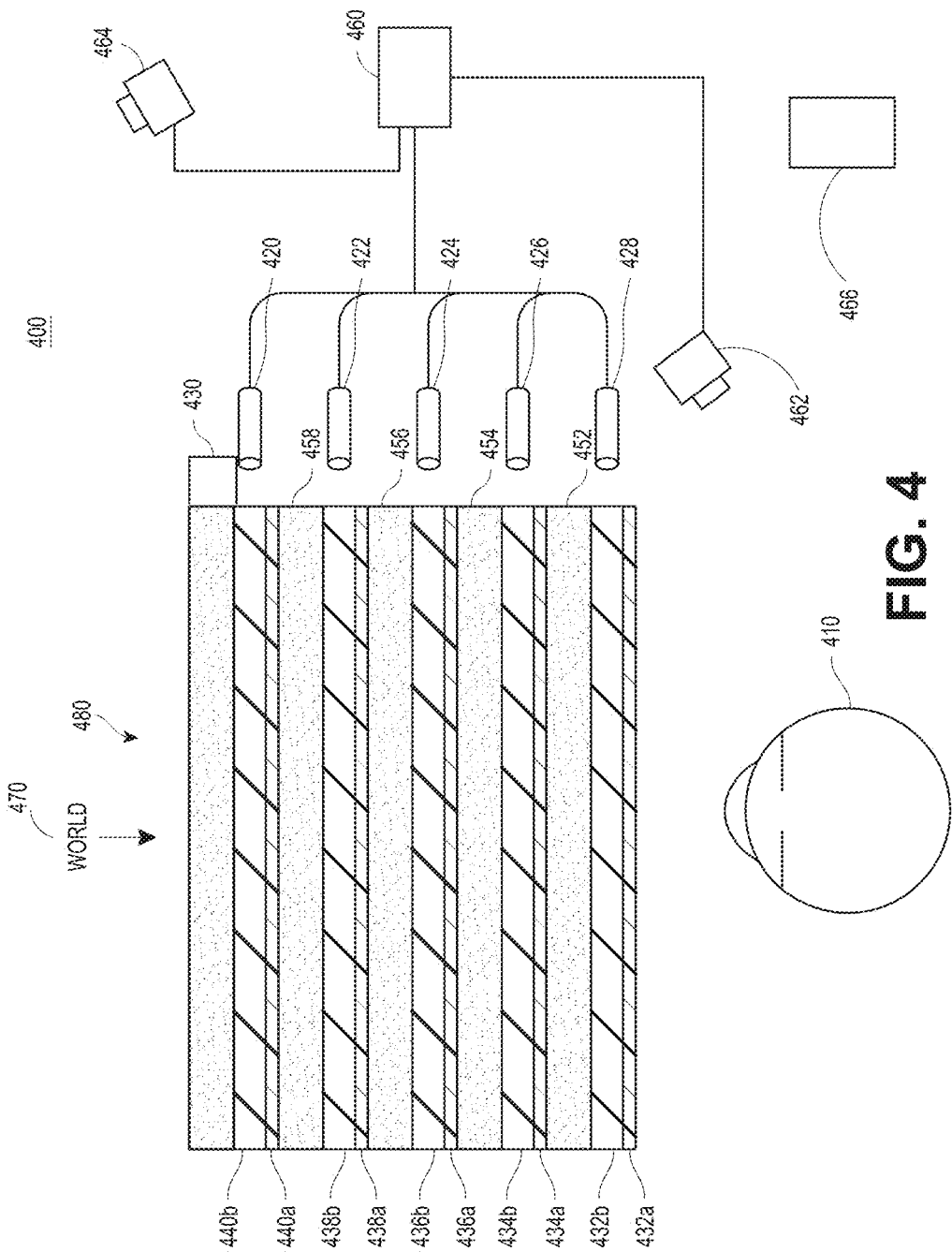
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature, so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic, or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor (not shown), e.g., a microphone, to capture ambient sound. As described above, in some embodiments, one or more other audio sensors can be positioned to provide stereo sound reception useful to the determination of location of a speech source. The audio sensor can comprise a directional microphone, as another example, which can also provide such useful directional information as to where the audio source is located. The wearable system 400 can use information from both the outward-facing imaging system 464 and the audio sensor in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum, which can serve as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Processes of User Interactions with a Wearable System

Figure 5:
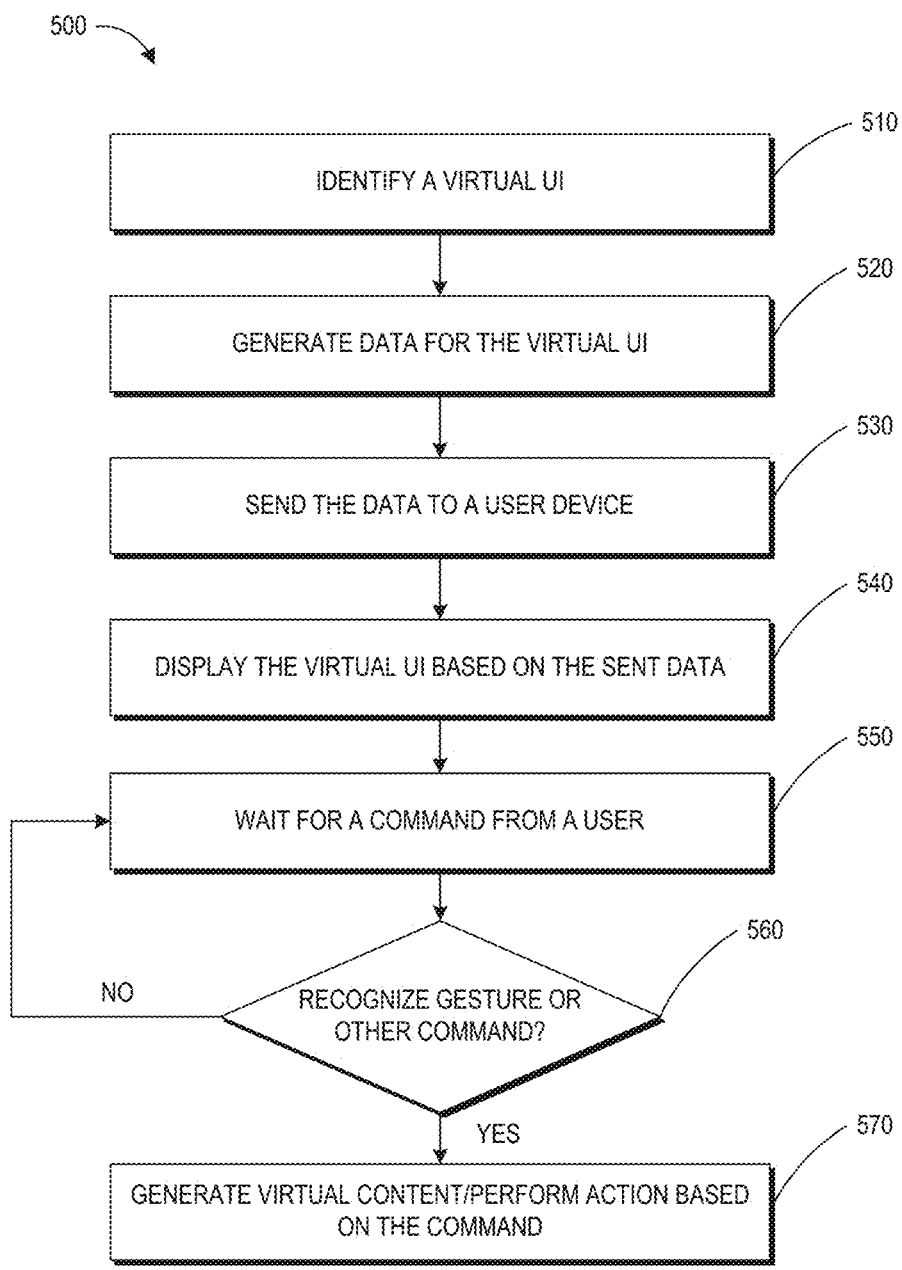
FIG. 5 is a process flow diagram of an example of a method for interacting with a virtual user interface.

FIG. 5 is a process flow diagram of an example of a method 500 for interacting with a virtual user interface. The method 500 may be performed by the wearable system described herein. Embodiments of the method 500 can be used by the wearable system to detect persons or documents in the FOV of the wearable system.

At block 510, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
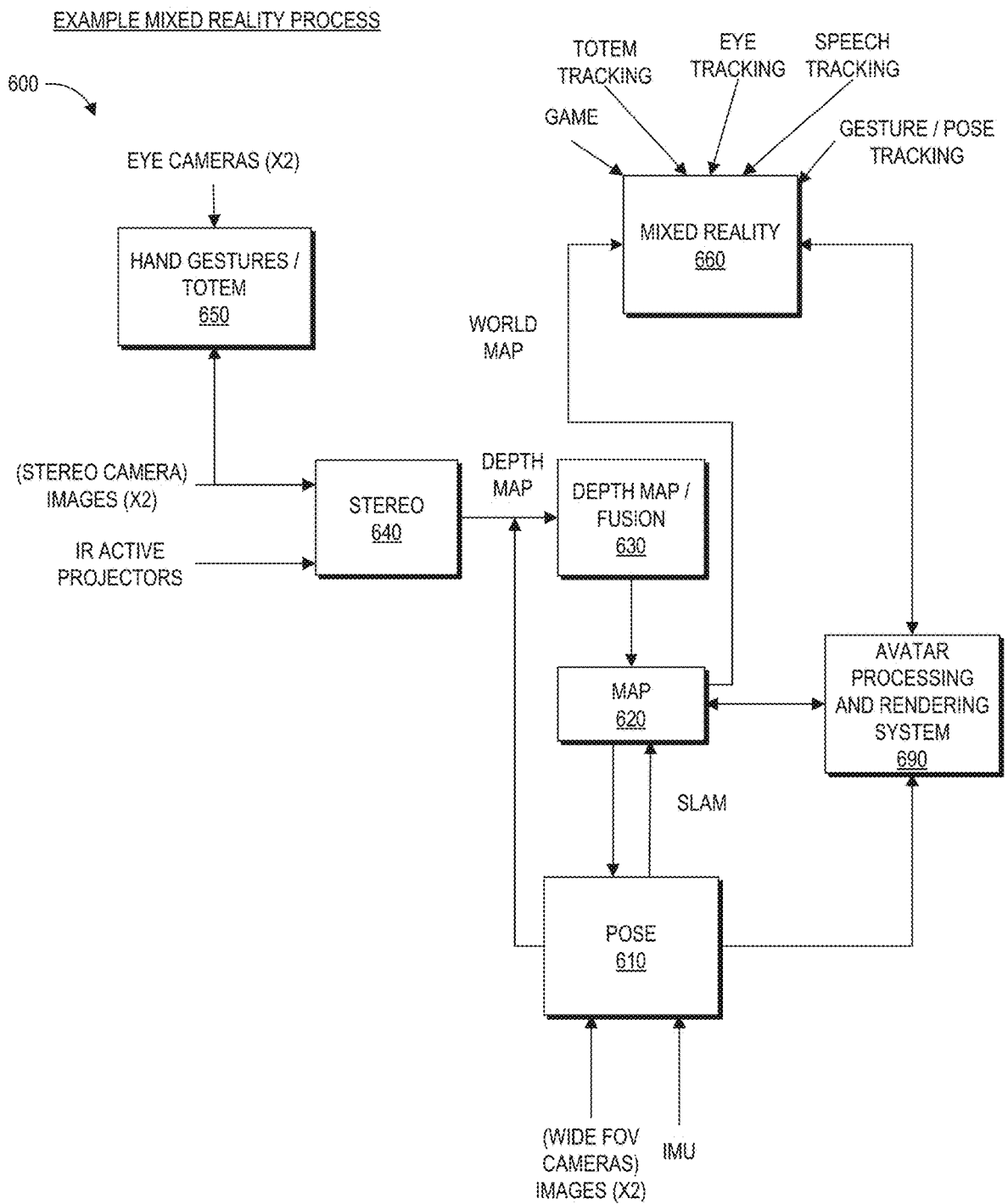
FIG. 6A is a block diagram of another example of a wearable system which can comprise an avatar processing and rendering system.

FIG. 6A is a block diagram of another example of a wearable system which can comprise an avatar processing and rendering system 690 in a mixed reality environment. The wearable system 600 may be part of the wearable system 200 shown in FIG. 2. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the embodiment depicted in FIG. 6A, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one embodiment, a totem (e.g., a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. Some or all of the avatar processing and rendering system 690 can be implemented as part of the local processing and data module 260 or the remote processing module 270, 280 alone or in combination. In various embodiments, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) can communicate via a network, for example, as will be described with reference to FIGS. 9A and 9B.

Figure 6B:
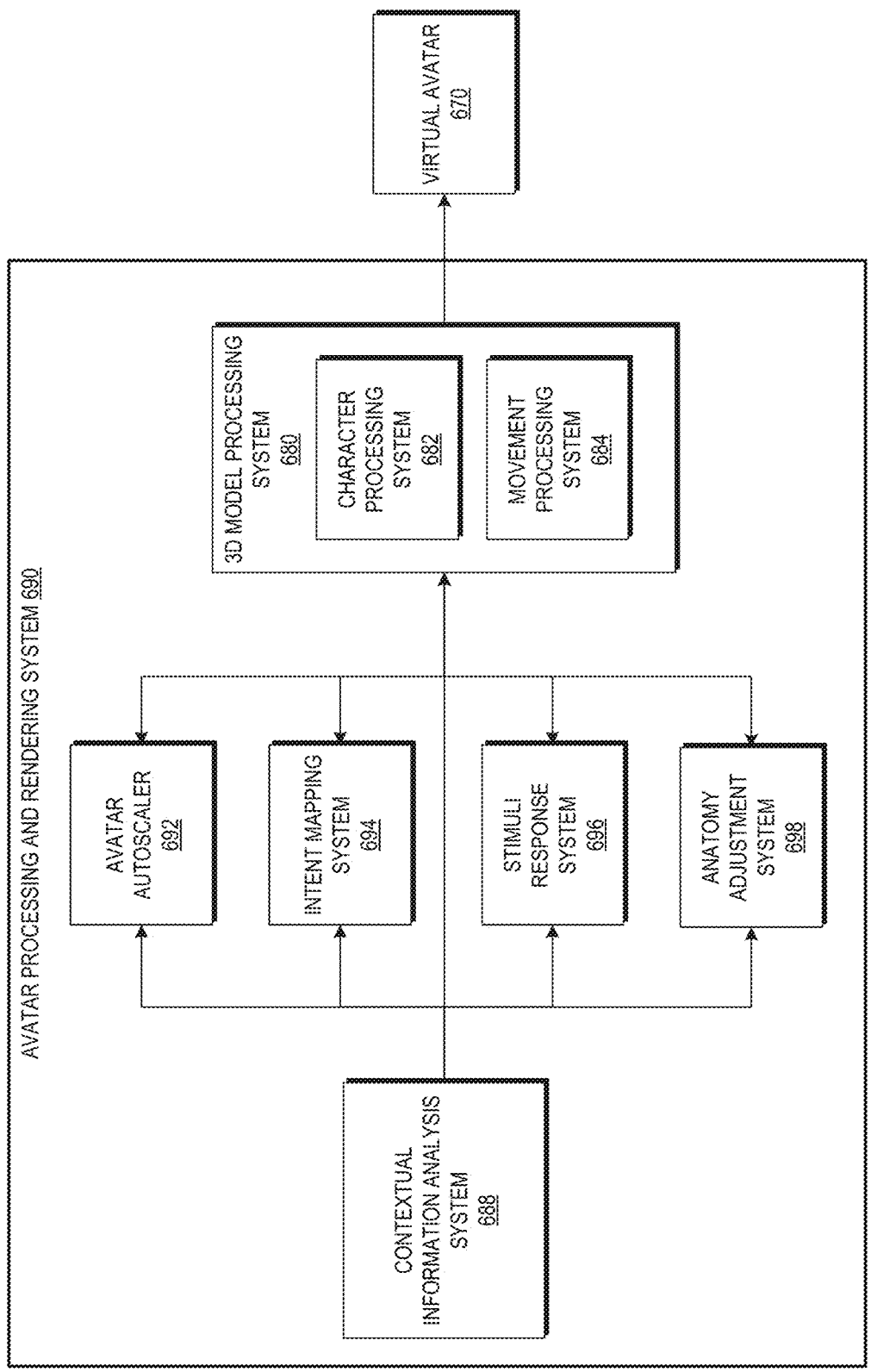
FIG. 6B illustrates example components of an avatar processing and rendering system.

FIG. 6B illustrates an example avatar processing and rendering system 690. The example avatar processing and rendering system 690 can comprise a 3D model processing system 680, a contextual information analysis system 688, an avatar autoscaler 692, an intent mapping system 694, an anatomy adjustment system 698, a stimuli response system 696, alone or in combination. The system 690 is intended to illustrate functionalities for avatar processing and rendering and is not intended to be limiting. For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 2 and 3. For example, the contextual information analysis system 688 can analyze environments and objects (including physical or virtual objects) of a user's environment or an environment in which the user's avatar is rendered, using images acquired by the outward-facing imaging system 464 of the user or the viewer of the user's avatar. The contextual information analysis system 688 can analyze such images alone or in combination with a data acquired from location data or world maps (e.g., maps 620, 710, 910) to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the avatar such that a portion of the user's avatar's body (e.g., the head) is not at an uncomfortable (or unrealistic) position with respect to the other portions of the user's body (e.g., the avatar's head is not turned 270 degrees). In certain implementations, one or more object recognizers 708 (shown in FIG. 7) may be implemented as part of the contextual information analysis system 688.

The avatar autoscaler 692, the intent mapping system 694, and the stimuli response system 696, and anatomy adjustment system 698 can be configured to determine the avatar's characteristics based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the user's eye level such that the user does not need to look down at the avatar or look up at the avatar respectively. The intent mapping system 694 can determine an intent of a user's interaction and map the intent to an avatar (rather than the exact user interaction) based on the environment that the avatar is rendered in. For example, an intent of a first user may be to communicate with a second user in a telepresence session (see, e.g., FIG. 9B). Typically, two people face each other when communicating. The intent mapping system 694 of the first user's wearable system can determine that such a face-to-face intent exists during the telepresence session and can cause the first user's wearable system to render the second user's avatar to be facing the first user. If the second user were to physically turn around, instead of rendering the second user's avatar in a turned position (which would cause the back of the second user's avatar to be rendered to the first user), the first user's intent mapping system 694 can continue to render the second avatar's face to the first user, which is the inferred intent of the telepresence session (e.g., face-to-face intent in this example).

The stimuli response system 696 can identify an object of interest in the environment and determine an avatar's response to the object of interest. For example, the stimuli response system 696 can identify a sound source in an avatar's environment and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the user's pose based on biological features. For example, the anatomy adjustment system 698 can be configured to adjust relative positions between the user's head and the user's torso or between the user's upper body and lower body based on a discomfort curve.

The 3D model processing system 680 can be configured to animate and cause the display 220 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). The movement processing system 684 can be configured to animate the avatar, such as, e.g., by changing the avatar's pose, by moving the avatar around in a user's environment, or by animating the avatar's facial expressions, etc. As will further be described with reference to FIG. 10, the virtual avatar can be animated using rigging techniques (e.g., skeletal system or blendshape animation techniques) where an avatar is represented in two parts: a surface representation (e.g., a deformable mesh) that is used to render the outward appearance of the virtual avatar and a hierarchical set of interconnected joints (e.g., a skeleton) for animating the mesh. In some implementations, the virtual character processing system 682 can be configured to edit or generate surface representations, while the movement processing system 684 can be used to animate the avatar by moving the avatar, deforming the mesh, etc.

Examples of Mapping a User's Environment

Figure 7:
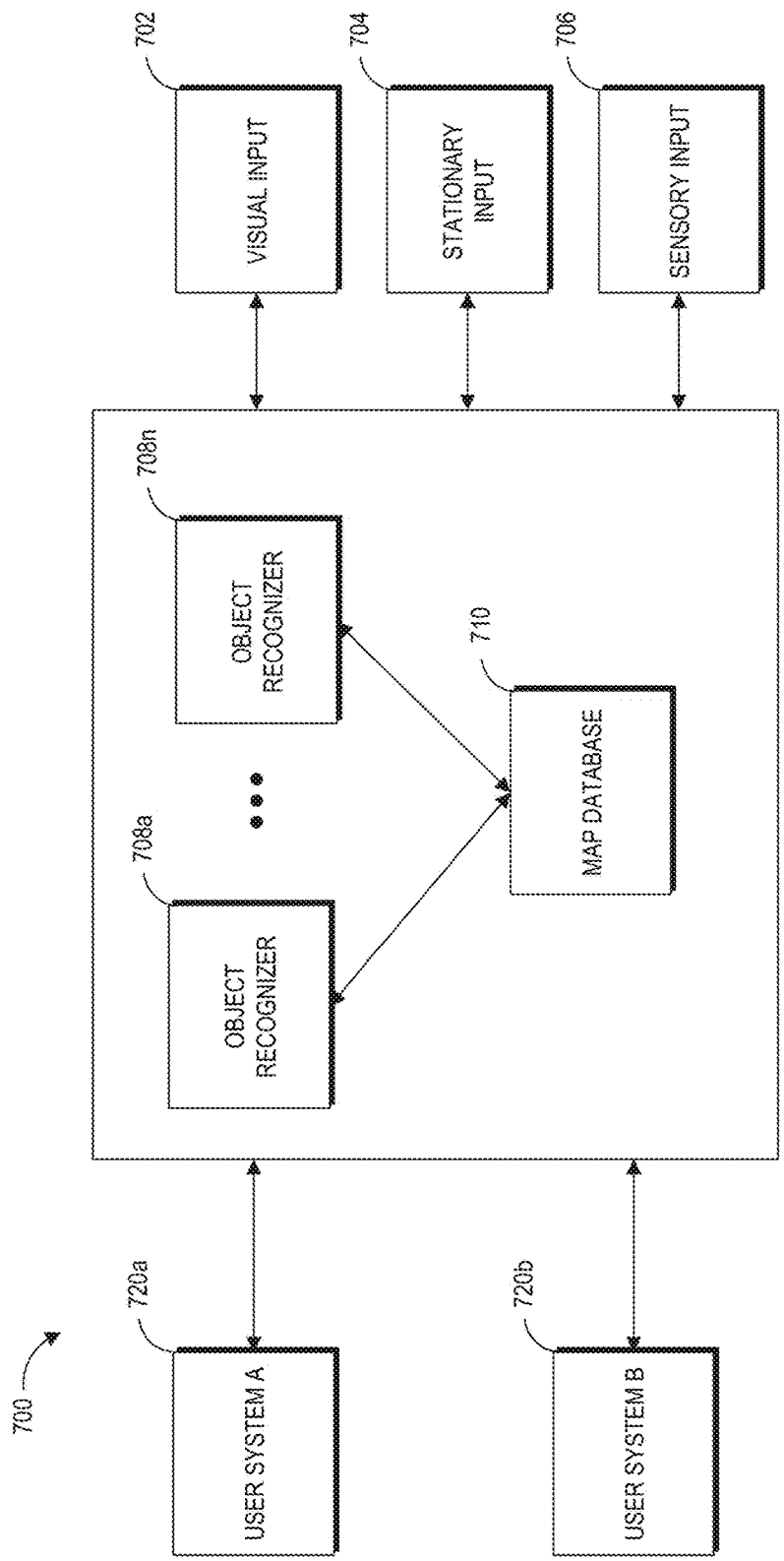
FIG. 7 is a block diagram of an example of a wearable system including various inputs into the wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466, etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for objects with certain characteristics. For example, the object recognizer 708a may be used to recognize faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
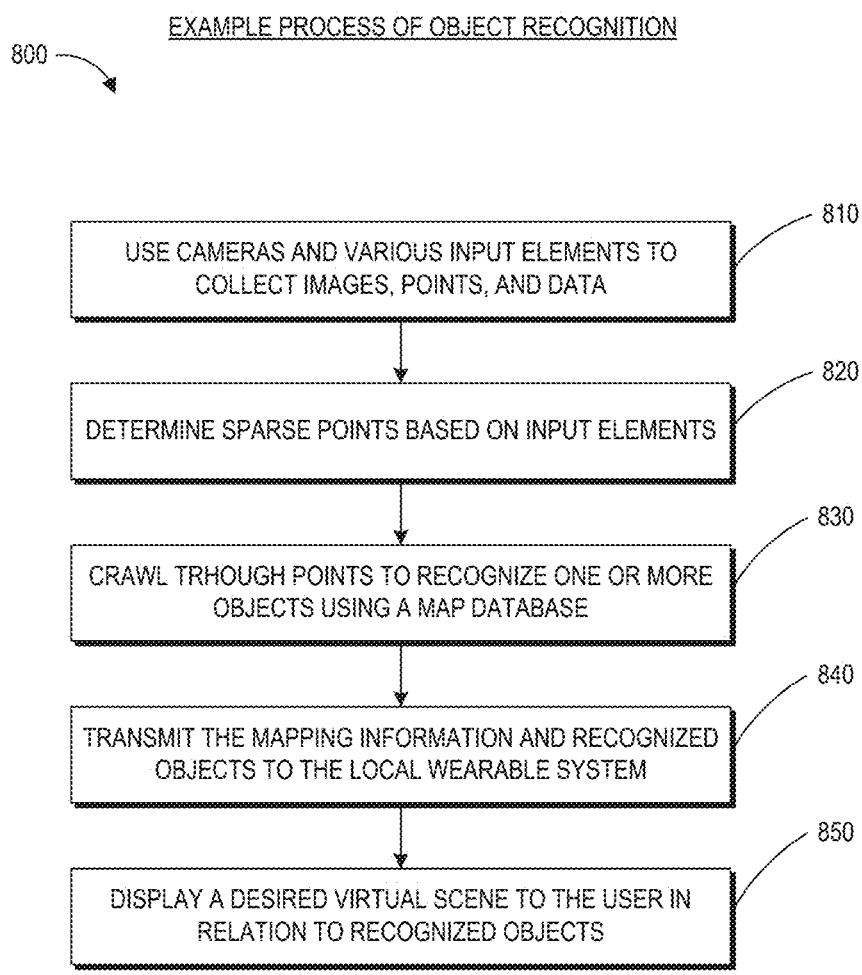
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications among Multiple Wearable Systems

Figure 9A:
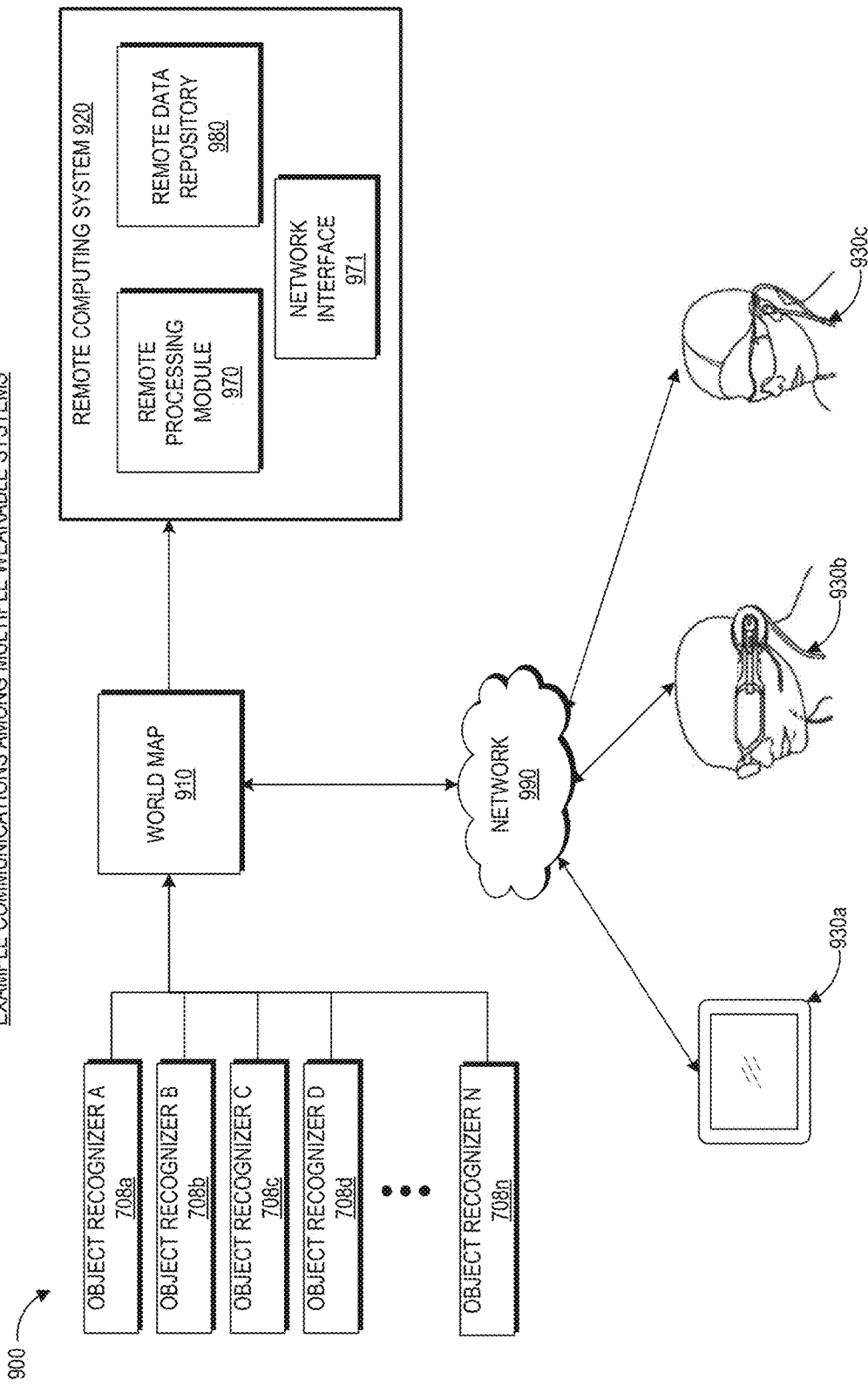
FIG. 9A schematically illustrates an overall system view depicting multiple wearable systems interacting with each other.

FIG. 9A schematically illustrates an overall system view depicting multiple user devices interacting with each other. The computing environment 900 includes user devices 930a, 930b, 930c. The user devices 930a, 930b, and 930c can communicate with each other through a network 990. The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about a specific user's physical and/or virtual worlds. Data storage 980 can store information related to users, users' environment (e.g., world maps of the user's environment), or configurations of avatars of the users. The remote data repository may be an embodiment of the remote data repository 280 shown in FIG. 2. The remote computing system 920 may also include a remote processing module 970. The remote processing module 970 may be an embodiment of the remote processing module 270 shown in FIG. 2. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930b and 930c may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g., 708a, 708b, 708c . . . 708n) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g., 930a, 930b, 930c) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g., 930a, 930b, 930c) to process information about the user and the user's environment. The remote computing system 920 can modify the information acquired by the user devices (e.g., 930a, 930b, 930c), such as, e.g., selectively cropping a user's image, modifying the user's background, adding virtual objects to the user's environment, annotating a user's speech with auxiliary information, etc. The remote computing system 920 can send the processed information to the same and/or different user devices.

Examples of a Telepresence Session

FIG. 9B depicts an example where two users of respective wearable systems are conducting a telepresence session. Two users (named Alice and Bob in this example) are shown in this figure. The two users are wearing their respective wearable devices 902 and 904 which can include an HMD described with reference to FIG. 2 (e.g., the display device 220 of the system 200) for representing a virtual avatar of the other user in the telepresence session. The two users can conduct a telepresence session using the wearable device. Note that the vertical line in FIG. 9B separating the two users is intended to illustrate that Alice and Bob may (but need not) be in two different locations while they communicate via telepresence (e.g., Alice may be inside her office in Atlanta while Bob is outdoors in Boston).

As described with reference to FIG. 9A, the wearable devices 902 and 904 may be in communication with each other or with other user devices and computer systems. For example, Alice's wearable device 902 may be in communication with Bob's wearable device 904, e.g., via the network 990 (shown in FIG. 9A). The wearable devices 902 and 904 can track the users' environments and movements in the environments (e.g., via the respective outward-facing imaging system 464, or one or more location sensors) and speech (e.g., via the respective audio sensor 232). The wearable devices 902 and 904 can also track the users' eye movements or gaze based on data acquired by the inward-facing imaging system 462. In some situations, the wearable device can also capture or track a user's facial expressions or other body movements (e.g., arm or leg movements) where a user is near a reflective surface and the outward-facing imaging system 464 can obtain reflected images of the user to observe the user's facial expressions or other body movements.

A wearable device can use information acquired of a first user and the environment to animate a virtual avatar that will be rendered by a second user's wearable device to create a tangible sense of presence of the first user in the second user's environment. For example, the wearable devices 902 and 904, the remote computing system 920, alone or in combination, may process Alice's images or movements for presentation by Bob's wearable device 904 or may process Bob's images or movements for presentation by Alice's wearable device 902. As further described herein, the avatars can be rendered based on contextual information such as, e.g., a user's intent, an environment of the user or an environment in which the avatar is rendered, or other biological features of a human.

Although the examples only refer to two users, the techniques described herein should not be limited to two users. Multiple users (e.g., two, three, four, five, six, or more) using wearables (or other telepresence devices) may participate in a telepresence session. A particular user's wearable device can present to that particular user the avatars of the other users during the telepresence session. Further, while the examples in this figure show users as standing in an environment, the users are not required to stand. Any of the users may stand, sit, kneel, lie down, walk, or run, or be in any position or movement during a telepresence session. The user may also be in a physical environment other than described in examples herein. The users may be in separate environments or may be in the same environment while conducting the telepresence session. Not all users are required to wear their respective HMDs in the telepresence session. For example, Alice may use other image acquisition and display devices such as a webcam and computer screen while Bob wears the wearable device 904.

Examples of a Virtual Avatar

FIG. 10 illustrates an example of an avatar as perceived by a user of a wearable system. The example avatar 1000 shown in FIG. 10 can be an avatar of Alice (shown in FIG. 9B) standing behind a physical plant in a room. An avatar can include various characteristics, such as for example, size, appearance (e.g., skin color, complexion, hair style, clothes, facial features (e.g., wrinkle, mole, blemish, pimple, dimple, etc.)), position, orientation, movement, pose, expression, etc. These characteristics may be based on the user associated with the avatar (e.g., the avatar 1000 of Alice may have some or all characteristics of the actual person Alice). As further described herein, the avatar 1000 can be animated based on contextual information, which can include adjustments to one or more of the characteristics of the avatar 1000. Although generally described herein as representing the physical appearance of the person (e.g., Alice), this is for illustration and not limitation. Alice's avatar could represent the appearance of another real or fictional human being besides Alice, a personified object, a creature, or any other real or fictitious representation. Further, the plant in FIG. 10 need not be physical, but could be a virtual representation of a plant that is presented to the user by the wearable system. Also, additional, or different virtual content than shown in FIG. 10 could be presented to the user.

Example Control Systems for Animating an Avatar

As described with reference to FIG. 6B, an avatar can be animated by the wearable system using rigging techniques. A goal of rigging is to provide pleasing, high-fidelity deformations of an avatar based upon simple, human-understandable controls. Generally, the most appealing deformations are based at least partly on real-world samples (e.g., photogrammetric scans of real humans performing body movements, articulations, facial contortions, expressions, etc.) or art-directed development (which may be based on real-world sampling). Real-time control of avatars in a mixed reality environment can be provided by embodiments of the avatar processing and rendering system 690 described with reference to FIG. 6B.

Rigging includes techniques for transferring information about deformation of the body of an avatar (e.g., facial contortions) onto a mesh. A mesh can be a collection of 3D points (e.g., vertices) along with a set of polygons that share these vertices. FIG. 10 shows an example of a mesh 1010 around an eye of the avatar 1000. Animating a mesh includes deforming the mesh by moving some or all of the vertices to new positions in 3D space. These positions can be influenced by the position or orientation of the underlying bones of the rig (described below) or through user controls parameterized by time or other state information for animations such as facial expressions. The control system for these deformations of the mesh is often referred to as a rig. The example avatar processing and rendering system 690 of FIG. 6B includes a 3D model processing system 680, which can implement the rig.

Since moving each vertex independently to achieve a desired deformation may be quite time-consuming and effort-intensive, rigs typically provide common, desirable deformations as computerized commands that make it easier to control the mesh. For high-end visual effects productions such as movies, there may be sufficient production time for rigs to perform massive mathematical computations to achieve highly realistic animation effects. But for real-time applications (such as in mixed reality), deformation speed can be very advantageous and different rigging techniques may be used. Rigs often utilize deformations that rely on skeletal systems and/or blendshapes.

Example Skeletal Systems

Skeletal systems represent deformations as a collection of joints in a hierarchy. Joints (also called bones) primarily represent transformations in space including translation, rotation, and change in scale. Radius and length of the joint may be represented. The skeletal system is a hierarchy representing parent-child relationships among joints, e.g., the elbow joint is a child of the shoulder and the wrist is a child of the elbow joint. A child joint can transform relative to its parent's joint such that the child joint inherits the transformation of the parent. For example, moving the shoulder results in moving all the joints down to the tips of the fingers. Despite its name, a skeleton need not represent a real world skeleton but can describe the hierarchies used in the rig to control deformations of the mesh. For example, hair can be represented as a series of joints in a chain, skin motions due to an avatar's facial contortions (e.g., representing an avatar's expressions such as smiling, frowning, laughing, speaking, blinking, etc.) can be represented by a series of facial joints controlled by a facial rig, muscle deformation can be modeled by joints, and motion of clothing can be represented by a grid of joints.

Skeletal systems can include a low level (also referred to as low order in some situations) core skeleton that might resemble a biological skeleton of an avatar. This core skeleton may not map exactly to a real set of anatomically correct bones, but can resemble the real set of bones by having at least a sub-set of the bones in analogous orientations and locations. For example, a clavicle bone can be roughly parallel to the ground, roughly located between the neck and shoulder, but may not be the exact same length or position. Higher order joint structures representing muscles, clothing, hair, etc. can be layered on top of the low level skeleton. The rig may animate only the core skeleton, and the higher order joint structures can be driven algorithmically by rigging logic based upon the core skeleton's animation using, for example, skinning techniques (e.g., vertex weighting methods such as linear blend skinning (LBS)). Real-time rigging systems (such as the avatar processing and rendering system 690) may enforce limits on the number of joints that can be assigned to a given vertex (e.g., 8 or fewer) to provide for efficient, real-time processing by the 3D model processing system 680.

Blendshapes

Blendshapes include deformations of the mesh where some or all vertices are moved in 3D space by a desired amount based on a weight. Each vertex may have its own custom motion for a specific blendshape target, and moving the vertices simultaneously will generate the desired shape. Degrees of the blendshape can be applied by using blendshape weights. The rig may apply blendshapes in combination to achieve a desired deformation. For example, to produce a smile, the rig may apply blendshapes for lip corner pull, raising the upper lip, lowering the lower lip, moving the eyes, brows, nose, and dimples.

Example Rigging Techniques

A rig is often built in layers with lower, simpler layers driving higher order layers, which produce more realistic mesh deformations. The rig can implement both skeletal systems and blendshapes driven by rigging control logic. The control logic can include constraints among the joints (e.g., aim, orientation, and position constraints to provide specific movements or parent-child joint constraints); dynamics (e.g., for hair and clothing); pose-based deformations (PSDs, where the pose of the skeleton is used to drive a deformation based on distances from defined poses); machine learning techniques (e.g., those described with reference to FIG. 7) in which a desired higher level output (e.g., a facial expression) is learned from a set of lower level inputs (of the skeletal system or blendshapes); etc. Some machine learning techniques can utilize radial basis functions (RBF s).

In some embodiments, the 3D model processing system 680 animates an avatar in the mixed reality environment in real-time to be interactive (with users of the MR system) and to provide appropriate, contextual avatar behavior (e.g., intent-based behavior) in the user's environment. The system 680 may drive a layered avatar control system comprising a core skeletal hierarchy, which further drives a system of expressions, constraints, transforms (e.g., movement of vertices in 3D space such as translation, rotation, scaling, shear), etc. that control higher level deformations of the avatar (e.g., blendshapes, correctives) to produce a desired movement and expression of the avatar.

Example Problems of Realistically and Dynamically Rendering a Virtual Avatar in an Environment FIGS. 11A-11D illustrate example scenes of an avatar in various environments, where the virtual avatar may have an unnatural appearance or cause an unrealistic interaction. The avatar 1100 may be an avatar of Bob. As described with reference to FIG. 9B, the avatar 1100 may be animated based on Bob's characteristics including, e.g., intentions, poses, movements, expressions, or actions.

Figure 11A:
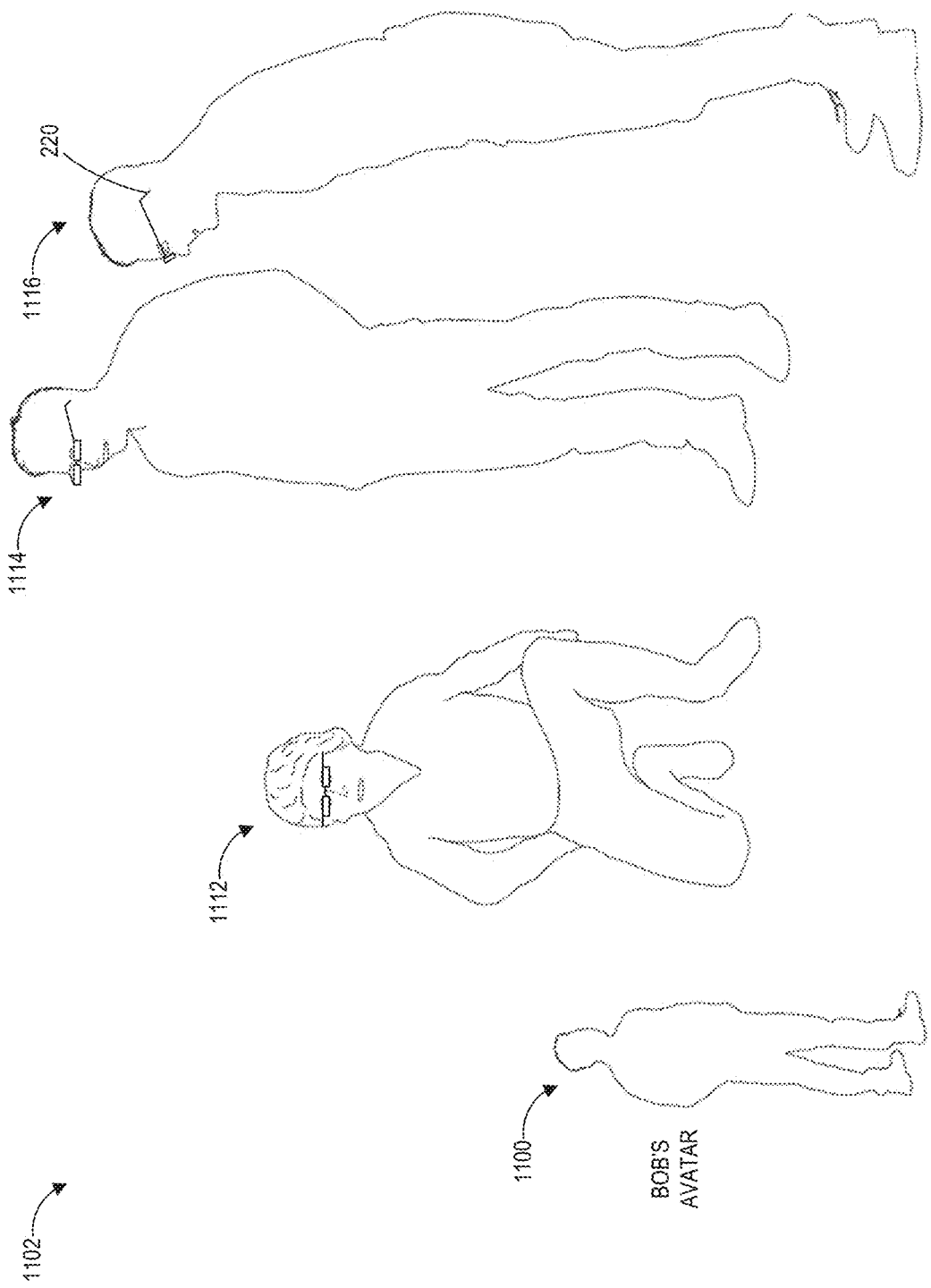

FIG. 11A illustrates an example scene 1102 where three users 1112, 1114, and 1116 are interacting with the avatar 1100 during a telepresence session. However, as shown in this example, Bob's avatar 1100 is relatively small compared to the three users 1112, 1114, and 1116, which may be lead to awkward interactions, because humans often feel most comfortable communicating with each other while maintaining eye contact and approximate eye height with each other. Thus, due to the difference in sight lines between the avatar and the three users, the three users may need to pose themselves at uncomfortable positions in order to look at the avatar 1100, or maintain (or alter) social dynamics in a conversation. For example, the user 1112 is kneeling down in order to look at the avatar's eyes; the user 1114 is looking down at the avatar; and the user 1116 bends his body forward to engage in conversation with the avatar 1100. To reduce a user's physical strain caused by an improperly sized avatar, advantageously, in some implementations, the wearable system can automatically scale the avatar to increase or decrease the size of the avatar based on contextual information such as, e.g., the height level of the other user's eyes. Such adjustment can be implemented in a manner that increases or maximizes direct eye contact between the avatar and the others, and therefore facilitates avatar-human communication. For example, the avatar can be scaled such that the wearable device can render the avatar's head at a viewer's eye level, and thus the user may not have to experience physical strain while interacting with the avatar. Detailed descriptions and examples of dynamically scaling an avatar based on contextual information are further described with reference to FIGS. 12A-18B.

Figure 11B:
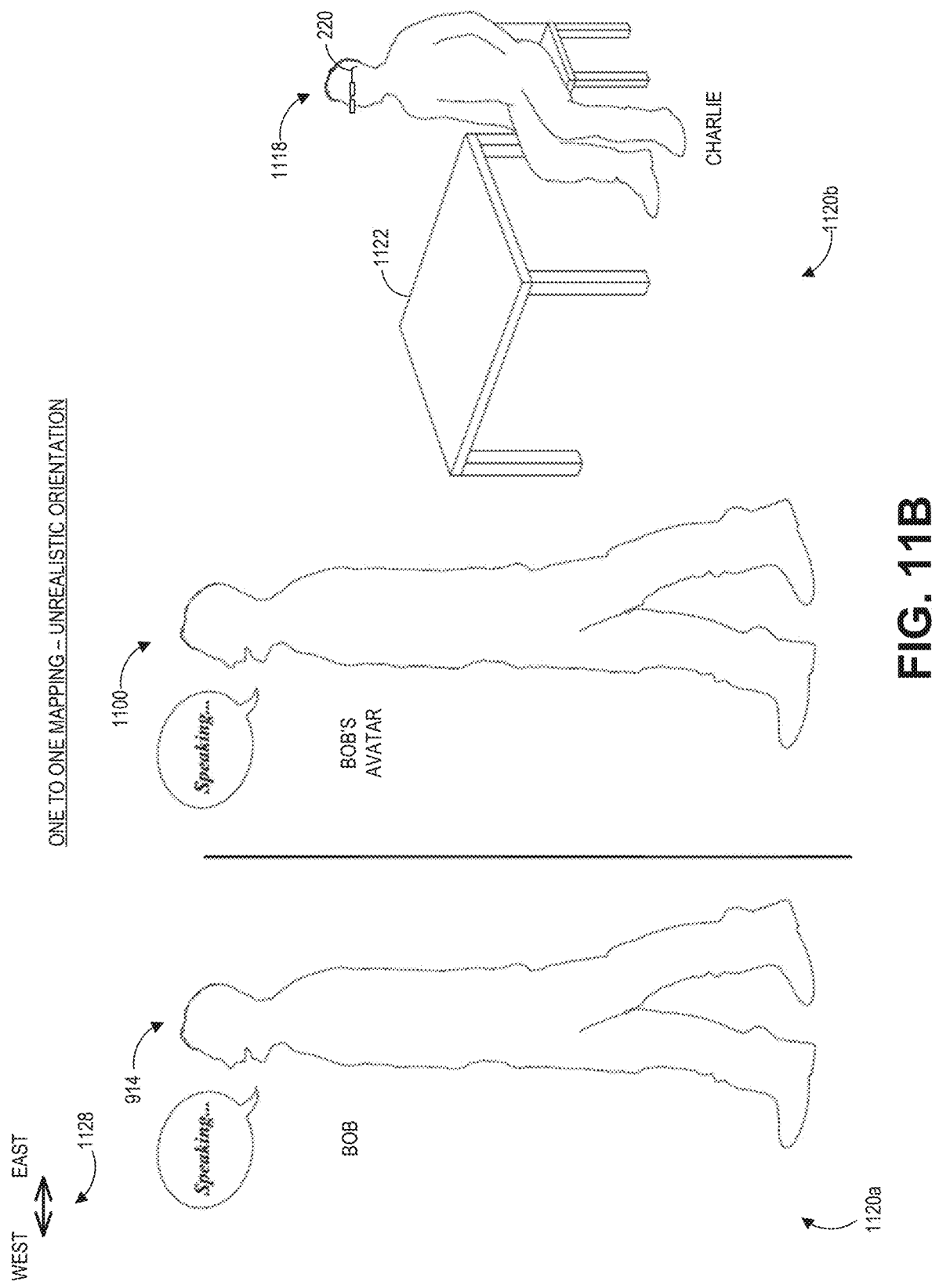

As described with reference to FIGS. 6B and 10, an avatar of a user can be animated based on characteristics of the user. However, a one-to-one mapping of the user's characteristics into an avatar's characteristics can be problematic because it can create unnatural user interactions or convey the wrong message or intent of the user to a viewer. FIGS. 11B-11D illustrates some example scenarios where a one-to-one mapping (which animates between a user and an avatar) can create problems.

FIG. 11B illustrates a scene where Bob is talking to Charlie during a telepresence session. The scene in this figure includes two environments 1120a and 1120b. The environment 1120a is where Bob resides. The environment 1120b is where Charlie 1118 resides and includes a physical table 1122 with Charlie 1118 sitting on a chair next to the table 1122. Charlie 1118 can perceive, e.g., via the display 220, Bob's avatar 1100. In the environment 1120a, Bob is facing west (as shown by the coordinate 1128). To animate Bob's avatar 1100, Bob's 914 characteristics are mapped as one-to-one to Bob's avatar 1100 in FIG. 11B. This mapping, however, is problematic because it does not take into account Charlie's environment and it creates an unnatural or unpleasant user interaction experience with the avatar 1100. For example, Bob's avatar is taller than Charlie 1118 because Charlie 1118 is sitting on a chair, and Charlie 1118 may need to strain his neck to maintain communication with Bob's avatar 1100. As another example, Bob's avatar 1100 is facing to the west because Bob is facing to the west. However, Charlie 1118 is to the east of Bob's avatar 1100. Thus, Charlie 1118 perceives the back of Bob's avatar and cannot observe Bob's facial expressions as reflected by Bob's avatar 1100. This orientation of Bob's avatar 1100 relative to Charlie may also convey an inaccurate social message (e.g., Bob does not want to engage with Charlie or Bob is angry at Charlie), even though Bob intends to be in a friendly conversation with Charlie.

FIG. 11C illustrates a scene where Bob's avatar 1100 is rendered without taking into account physical objects in Charlie 1118 environment. This scene illustrates two environments 1130a and 1130b. Bob is located in the environment 1130a and Charlie is in the environment 1130b. As illustrated, Bob is sitting on a chair 1124 in the environment 1130a. Due to one-to-one mapping of Bob's pose to Bob's avatar's pose that is illustrated in this example, Bob's avatar 1100 is also rendered with a sitting pose in Charlie's environment 1130b. However, there is no chair in Charlie's environment. As a result, Bob's avatar 1100 is rendered as sitting in mid-air which can create an unnatural appearance of Bob's avatar 1100.

FIG. 11D illustrates an example scene where one-to-one mapping causes unrealistic movement of a virtual avatar. The scene in FIG. 11D illustrates two environments 1140a and 1140b. Bob is moving eastbound in his environment 1140a. To map Bob's movement 1142 to the environment 1140b where Bob's avatar 1100 is rendered, Bob's avatar 1100 also moves eastbound (e.g., from position 1142a to position 1142b). However, the environment 1140b has a table 1126. By directly mapping Bob's 1142 movement to Bob's avatar's 1100 movement, Bob's avatar 1100 moves straight into the table and appears to be trapped in table 1126, which creates an unnatural and unrealistic movement and appearance of Bob's avatar 1100.

Advantageously, in some implementations, the wearable system 200 can be configured to render an avatar based on contextual information relating to the environment where the avatar is displayed or to convey the intent of a user (rather than a direct, one-to-one mapping), and thus may avoid unnatural or unrealistic appearances or interactions by an avatar. For example, the wearable system 200 can analyze the contextual information and Bob's action to determine the intent of Bob's action. The wearable system 200 can adjust the characteristics of Bob's avatar to reflect Bob's intent in view of Bob's action and contextual information about the environment in which Bob's avatar is to be rendered.

For example, with reference to FIG. 11B, rather than rendering the avatar 1100 facing westward, the wearable system 200 can turn the avatar around to face Charlie 1118 because Bob intends to converse with Charlie 1118 in a friendly manner, which normally occurs face-to-face. However, if Bob is angry at Charlie 1118 (e.g., as determined by the tone, content, volume of Bob's speech as detected by a microphone on Bob's system, or Bob's facial expression), the wearable system 200 can keep Bob's 914 orientation such that Bob faces away from Charlie 1118.

As another example, rather than rendering Bob's avatar 1100 sitting in mid-air (as shown in FIG. 11C), the wearable system 200 can automatically identify an object with a horizontal surface suitable for sitting (e.g., a bed or a sofa) in Charlie's environment and can render Bob's avatar 1100 as sitting on the identified surface (rather than in mid-air). If there is no place in Charlie's environment 1130b that Bob's avatar 1100 can sit (e.g., all chairs have been occupied by either human or other avatars or there are no sit-table surfaces), the wearable system may instead render Bob's avatar as standing or render a virtual chair for the virtual avatar to sit in.

As yet another example, with reference to FIG. 11D, rather than rendering Bob's avatar as walking into or through the table, the wearable system can detect the presence of the table 1126 as an obstacle on the route of Bob's avatar in the environment 1140b (e.g., based on a world map 910 of the environment 1140b or based on images acquired by the outward-facing imaging system 464 of a viewer's wearable device in the environment 1140b). The wearable system 200 can accordingly reroute the avatar 1100 to circumvent the table 1126 or to stop prior to the table. Further details related to intent-based rendering are described with reference to FIGS. 14-22.

Examples of Intent Based Rendering of a Virtual Avatar

As described with reference to FIGS. 11B-11D, the one-to-one mapping of a user interaction (such as, e.g., a head or body pose, a gesture, movement, eye gaze, etc.) into an avatar action can be problematic because it may create awkward or unusual results that do not make sense in the environment where the avatar is rendered. Advantageously, in some embodiments, the wearable system 200 can determine which part of an interaction is a world component (e.g., movements or interactions with an object of interest) that may be different in a remote environment, and which part of the interaction is a local component which does not require interactions with the environment (such as, e.g., nodding yes or no). The wearable system 200 (such as, e.g., the avatar processing and rendering system 690 or the intent mapping system 694) can decompose a user interaction into two parts: the world component and the local component. The world component can be rendered (for an avatar) in the other user's environment based on the user's intent such that the intent of the world component is preserved but the action of the avatar for carrying out the intent may be modified in the other user's environment (e.g., by walking on a different route, sitting on a different object, facing a different direction, etc.). The local component can be rendered as a backchannel communication such that the local motion is preserved.

As an example, Alice may be actively moving around in her environment, the wearable system may convey some of her translational motion to Bob's environment (in which Alice's avatar is rendered). The wearable system can re-interpret Alice's movement in Alice's world frame to match the motion in Bob's world frame as suggested by the user's intent. For example, Alice may walk forward toward Bob's avatar in Alice's environment. Decomposing intent from Alice's and Bob's head poses can allow a wearable system to determine which direction is "forward" in each of Alice's and Bob's environments. As another example, if Alice walks to a chair and sits down, it will look unusual if there is no chair in Bob's environment and Alice's avatar is suddenly sitting in mid-air. The wearable system can be configured to focus on the intent of Alice's motion (sitting), identify a "sit-able" surface in Bob's environment (which may be a chair, sofa, etc.), move Alice's avatar to the sit-able surface, and render the avatar as sitting on the sit-able surface, even if the physical location, height of the sit-table surface in Bob's environment is different than the one Alice sits in. As another example, Alice may be looking down at Bob's avatar, while in the remote environment, Bob may be looking up at Alice's avatar.

In certain implementations, such remapping of intent can occur in real-time (e.g., when two users are conducting a telepresence session) the human counterpart of the avatar performs the interaction. In other situations, the remapping may not occur in real-time. For example, an avatar may serve as a messenger and delivers a message to a user. In this situation, the remapping of the avatar may not need to occur at the same time as the message is crafted or sent. Rather, the remapping of the avatar can occur when the avatar delivers the message (such as, e.g., when the user turns on the wearable device). The remapping may cause the avatar to look at the user (rather than a random location in the space) when delivering the message. By rendering the world motion based on the intent, the wearable system can advantageously reduce the likelihood of unnatural human-avatar interactions.

Examples of Scaling a Virtual Avatar Based on Contextual Information

As described with reference to FIG. 11A, an improperly scaled avatar can result in physical strain for a viewer of the avatar and may increase the likelihood of an inappropriate social interaction between the avatar and the user. For example, improperly scaling an avatar may incur discomfort or pain (e.g., neck pain) for a user (e.g., because the user has to look up or look down at the avatar). Such improper scaling may also provide for an awkward social dynamic for a user. As an example, an improperly sized avatar (e.g., an avatar shorter than the viewer) may be rendered as looking at an improper or inappropriate region of the viewer's body. As another example, differing sight lines or eye levels between the user and the avatar may improperly imply social inferiority or superiority.

For example, in friendly conversations, the eyes of a user are typically directed toward a region called the social triangle of the other user's face. The social triangle is formed with a first side on a line between the user's eyes and a vertex at the user's mouth. Eye contact within the social triangle is considered friendly and neutral, whereas eye gaze directed outside the social triangle can convey a power imbalance (e.g., eye gaze directed above the social triangle, toward the other person's forehead), anger, or that the conversation is serious. Thus, an avatar rendered taller than the viewer may be tend to be viewed as looking at a region above the viewer's social triangle, which can create a psychological effect for the viewer that the avatar is superior to the viewer. Thus, incorrect-sizing of the avatar can lead to awkward or unpleasant encounters between a human and an avatar that were not intended between the actual human participants of the conversation.

In some wearable devices, a user can manually scale an avatar so that the size of the avatar is at a comfortable height. However, such manual control may take more time to complete and require the user to make refined adjustments to the avatar, which can cause muscle fatigue of a user and require more expert control from the user. Other wearable devices may use scaling methods that seek to maintain a 1:1 scale between the avatar and the user (e.g., an avatar is automatically scaled at the same height as the user). However, this technique can produce inappropriate sight lines if the avatar is standing on a surface higher than the surface on which the user is sitting or standing (e.g., where the avatar looks over the user's head).

Advantageously, in some embodiments, the wearable system 200 can automatically scale the virtual avatar based on contextual information regarding the rendering position of the avatar in the environment and the position or eye-height of the user in the environment. The wearable system 200 can calculate the size of the virtual avatar based on contextual factors such as, e.g., the rendering location of the avatar, the user's position, the height of the user, the relative positions between the user and the avatar, the height of surface that the avatar will be rendered on, the height of the surface the user is standing or sitting on, alone or in combination. The wearable system 200 can make the initial rendering of the avatar (called spawning) such that the avatar is rendered with the appropriate height based at least in part on such contextual factors. The wearable system 200 can also dynamically scale the size of the virtual avatar in response to a change in the contextual information, such as, e.g., as the avatar or the user moves around in the environment.

For example, prior to or at the time of spawning an avatar, the wearable system can determine the user's head height (and therefore the eye height, since the eyes are typically about halfway between top and bottom of the head or about 4 to 6 inches below the top of the head) and compute a distance from the base surface of the avatar (e.g., the surface that the avatar will be spawned on) to the user's eye height. This distance can be used to scale the avatar so that its resulting head and sight lines are the same height as the user. The wearable system can identify environment surfaces (e.g., the surface the user is on or the surface the avatar will be spawned on) and adjust the avatar height based on these surfaces or the relative height difference between the user and avatar surfaces. For example, the wearable system can scan for the floor and measure the height of the head with respect to the floor plane. The wearable system can determine a head pose of the user (e.g., via data from IMUs) and compute environment surfaces relative to the user's head pose or a common coordinate system shared by both the environment and the head pose. Based on this information, the wearable system can calculate a size of the avatar and instruct the display 220 to display the avatar as superimposed on the environment.

In certain implementations, as the user moves (or the avatar moves) around in the environment, the wearable system can continuously track the user's head pose and environment surfaces and dynamically adjust the size of the avatar based on these contextual factors in a similar fashion as when the avatar is originally spawned. In some embodiments, these techniques for automatically scaling an avatar (either at spawning or in real-time as the avatar moves) can advantageously allow direct eye contact to be made while minimizing neck strain, facilitate user-avatar communication, and minimize the amount of manual adjustments a user needs to make when placing avatars in the user's local environment, thereby allowing both participants (e.g., avatar and its viewer) to communicate eye-to-eye, creating a comfortable two-way interaction.

In some implementations, the wearable system 200 can allow a user to turn-off (temporarily or permanently) automatic, dynamic re-scaling of the avatar. For example, if the user frequently stands up and sits down during a telepresence session, the user may not wish the avatar to correspondingly re-scale, which may lead to an uncomfortable interaction since humans do not dynamically change size during conversations. The wearable system can be configured to switch among different modes of avatar scaling options. For example, the wearable system may provide three scaling options: (1) automatic adjustment based on contextual information, (2) manual control, and (3) 1:1 scaling (where the avatar is rendered as the same size as the viewer or its human counterpart). The wearable system can set the default to be automatically adjustable based on contextual information. The user can switch this default option to other options based on user inputs (such as, e.g., via the user input device 466, poses, or hand gestures, etc.). In other implementations, the wearable system may smoothly interpolate between size changes so that the avatar is rendered as smoothly changing size over a short time period (e.g., a few to tens of seconds) rather than abruptly changing size.

Examples of Spawning a Scaled Avatar

The wearable system can automatically scale an avatar based on contextual information to allow eye-to-eye communication between the avatar and a viewer. The calculation of the avatar's height can be performed upon initial spawning of the avatar into the viewer's environment. The wearable system can identify a rendering location of the avatar at the spawning site. The rendering location of the avatar can be a horizontal support platform (or surface), such as, e.g., a ground, table, a chair's sitting surface, etc. In some situation, the support platform is not horizontal and may be inclined or vertical (if the user is laying down, for example).

The wearable system can calculate the height of the avatar based on the current head position of the user (regardless of whether the user is standing or sitting) and the location of the horizontal support platform at the spawning site for the avatar. The wearable system can compute the estimated height of eyes above this platform (which may be a distance perpendicular and vertical to the platform) for computing a scale factor for adjusting the avatar's size. The estimated height of the eyes above the platform can be based on a distance between the eyes and the platform. In some implementations, the wearable system can compute an eye level which may be a 1D, 2D, 3D, or other mathematical representations of a level where the eyes are looking straight ahead. The estimated avatar's height can be calculated based on the difference between the eye level and the level of the platform.

FIGS. 12A and 12B illustrate two scenes of scaling avatar, where the avatar is spawned on the same surface as the viewer. The scene 1200*a* in FIG. 12A shows an improperly scaled avatar while the scene 1200*b* in FIG. 12B shows a scaled avatar that maintains roughly the same eye height as the viewer. In these two figures, the example virtual avatar 1000 can be Alice's 912 avatar while the user 914 may be Bob as identified in FIG. 9B. Both Alice and Bob may wear the wearable device as described with reference to FIG. 2. In these examples, Bob is standing on the ground (as represented by the ground plane 1214) while Alice's avatar 912 will also be spawned on the ground in this example.

FIG. 12A illustrates an example where Alice's avatar 1000 is too small such that the viewer (Bob) needs to look down when interacting with the Alice's avatar 1000. The height of Alice's avatar 100 and Bob can be measured from a common ground position line 1210, which may be part of the ground plane 1214. The ground position line 1210 may connect a position of the user 914 and a position of the virtual avatar 1000 along the ground plane 1214.

FIG. 12A also shows Bob's 914 eye level (as illustrated by the user eye line 1206) and the avatar's eye level (as illustrated by the avatar eye line 1228), which is below Bob's eye level 1206. The avatar eye line 1228 and user eye line 1206 are shown as parallel to the ground position line 1210 and intersecting an eye of the virtual avatar 1000 and the user 914, respectively, but other types of eye lines or representations illustrating a line of sight are also possible in various implementations. Each of the user eye line 1206 and avatar eye line 1228 may correspond to respective planes (not shown) that encompass the corresponding eye line and that are parallel to the ground plane 1214. One or both of the user eye line 1206 and the avatar eye line 1228 may be parallel to the ground plane 1214.

To determine the size of the avatar, the wearable system (such as, e.g., the avatar autoscaler 692 in the avatar processing and rendering system 690) can calculate a height of the viewer 914 and a height 1224 of the avatar 1000. The avatar's height and the viewer's height can be measured from the avatar and the user's respective eye lines vertically to the ground surface 1214 on which the avatar is rendered and on which the viewer stands. As illustrated in FIG. 12A, an avatar eye height 1224 may be determined between the avatar eye line 1228 and the ground position line 1210. Similarly, a user eye height 1202 may be determined between the user eye line 1206 and the ground position line 1210. The user eye height 1202 intersects the user's 914 eye as illustrated in FIG. 12A, however, in other implementations, the user (or avatar) height may be referenced to the top of the user's (or avatar's) head or some other convenient reference position.

In certain implementations, the system may be configured to determine a distance 1242 between the user 914 and the rendering position of the virtual avatar 1000. The distance 1242 may be used to display the virtual avatar 1000 at a more comfortable position or apparent depth for the user 914. For example, the wearable system may increase the size of the avatar if the avatar is relatively far away from the viewer so that the viewer may have a better view of the avatar.

In the example shown in FIG. 12A, the avatar 1000 is not properly sized because the user eye line 1206 is not collinearly aligned with an avatar eye line 1228, since the avatar eye line 1228 is lower than the user eye line 1206. This suggests that the avatar 1000 is too small, causing Bob to tilt his head downward to interact with Alice's avatar. Although this shows that the avatar is shorter than the viewer, the avatar size may also be improper if the avatar is taller than the viewer, which would cause Bob to tilt his head upward to interact with Alice's avatar.

FIG. 12B shows a virtual avatar 1000 whose size is properly rendered relative to Bob in the sense that their respective eye heights are comparable. In this example, the virtual avatar 1000 is scaled based on the viewer 914's eye height. Scaling the virtual avatar 1000 may include matching the avatar eye height 1224 and the user eye height 1202.

Examples of Analyzing Contextual Factors for Selection of Avatar Characteristics As described herein, the wearable system 200 can be configured to automatically identify contextual factors to calculate a target height for a virtual avatar for spawning the virtual avatar or for dynamically adjusting the size of the virtual avatar in real-time.

Figure 13:
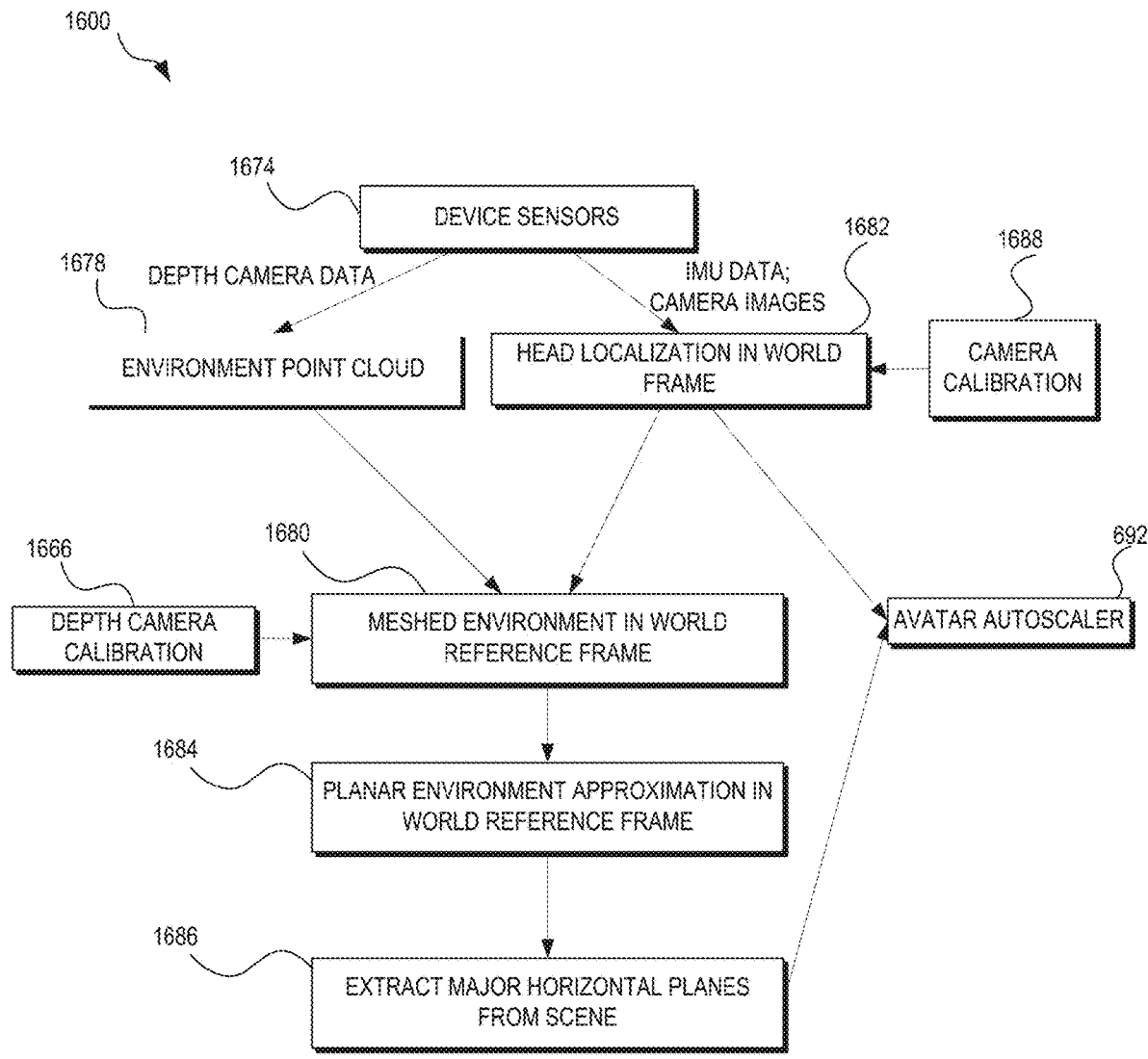
FIG. 13 illustrates an example data flow diagrams for automatically scaling the avatar based on contextual factors.

FIG. 13 illustrate an example data flow diagrams for automatically scaling the avatar based on contextual factors. Some example contextual factors can include the user's head position, a rendering location of the avatar, a user's body position (e.g., the user's foot position), heights of surfaces the user and the avatar are positioned on (or a relative height difference between them), etc. The example data flow diagram 1600 can be implemented by the wearable system 200 described herein, for example, by the avatar autoscaler 692 of the avatar processing and rendering system 690 of FIG. 6B.

The wearable system can include one or more device sensors 1674, such as those described with reference to FIGS. 2 and 3. The data acquired from the device sensors 1674 can be used to determine the environment of the user (such as e.g., to identify objects in the user's environment or to detect surfaces in the user's environment) as well as to determine the user's position with respect to the environment.

For example, the IMUs can acquire user data such as, e.g., the user's head pose or body movements. The outward-facing imaging system 464 can acquire images of the user's environment. The data from the IMUs and the outward-facing imaging system 464 may be an input for determining head position. The wearable system can detect a position, orientation, or movement of the head with respect to a reference frame associated with the user's environment (also referred to as a world frame). The reference frame may be a set of map points based on which the wearable system can translate the movement of the user to an action or command. In some implementations, camera calibration 1688 may be performed for determining the head localization 1682 in the world frame. The camera calibration 1688 may result in a mapping of a user's head pose as determined from the IMUs (or other hardware sensors of a wearable device) to a head location in the world frame. As further described with reference to the avatar autoscaler 692, such head localization 1682 in the world frame can be fed into the avatar autoscaler 692 and can be utilized as an input for determining a user's head position 1604 for automatically scaling an avatar.

The device sensors can include one or more depth sensors 234 (e.g., lidar, time of flight sensors, or ultrasound sensors), or world cameras (which may be part of the outward-facing imaging system 464) where the world cameras have depth sensing ability (e.g., an RGB-D camera). For example, a depth sensor can acquire depth data of objects in the environment, such as, for example, how far away the objects are from the user. The depth data can be used to create an environment point cloud 1678 which can comprise 3D mathematical representations of the user's environment (which may take into account objects in the user's environment). This environment point cloud 1678 may be stored in (or accessed from) the map database 710 shown in FIG. 7.

The wearable system can identify major horizontal planes (such as, e.g., tabletops, grounds, walls, chair surfaces, platforms, etc.) based on the environment point cloud 1678. The major horizontal planes can include environment surfaces on which the user or the avatar may be positioned.

The wearable system can convert the point cloud to a meshed environment, such as, e.g., a polygon (e.g., triangle) mesh, and extract major horizontal planes from the mesh. In certain implementations, the wearable system can estimate planes directly from the point cloud without converting the cloud of points to a mesh. As an example of estimating planes directly from the point cloud, the wearable system can determine one or more depth points based on images acquired by the outward-facing imaging system alone or in combination with the depth sensors. The depth points may be mapped by the system onto a world reference frame (for representing the user's environment). The depth points may correspond to one or more points in the environment of the user. The wearable system may be configured to extract one or more surfaces from the one or more depth points. The one or more surfaces extracted from the depth point(s) may include one or more triangles. Vertices of each of the one or more triangles may comprise neighboring depth points.

As shown in FIG. 13, with depth camera calibration 1688 the wearable system can convert this point cloud 1678 into meshed environment in a world reference frame (which can be used for head localization in block 1682) as shown in the block 1680. Depth camera calibration can include information on how to relate the positions of the point cloud obtained from the depth camera to positions in the wearable's frame of reference or the environment's frame of reference. Depth camera calibration may be advantageous, because it can permit locating the points in the same reference frame as the environment and camera frames, so that the wearable system knows where those points are located in the working coordinate system.

The meshed environment may be a 3D meshed environment. The meshed environment may comprise one or more surface triangles. Each surface triangle may comprise vertices corresponding to adjacent depth points. The wearable system can be configured to construct a signed distance field function from the point cloud and use a triangulation algorithm, such as, e.g., the Marching Cubes algorithm to convert the point cloud into a surface representation of triangles, such as a polygon (e.g., triangle) mesh. In some embodiments, the surface representation can be determined directly from the point cloud rather than from the meshed environment.

At block 1684 the wearable system can approximate a planar environment in a world reference frame, which may include plane extractions from the mesh. Plane extractions can group the triangles into areas of similar orientation. Further processing can be done of these meshed areas (as identified from plane extractions) to extract pure planar regions representing flat areas in the environment.

At block 1686, the wearable system can perform further processing to extract major horizontal planes from the environment. The wearable system may be configured to determine major horizontal planes based on the orientation, size, or shape of the surfaces from the regions identified from block 1684. For example, the wearable system can identify horizontal surfaces that are large enough to allow a user or an avatar to stand on as the major horizontal planes. In some implementations, the wearable system can identify a major horizontal plane by finding a first intersection point of a ray with a physical horizontal surface whose normal at the intersection point is closely aligned to the gravity vector (which can be determined by an IMU on the wearable system).

Examples of Decomposing a User Interaction

Figure 14:
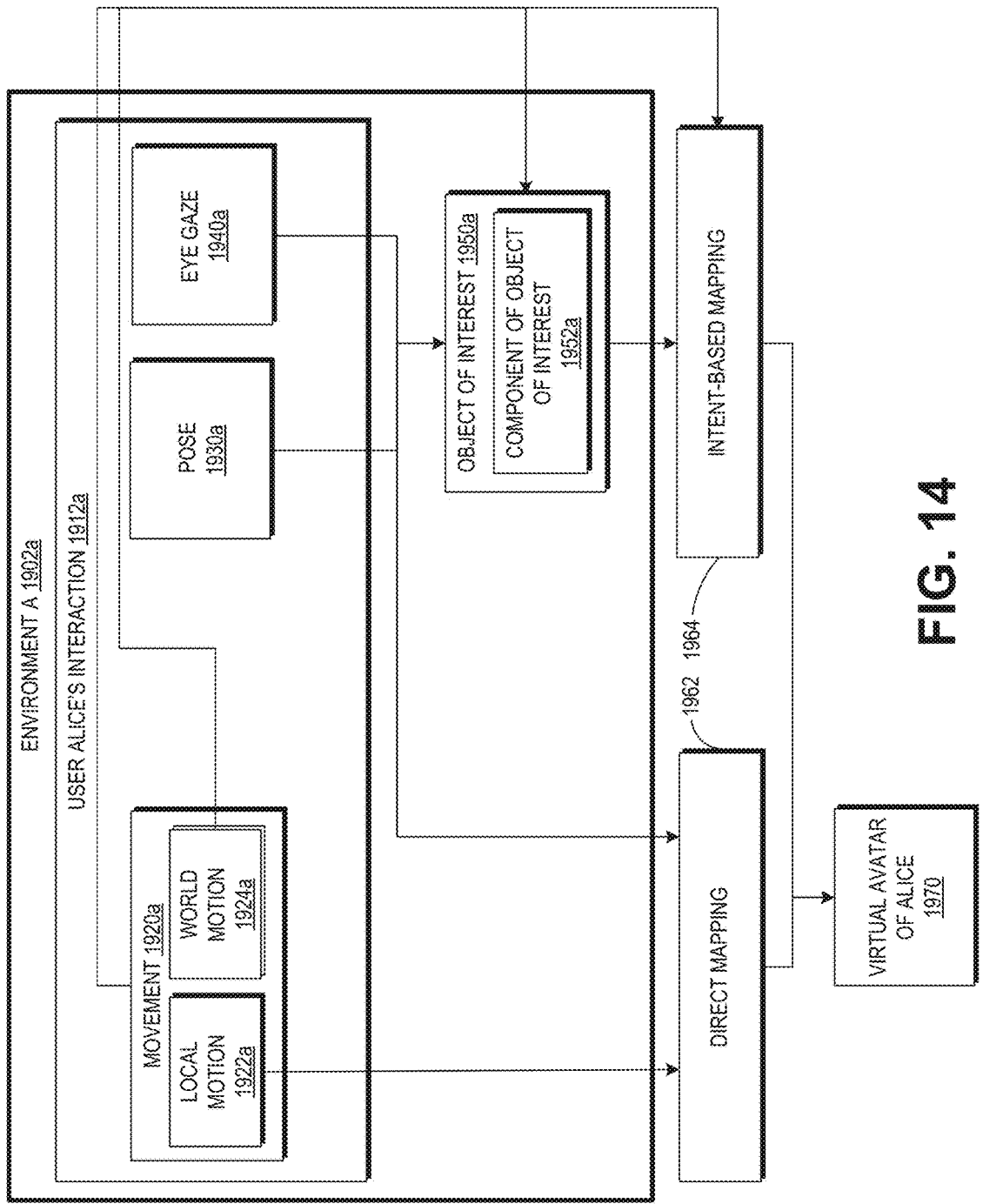
FIG. 14 describes an example of a system for decomposing a user interaction.

FIG. 14 describes an example of a system for decomposing a user interaction. In this example, Alice can be in an environment A 1902*a*. Alice can be a user of the wearable system 200, through which Alice can have a mixed reality experience with her environment A 1902*a*. Alice can perform various interactions 1912*a* which may be mapped to an avatar in a remote environment. An interaction 1912*a* of Alice can comprise a movement, pose (e.g., head pose, body pose or hand gesture, etc.), eye gaze, and so on, alone or in combination. In some situations, one or more of these interactions 1912*a* may also be referred to as an interaction event.

The wearable system can acquire data using device sensors described with reference to FIGS. 2 and 3. Data acquired by the device sensors can be used to determine the user's interactions. Based on the data, the wearable system can determine the characteristics of the interaction 1912*a*, such as, e.g., the object of interest (also referred to as item of interest or IOI for short) which may be an object which the user is interacting with or is interested in, the type of the interaction (e.g., whether a user is walking, sitting, standing, etc.), and so on. Based on the characteristics of the interaction 1912*a* alone or in combination with the data acquired from the device sensors, the wearable system can determine whether the interaction 1912*a* comprises a world component and/or a local component.

As illustrated in FIG. 14, the movement 1920*a* can be decomposed into a local motion 1922*a* and/or a world motion 1924*a*. The local motion 1922*a* can include a motion with respect to the fixed-body reference frame and may not interact with the environment A 1902*a*. The world motion 1924*a* can include a motion which involves an interaction with the environment A 1902*a*. Such world motion 1924*a* can be described with respect to the world frame. For example, Alice may be running in her environment. The arm movements may be considered as local motion 1922*a* while the leg movements (e.g., moving forward toward a direction in the environment) may be considered as world motion 1924*a*. As another example, Alice may be sitting on the chair with her legs crossed. The pose sitting with legs crossed is considered as a local component, while the interaction of sitting on the chair is considered as a world component. The wearable system of the viewer of Alice's avatar can render Alice's avatar sitting on a bed with legs crossed (if the remote environment does not have a chair).

The interactions 1912*a* can sometimes also involve interacting with an object of interest, such as, e.g., a physical object (e.g., a chair, table, a bed, a mirror, etc.) or a virtual object (e.g., another user's avatar, a virtual entertainment content, or other virtual applications) in the environment. Based on data acquired from the device sensors, the wearable system can identify an object of interest 1950*a* associated with the user Alice's 912 interaction. For example, the object of interest 1950*a* can be identified from Alice's movement 1920*a*, pose 1930*a*, eye gaze 1940*a*, individually or in combination.

As further described herein, in certain implementations, the object of interest 1950*a* may include a component which attracts the user's attention. As described above, the eyes of a user are typically directed toward a region called the social triangle of the other user's face during friendly, neutral conversation. The social triangle is formed with a first side on a line between the user's eyes and a vertex at the user's mouth. The object of interest 1950*a* may include the social triangle. For example, Alice may look at the social triangle on Bob's face because humans tend to naturally looking at another's personal social triangle during a face-to-face conversation. The interactions with the object of interest can be considered as world components because they involve interacting with virtual or physical objects in the environment.

The wearable system can map the local component of an interaction 1912*a* to the virtual avatar 1970 using direct mapping 1962. For example, the wearable system can map the local motion 1922*a*, the pose 1930*a*, or the eye gaze 1940*a* into an action of the avatar 1970 using direct mapping 1962. As a result, the avatar's 1970 action can reflect the corresponding local component of the interaction 1912*a* performed by the Alice (e.g., an avatar nods her head when Alice nods her head).

The wearable system can map the world component of an interaction 1912*a* using intent-based mapping 1964. As a result of the intent-based mapping 1964, the action of the avatar 1970 achieves the same purpose as the corresponding interaction 1912*a* performed by the Alice, even though the action of the avatar 1970 may not be exactly the same as that of Alice. For example, the wearable system can map the world motion 1924*a* to the avatar 1970 based on environment features (such as, e.g., obstacles, layout of objects, etc.) in the environment in which the avatar 1970 is rendered. As another example, the wearable system can move or reorient the virtual avatar 1970 in the remote environment such that the virtual avatar 1970 interacts with a similar object of interest 1950 in the remote environment.

In certain implementations, by decomposing the user interaction into a world component and a local component, the techniques provided herein can provide an improved wearable device, by enabling faster processing, reducing storage requirements, and improving latency. For example, the technique does not require the entire animated avatar's geometry or the entire user's motion to be sent across to Bob's wearable device in the environment B 1902. Alice's wearable device can send a subset of the sensor data that can be used to animate the avatar locally at Bob's wearable device, and thus Alice's device does not have to keep on sending geometry and animation updates for the entire avatar. Since the data sent by Alice's wearable device may be sparse, Bob's wearable device can update more frequently to get more responsive avatar animation.

Figure 15:
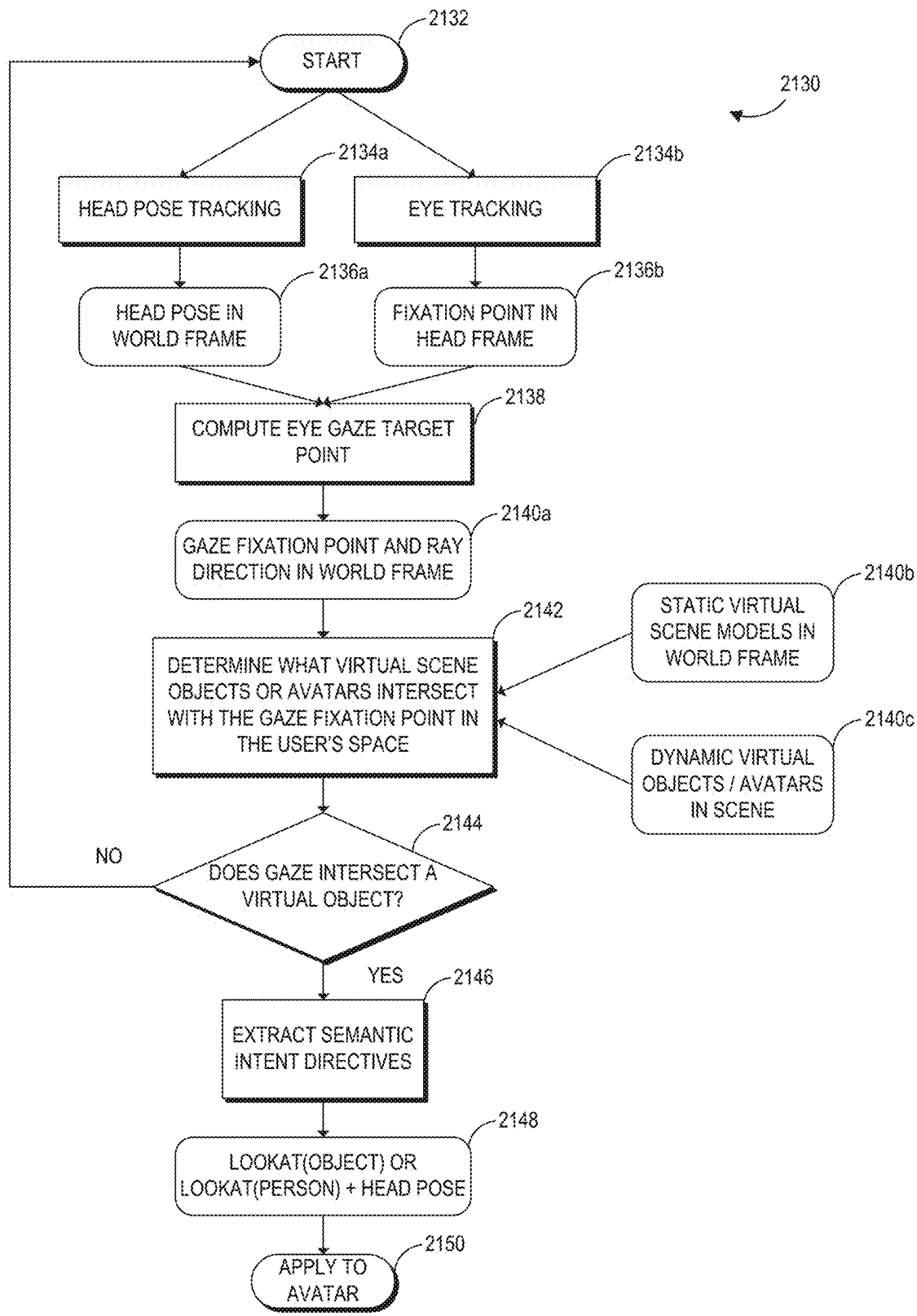
FIG. 15 illustrates an example process for determining intent based on head pose tracking and eye gaze tracking.

Example Processes of Intent Based Rendering for Interactions with a Virtual Object Based on Head Pose and Eye Gaze Tracking FIG. 15 illustrates an example process for determining intent based on head pose tracking and eye gaze tracking. The process 2130 shown in FIG. 15 can be applied to determine Alice's intent by mapping Alice's interaction in Alice's environment (also referred to as environment A in FIGS. 20-21C) to Alice's avatar rendered in Bob's environment (also referred to as environment B in FIGS. 20-21C). The process 2130 can be performed by Alice's wearable device 902, a remote computing system 920, individually or in combination. The process 2130 can also be implemented as part of the intent mapping system 694 shown in FIG. 6B.

The process 2130 starts off at 2132 with head pose tracking 2134*a*, which can track Alice's head movement data. Various techniques may be used for tracking head pose. For example, Alice's wearable device 902 can employ a combination of IMUS and cameras (e.g., cameras in the outward-facing imaging system 464 or the inward-facing imaging system 462) to record rotational and translational motion of Alice. The movement data recorded by the wearable device 902 can be used to extract features in the environment A for estimating the head pose with respect to a world frame (shown as data block 2136*a*) associated with the environment A.

The wearable device 902 can also perform eye tracking 2134b to obtain a fixation point (point of focus) of the eyes in Alice's field of view in a head frame (as indicated in the data block 2136b, where the head frame is associated with a coordinate system local to Alice).

At block 2138, an eye gaze target point can be calculated based on a combination of the fixation point and the head pose. The result obtained from the computation in block 2138 can include the gaze fixation point with respect to the world frame and ray direction in the word frame (shown in the data block 2140a).

Based on the head pose and eye gaze, static virtual scene models in the world frame 2140b (which may describe static virtual objects in the environment A), and dynamic virtual objects (which may include avatars) in the scene 2140c (which may include virtual objects that are fixed at a given position or orientation in the environment A) can be used, at block 2142, to determine what virtual objects in the scene intersect with the gaze fixation point in the local space. For example, the wearable device 902 can perform a ray casting by casting a ray vector from the eyes to this fixation point. This ray vector can be used to determine what Alice is looking at in her field of view as perceived through the wearable device 902.

There may be three basic possibilities for things that Alice could be looking at. First, Alice could be looking at a physical object in her environment, such as, e.g., a chair or lamp. Second, Alice could be looking at a virtual object rendered in her AR/MR environment by the display 220 of her wearable device 902. Third, Alice could be looking at nothing in particular, such as, e.g., when lost in thought or thinking about something.

At block 2144, the wearable system can determine whether the gaze intersects with a virtual object, and if so, a different head pose for Alice's avatar may need to be computed if the objects are in a different relative position from Alice's avatar's perspective (as compared to Alice's perspective). If not, the process 2130 goes back to the start block 2132. In certain implementations, the virtual object as determined from block 2144 can be an object of interest.

At block 2146, the wearable system can extract semantic intent directives, such as interacting with a certain object. For example, the wearable system can determine an interaction with the object as intended by the user, such as, e.g., moving the object, staring at the object, modifying the object, talking to a virtual avatar of Bob, etc.

The intent of interacting with an object (or a person as determined from interacting with his avatar) and the head pose can be communicated to Bob's wearable device which can map Alice's head pose to Alice's avatar (as rendered by Bob's wearable device) based on the intent.

Algorithm (i) below describes an example pseudocode implementation of the process 2130 in FIG. 15.

Algorithm (i)

Given head pose H_W in a world coordinate frame W, and eye fixation point F_H in the head frame H.

Let P be the set of real physical objects in a user's immediate surroundings

Let S be the set of 3-D static virtual objects rendered in the scene via the wearable display.

Let D be the set of dynamic 3D virtual objects such as other avatars or moving objects.

From H_W, and f_H,

Let f_W=f_H H_W
represent the 3-D fixation point F_W with respect to the world frame W,
and H_W is a 4×4 transformation matrices representing a coordinate frame.

Let e_H represent a reference point between the eyes of the head in the head frame H.

Let e_W=e_H H_W be the point e_H expressed in the world frame W.

Let g_W=f_W−e_W be a gaze direction ray pointing in the direction of the line of sight of the head looking towards the fixation point f_W and originating at e_W.

The ray can be parameterized as g_W(t)=e_W+t(f_W−e_W), t is in [0, infinity], represents an infinite ray with t=0 corresponding to the point e_W and t=1 representing the fixation point f_W on this ray.

For g_W, test intersection of this ray against P, S and D. Select the object O in the union of P, S, D, that intersects at the smallest value of t. This coincides with the closest object among P, S, D that intersects the ray g_W(t).

Let I_avatar be the set of intents for sending to a remote device for controlling the avatar.

Let H_avatar be the current head pose for sending a remote device for controlling the avatar.

If O is a member of S (static virtual objects), add the intent lookat(S) to I_avatar.

If O is a member of D (dynamic virtual objects), add the intent lookat(D) to I_avatar.

Set H_avatar=H_W.

The output is the set of I_avatar and H_avatar.

The output I_avatar and H_avatar can be communicated to Bob's wearable device for rendering Alice's avatar based on intent as shown in the block 2150.

During an avatar control session (such as, e.g., during a telepresence session or during an interaction between a viewer and an avatar), the wearable device A can update Alice's avatar by sending the current head pose at regular, periodic, or irregular time intervals to the wearable device B. From Algorithm (i), the wearable device A can pass a set of intents (I_avatar), and the current head pose of Alice (H_avatar) to the wearable device B. To determine a baseline head pose (H_baseline) to be used in animating Alice's avatar by wearable device B, the wearable device perform the calculations in the paragraph immediately below this paragraph.

For the first time sample, a baseline head pose is defined as: H_baseline=H_avatar. If I_avatar is set, H_baseline is computed to be the pose which the avatar's head points towards the object S for the intent (lookat(S)) in Bob's local space. Note that the location of S in Alice's local space may not be the same as the location of S in Bob's local space. However, by sending the intent I_avatar=lookat(S), the wearable device B can compute head pose to maintain this intent of directing the head towards S in the avatar's remote environment. For every frame of image acquired by the wearable device A, the wearable device B can compute the final avatar's head pose, H_final by setting it initially to H_baseline and adding on the relative pose (H_relative) between H_baseline and H_avatar. The result is that the intent (lookat(O)) is preserved between the local user in his environment and the remote avatar looking at the same object or avatar O in the remote environment of the avatar.

Examples of Avatar Rendering Based on Environmental Stimuli

Systems and methods disclosed herein can render an avatar so that the avatar appears more real and lifelike to a user of a mixed reality system. Objects in the environment of a user can be categorized as real or virtual, and the wearable system can be configured such that the avatar interacts and makes decisions in that mixed reality environment. The avatar can be rendered so that the avatar gives an appearance of agency, presence, or naturalness to a user. The agency may be an attribute of the virtual avatar. When the agency is enabled for the virtual avatar, the virtual avatar can appear to act of its own accord (e.g., the avatar may appear to make its own decisions about what it finds interesting). The wearable system can create the appearance of agency for the virtual avatar (e.g., by images or animations of the virtual avatar). For example, to provide the appearance of agency, the wearable system can cause the avatar to automatically respond to an event or a stimulus in the viewer's environment, and to produce a particular effect or result as if the avatar were human. The agency can be determined by one or more contextual factors, such as, e.g., the environment of the virtual avatar, interactions of the viewer in the environment, and objects in the environment. In certain implementations, the contextual factors can also include characteristics of the avatar, such as, e.g., the avatar's beliefs, desires, and intentions. By rendering the avatar as more natural and lifelike, the user of the wearable system will be less likely to experience uncanny, eerie, or unpleasant feelings when interacting with the avatar. For example, the avatar can be rendered so as to reduce the likelihood of entering the so-called uncanny valley, which represents a dip in human emotional response to an avatar that is almost, but not quite, human in its interactions.

In some implementations, a level of realism of the avatar may be determined and/or dynamically adjusted based on a context of the avatar. The "context" associated with an avatar, a group of avatar, and/or a virtual environment, may include a type or characteristics of the user device, environmental characteristics of the augmented reality scene (e.g., lighting conditions in the area where the avatar is rendered), accuracy of the eye tracking system (e.g., implemented by the user device), and/or any other factors associated with the augmented reality session. Thus, the level of realism of an avatar (and/or a particular avatar) may be selected based on these or other context factors to select a level of realism for an avatar, which may optimize ability of the avatar's gaze to be accurately discerned by users.

In addition to or as an alternative to animating a virtual avatar based on virtual objects that are shared between two users, the wearable system can also animate the avatar based on the environment that the avatar is rendered in. The wearable system can make a virtual avatar appear lifelike by enabling a virtual avatar to make natural, human-like decisions to react to the mixed reality environment in which it is rendered in, which can give the virtual avatar an appearance of agency and presence. For example, the wearable system (e.g., via the stimuli response system 696) can automatically identify certain categories of environmental objects or environmental stimuli (referred to herein as interesting impulses) to which the avatar might react to, and automatically adjust the avatar's interaction with the viewer's environment based on the interesting impulses in the viewer's environment. Interesting impulses may be visual or audio stimuli (e.g., a movement, an appearance, or a sound) in the environment which can attract an avatar's attention. As further described with reference to FIG. 16, interesting impulses may be associated with an object of interest, an area of interest, a sound, a component of an object of interest, or other contextual factors of the viewer environment. The interesting impulses may be associated with a virtual or physical object, as well as a virtual or physical environment in which the virtual avatar is rendered.

The wearable system can execute the avatar's decision to interact with the interesting impulses in a manner to maintain the naturalness of the virtual avatar.

For example, when there is a sound of an explosion in the viewer's environment, the wearable system can render the virtual avatar as running away from the source of the explosion (as if the virtual avatar is human). As another example, the virtual avatar may shift the eye gaze vector (which can include a gaze point and a direction of gaze) of the avatar within the social triangle of a user or person's face while talking to that person, which encourages more natural and non-threatening human-like interactions between the person and the avatar. As yet another example, the virtual avatar may lose interest after looking at an object for an extended period of time. Thus, the virtual avatar may identify another interesting impulse and moves its attention from the previous object to the other interesting impulse, which again is more typical of natural human-like behavior.

Examples of Interesting Impulses in an Environment

The wearable system 200 (e.g., the stimuli response system 696) can model a viewer's environment and categorize objects (e.g., real, or virtual objects) to identify interesting impulses. An interesting impulse can have values for representing its inherent interestingness, which may decay or grow based on contextual factors, such as time elapsed, changes in objects or the environment (which may include changes in the object or portion of the environment identified as interesting impulse), or interactions of the human counterpart associated with the avatar. The interestingness value may change continuously or suddenly in response to a triggering event.

Figure 16A:
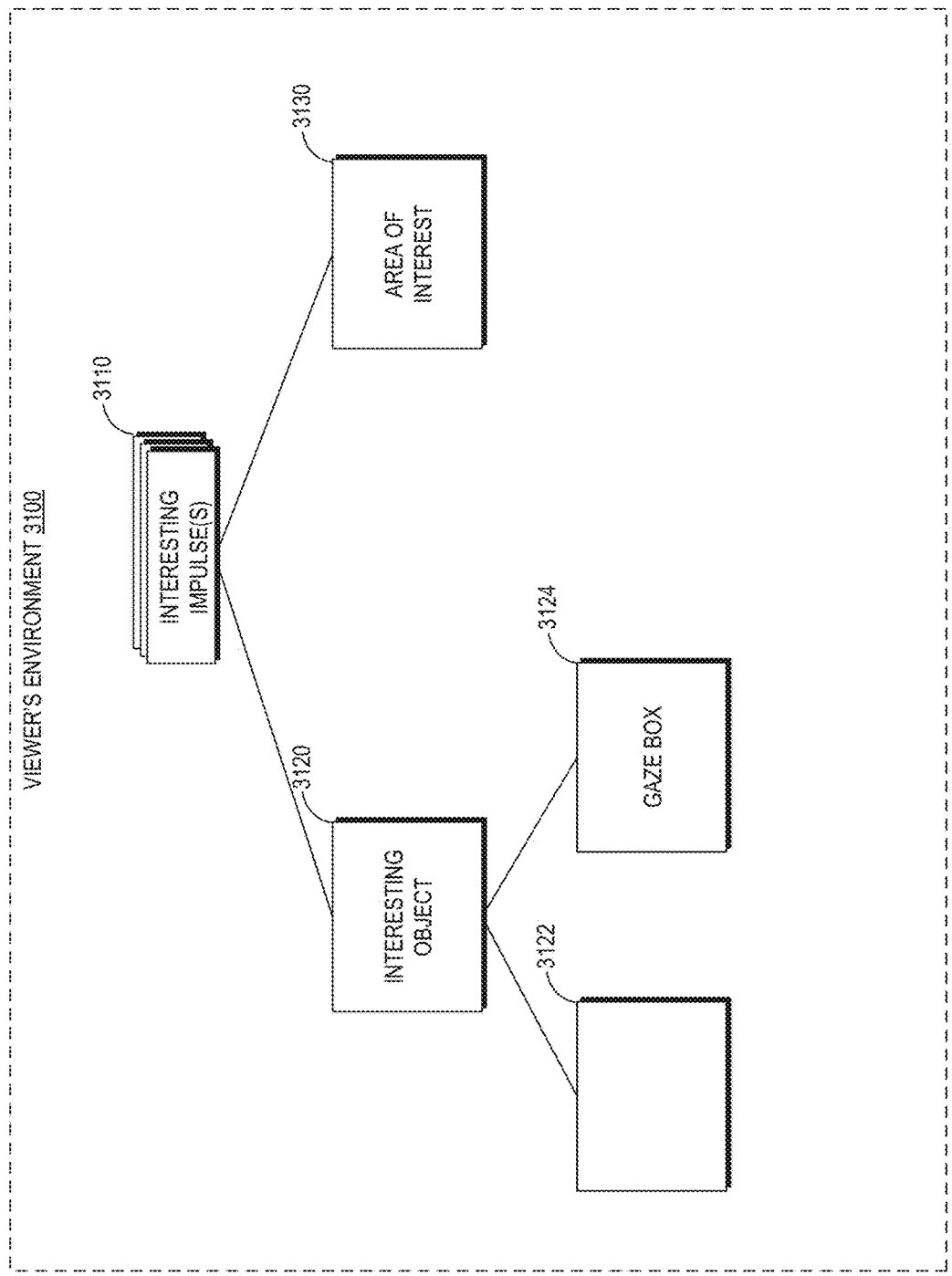

As an example where the interestingness value changes suddenly due to a triggering event, assuming an object of interest is a book, the interestingness value would increase in response to a page change. As an example where the interestingness value changes continuously, an interesting impulse may be represented as a speaker's hand, and as the hand changes shape (e.g., to emphasize a point the speaker is making), the interestingness value may increase continuously. The changes to the interestingness value can include a change in speed or acceleration of the adjustment of the interestingness value. For example, in response to a triggering event on the object of interest, the acceleration or the speed associated with the growth of the interestingness value can suddenly increase. In some implementations, the speed or acceleration of adjustments to the interestingness value may remain constant. For example, the interestingness value can decay at a constant speed with the passage of time. FIGS. 16A-16C illustrates examples of categorization of the types of interesting impulses in a viewer's environment. In FIG. 16A, the viewer's environment can include a variety of interesting impulse(s) 3110. An interesting impulse 3110 may be an audio or a visual stimulus. For example, an interesting impulse 3110 may be a viewer's movement or a noise in the environment 3100.

As illustrated in FIG. 16A, the interesting impulse 3110 can include an interesting object 3120 or an area of interest 3130. The interesting object may be an example of the object of interest. In certain implementations, the interesting object can be a portion of the object of interest toward which the avatar looks. As will be further described below, the interesting object can be described as a polygonal structure for holding saccade points (which can be associated with the points of interest during saccadic eye movements, which are quick, simultaneous movements of both eyes between two or more phases of fixation in the same direction). An example interesting object 3120 can be a social triangle 3122, which can describe a region of a face that a person (or an avatar) focuses on during a conversation. FIG. 16B described below illustrates an example social triangle.

Another example interesting object 3120 may be a gaze box 3114 (also shown in FIG. 16B) which can be associated with the region of an object or another person that a person (or an avatar) focuses on (e.g., gazes at) during an interaction with the environment or the object of interest.

FIG. 16B illustrates an example social triangle 3112. The social triangle 3112 shown in FIG. 16B schematically illustrates a portion of a human face that people tend to focus on in a conversation. In the example in FIG. 16B, the social triangle 3112 is a triangle that covers the eyes from slightly over the eyebrow down to the mouth of a person.

The social triangle 3112 can have a variety of parameters such as, e.g., size, shape, boundary, area, etc. A boundary of the social triangle can constrain the saccade points during a saccadic eye movement of a second person (or an avatar) such that a saccade point at a given time does not land outside of the boundary of the social triangle of the first person. Thus, the saccade points of the eyes of the avatar looking at the person having the social triangle 3112 tend to be clustered within the social triangle 3112 and tend not to fall outside of the social triangle. The saccade points may be used by the wearable system to determine the avatar's eye gaze vector at a given time. As described herein, the saccadic movements may involve randomly placed saccade points which may cause the avatar's eye gaze vector to shift randomly within the social triangle 3112. The eye gaze vector can also move along a trajectory within the social triangle 3112 when animating the avatar's eye gaze. For example, the eye gaze vector may first land on a point of the nose, then move to a point on the left eye, and further move to a point on the right eye, etc.

In some implementations, properties of virtual avatars are selected without testing how the properties affect the accuracy with which a user can judge the direction of a virtual avatar's gaze. Yet, these properties (e.g., virtual human photorealism, properties of the virtual human eye and eye movements, lighting, etc.) can have a significant effect on how well a user can judge the virtual avatar's gaze direction. Accurate judgements of gaze direction may be important for nonverbal communication, for example. As discussed further below, the level of photorealism of an avatar may be selected based on various context factors developed based on evaluation how various characteristics of the virtual avatar affect users' perceptions of the virtual avatar's gaze in an immersive reality environment. As discussed further below, an evaluation paradigm can serve to inform the selection/design of optimal properties, or combination of properties, of the virtual avatar for a particular context and/or user.

In certain implementations, possible saccade points can be kept in a data structure such as, e.g., a query-able database constructed from presence of virtual or physical objects in the user's environment. The possible saccade points may comprise the sum of visible spaces of interesting objects (e.g., saccade points within social triangles or gaze boxes). The query-able database may be part of the map database 710 shown in FIG. 7. The query-able database can also store other information, such as, e.g., information related to interesting objects (e.g., social triangles or gaze boxes), interesting impulses, etc., such that the wearable system can use the information to determine the eye gaze of the virtual avatar. The wearable system can automatically select (e.g., either randomly or following a defined sequence) saccade points of an interesting object by querying the query-able database. In certain implementations, the frequency of selections of saccade points can be associated with the interestingness value of the target interesting object. For example, a higher interestingness value may cause the frequency of selections to increase, and a lower interestingness value may cause the frequency of selections to decrease.

To randomly select the saccade points, the wearable system can make use of a variety of probabilistic models. For example, the wearable system can select another saccade point from a normal distribution around the current saccade point (e.g., a saccade point of which an avatar's eye gaze vector is currently placed) within an interesting object. As another example, the wearable system can use a distribution function specified in a texture channel and applied to the interesting object as a texture map. For example, where the virtual avatar is looking at a painting, the painting may have some parts that are more interesting to the human eyes than other parts. A texture map can be created to reflect that some parts are more interesting than others on an object. The texture map may have attributes similar to a heat map where brighter portions (e.g., portions with a higher interestingness value) of the texture map represent more interesting portions and darker portions represent less interesting portions (e.g., portions with a lower interestingness value). These maps may be defined by programmers or users, e.g., by manually inputting or indicating a region of interest. These maps can be created from eye tracking systems such as, e.g., based on the data acquired by cameras in the inward-facing imaging system 466. For example, the wearable system can track the duration and positions of the viewer's eye gaze vector at a location of an object. The wearable system can identify the more interesting region as the region that has a higher density of points associated with eye gaze vectors or when the eye gaze vectors stays at the region (or points) for a longer duration of time, and vice versa. Alternatively, a user's personality, temperament, profile, or other attribute could at least partially define the texture map. For example, if a user is characterized as liking dogs and there is a dog in the painting, that portion of the painting would increase its interestingness value.

One or more of the parameters of the social triangle may be configurable. The parameters of the social triangle may be configured by a viewer of the avatar or may be preprogrammed into the wearable system. For example, in various embodiments, the boundary of the social triangle may be configured by the wearable system to include less or more area than the social triangle 3112 shown in FIG. 16B. As another, example, a viewer of the wearable system can specify a size of the social triangle, and the wearable system can determine a region of the face that meets the specified size as the social triangle (such as, e.g., by placing the triangle on the face such that the eyes, nose, or mouth fit within it). In certain implementation, the parameters of the social triangle may change based on the orientation or position of the face. For example, the social triangle 3212*a* (shown in FIG. 17) has a smaller area as the social triangle 3212*d* (also shown in FIG. 17) because the avatar (not shown in FIG. 17) can perceive the side of the person's 3210*a* face (which has fewer facial features) but perceive the front of the person's 3212*d* face (which has more facial features). Further, although the word "social triangle" is used in the disclosure (because this term is the conventional usage), the shape of the region represented by the social triangle need not be strictly triangular and can be any type of polygon (e.g., quadrilateral, pentagon, hexagon, etc.), convex planar shape (e.g., circle, ellipse, or oval), or a 3D shape.

In some situations, a portion of the face may be occluded, such that a person or an avatar may not be able to directly observe that portion of the face. For example, where a viewer is wearing the wearable device described herein, the head-mounted display may occlude the viewer's eyes and a portion of the viewer's nose. As a result, the saccadic points associated with the viewer's social triangle may land on a portion of the surface of the head-mounted display rather than on the viewer's eye region.

Figure 17:
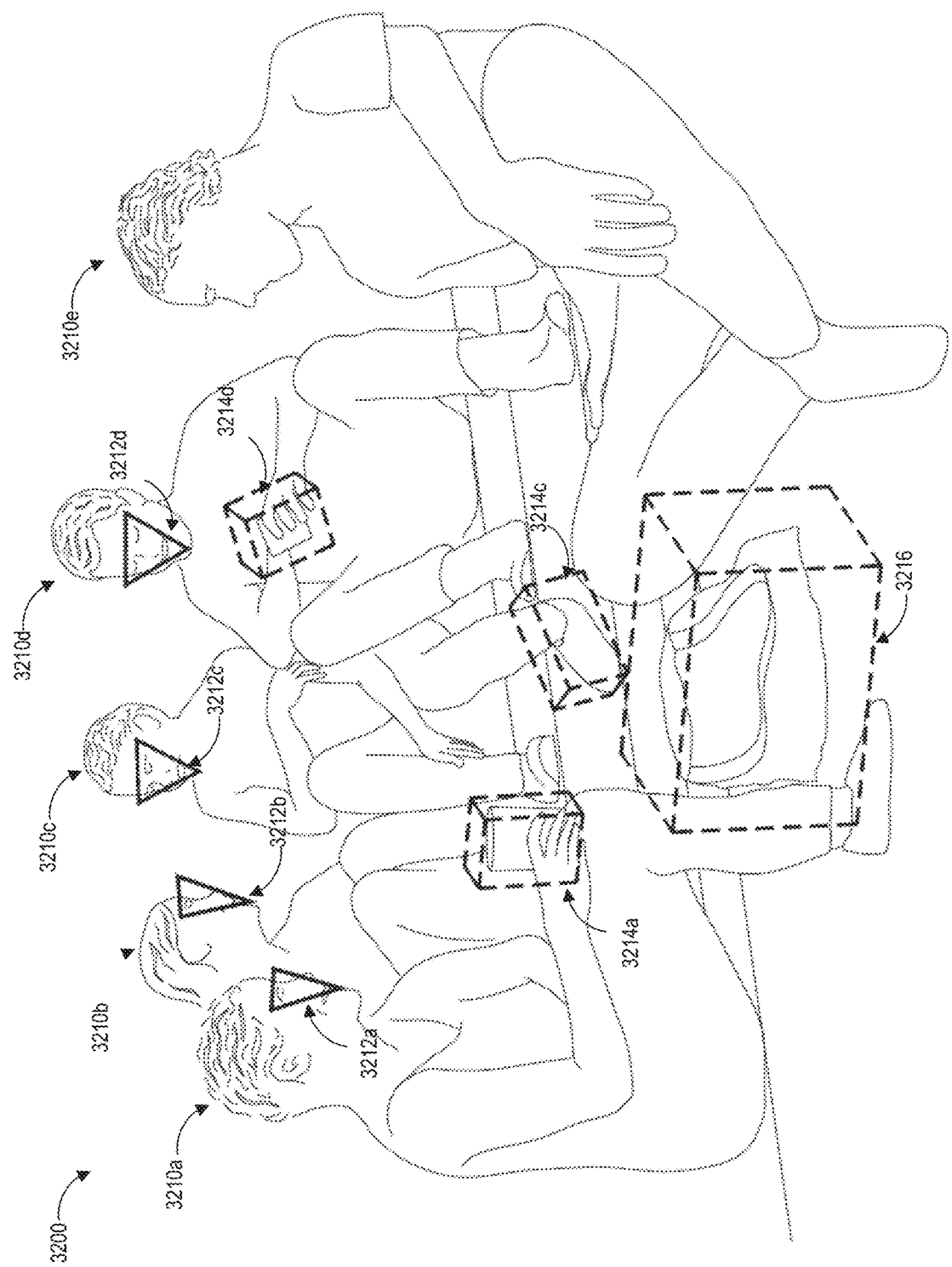
FIG. 17 illustrates an example of generating interesting impulses based on real world stimuli.

FIG. 16B also illustrates an example of a gaze box 3114 which can include a 3D space which can capture the saccade points while a person is looking at an object. In this example, the gaze box 3114 is represented by a 6-sided rectangular cuboid gaze surface associated with the saccade points. It has a width (represented by "W"), a height (represented by "H"), and a depth (represented by "D"). In various implementations, the gaze box 3114 can have other 2D or 3D shapes, other than the cuboid illustrated in FIG. 16B (e.g., the box may be polyhedral). The gaze box 3114 can also include similar parameters as the social triangle. As described herein with reference to social triangles, the parameters of the gaze box 3114 can also be configurable by a viewer or automatically by the wearable system. For example, the boundary of the gaze box or the size of the gaze box may be configured based on the types of objects. For example, as shown in FIG. 17, the gaze box 3216 associated with the backpack is larger than the gaze box 3214a associated with a cup.

As will further be described below, the wearable system can simulate the avatar's interaction with a person or an object based on the interesting object. For example, the wearable system can animate the avatar's eye motion with the saccadic eye movements within the social triangle or gaze box. Thus, rather than focusing the avatar's eye at a particular point on the person or the object, the wearable system can simulate rapid eye movements from one point of interest to another within the interesting object and render the avatar's eye movements similar to human eye movements. Such saccadic movement of the avatar's eyes may not be readily apparent, but since it simulates actual human eye movements, rendering avatar saccadic eye movement can lead to feeling of naturalness when interacting with the avatar, which also moves the interaction out from the uncanny valley.

As described with reference to FIG. 16A, the interesting impulse can also include an area of interest. The area of interest can be a general direction that the avatar is looking at in the viewer's space. It may be represented as a 2D area. However, it may not have a spatial dimensionality, but rather can be the directionality of the interesting impulse from the avatar's point of view. This type of interesting impulse can be useful for representing events in a general area or direction. For example, if a flash of light is detected (e.g., by the viewer's wearable device), the viewer's wearable device can represent the general direction of the light as the area of interest. Advantageously, in some embodiments, this would allow a virtual avatar to look in the direction of the light without committing to an exact position or set of potential saccade points.

Another example of an area of interest can be the general direction of a sound or a noise. FIG. 16C illustrates an example of avatar rendering based on a sound in a viewer's environment. FIG. 16C illustrates two mixed reality (MR) scenes 3150a and 3150b. The two MR scenes may be associated with Alice's environment, where Alice is a human (not shown) who can perceive Bob's avatar 1100 via Alice's wearable device 902. Alice's wearable device 902 may initially render Bob's avatar 1100 as facing west (as shown by the coordinate system 3154) and looking at its feet in the scene 3150a. Alice's wearable device 902) can detect a loud noise 3152 (e.g., via data acquired by the audio sensor 232) in Alice's environment. Without needing to pinpoint the origin of the noise 3152, Alice's wearable device 902 can determine that the noise came from the general direction 3156. The wearable device 902 can accordingly change the avatar's orientation and head pose to react to the noise. As shown in scene 3150b, the wearable device 902 can change the avatar's 1100 orientation from facing west to facing east, and change the head pose or the eye gaze direction of the avatar 1100 to look in the direction 3156, toward the noise 3152.

Because areas of interest may not have a fixed position in the viewer's environment, interesting areas are not required to be in the virtual avatar's visual cone (e.g., when a cone or ray casting is performed from the virtual avatar's perspective) to be eligible for the avatar to respond. Accordingly, as shown in FIG. 16C, the avatar can respond to a sound source coming from behind the avatar. The avatar is not limited to responding to sound sources that are in its field of view.

In addition to or as an alternative to the general direction of a sound or light, an area of interest can also be associated with a memory of previous stimuli such that the avatar may periodically check a region in the environment to determine if the previous stimuli are present. For example, in FIG. 16C, once the sound 3152 fades, the avatar 1100 may go back to its previous pose and orientation as shown in the scene 3150a. Time decay of interesting impulses is described further below. However, the wearable system may render the avatar 1100 as periodically changing its pose or orientation back to the one shown in the scene 3150b to look in the direction of the sound source, even though there may not be a sound in the direction 3156 at that particular time. As another example, the avatar 1100 may initially be looking at an item of interest (such as, e.g., a virtual dog) in the environment. The item of interest may leave the environment (e.g., because the virtual dog has moved to another room). However, the avatar 1100 may occasionally look at the location where the item of interest last appeared and to check to see if the item of interest reappears in the environment. Accordingly, once an item of interest or an interesting impulse has been identified in the environment, after a time delay to represent the decline of interest in the item or impulse, the avatar may be rendered as if it were periodically (or from time to time) checking back on the item or the impulse.

A virtual avatar can also respond to contextual factors, other than the interesting object or the area of interest. A virtual avatar's behavior may change based on the characteristics of the environment the avatar is in. For example, where a virtual avatar is rendered in a conference room environment, the viewer's system may reduce the likelihood or frequencies that the virtual avatar checks on the area of interest associated with past stimuli (e.g., frequent checking may be inappropriate in a work or business environment). However, when the avatar is in a home environment, the virtual avatar may check on the area of interest associated with the past stimuli more frequently. As another example, a virtual avatar may be configured not to respond to certain types of stimuli based on the environment that the virtual avatar is in. Continuing with the same example above, if the virtual avatar is in a conference environment, the viewer's wearable system may be configured such that the virtual avatar is not responding to a ring tone from the wearable device or from another computing device, which indicates the arrival of an electronic message. Accordingly, the frequency for checking may be environmentally-dependent and may be in a range from, e.g., every few to tens of seconds to every few minutes, up to a few times an hour.

Examples of Generating Interesting Impulses in an Environment

A viewer's wearable system can detect the presence of an interesting object 3324 (e.g., FIG. 18) or determine an area of interest 3336 at run time while the avatar is rendered by the wearable system. The wearable system can also generate interesting impulses at run time based on the presence of an interesting object or an area of interest. The generated interesting impulse may cause the avatar to respond to the interesting impulse, e.g., by changing its pose, orientation, eye gaze direction, movement, by speaking, ceasing to speak, and so forth.

The interesting impulse can be tied to virtual or physical stimuli in the viewer's environment. Virtual stimuli can be explicitly tied to objects generated from a content engine that renders virtual content in the environment. As an example, an interesting impulse can be generated in response to a viewer flipping a page of a virtual book. As another example, an interesting impulse can be based on a facial expression (e.g., a smile) or a movement of another virtual avatar rendered in the same environment.

Real world stimuli can be generated based on data acquired by device sensors (such as, e.g., those shown in FIG. 3). The wearable system 200 (e.g., the stimuli response system 696) can analyze data acquired from the device sensors and process the data via detection and classification algorithms (such as those described with reference object recognizers 708 in FIG. 7) to determine the type of events (e.g., the presence of a certain object, a sound, or a light). The wearable system 200 can perform such event detection using the local processing and data module 260, alone or in combination with the remote processing module 270 (or the remote computing system 920). The results of the detection and classification algorithms can then be processed by the wearable system 200 to create interesting impulses. In certain implementations, the interesting impulses may be stored by the wearable system 200 and can be part of the virtual avatar's knowledge base.

FIG. 17 illustrates an example of generating interesting impulses based on real world stimuli. In this figure, a viewer can perceive, via the wearable system, a group of people (persons 3210*a*-3210*e*) in the scene 3200. Examples of interesting impulses from this scene 3200 are the social triangles 3212*a*-3212*d* associated with the respective persons 3210*a*-3210*d*. The wearable system (e.g., the stimuli response system) can detect, e.g., based on one or more object recognizers 708, the presence of the persons 3210*a*-3210*e* in the environment. The one or more object recognizers 708 can employ various face detection algorithms or skeletal inference algorithms for detecting the presence of the persons' 3210*a*-3210*d* faces in the environment. Once detected, the social triangles 3212*a*-3212*d* may be inserted into the virtual avatar's knowledge base so that the wearable system can efficiently access this data. Advantageously, in some embodiments, the wearable system, by rendering the avatar as sharing attention with other humans (and the viewer) in the mixed reality environment, enhances the presence of the virtual avatar and improves the interactive experience between the viewer and the virtual avatar.

Although not shown in FIG. 17, the viewer's social triangle can also be an interesting impulse, e.g., the avatar may want to interact directly with the viewer (e.g., the wearer of the wearable display device). The wearable system can obtain the position and orientation of the viewer's social triangle based on the viewer's head position (e.g., based on data acquired from the outward-facing imaging system 464, the IMUS, etc.). The wearable system can calculate the head pose with respect to a world frame of the user's environment. The wearable system can also track and update the position and orientation of the viewer's social triangle as the viewer moves around in the environment. The viewer's social triangle can also be inserted into the virtual avatar's knowledge base for interactions by the virtual avatar.

In certain implementations, the interestingness of social triangles can be modulated on detected changes in facial expressions. The wearable system can modify the interestingness value associated with a social triangle of a person based on the facial expressions of the person. For example, as the expression on a real world human's face changes from a smile to a frown, the interestingness value of the associated social triangle may rise (due to this change in facial expressions).

The wearable system can also identify new social triangles based on audio data (e.g., data acquired by the audio sensor 232). This can allow the virtual avatar to look at a speaking individual (who might have a larger interestingness value than non-speakers in the environment), which would increase the presence of the virtual character. For example, the wearable system can capture speech via the audio sensor 232 and detect the position of the speaker in the viewer's environment. Based on the position of the speaker, the wearable system can detect a previously undetected social triangle and create a new social triangle associated with the speaker. For example, in FIG. 17, the wearable system did not detect a social triangle for the person 3210*e* (e.g., the person 3210*e* may have entered the scene before the wearable system updates its world map). However, the wearable system may capture speech by the person 3210*e*. This speech data may cause the wearable system to re-analyze the region of the image associated with the person 3210*e* and may accordingly identify a new social triangle (which is associated with the person 3210*e*) in the scene 3200. The wearable system can update its world map to reflect the presence of the person 3210*e* and the social triangle associated with this person. Further, the wearable system may increase the interestingness value associated with the person 3210*e* (or his or her social triangle), because humans tend to be interested in new people who enter an environment and tend to look in their direction.

The wearable system can also increase the interestingness value based on the audio data. For example, the wearable system can increase the interestingness value of a social triangle if the wearable system detects that the person associated with the social triangle is speaking. Alternatively, the wearable system can decrease the interestingness value of a social triangle if the wearable system detects that the person associated with the social triangle is not speaking or has not spoken for a period of time. Advantageously, in some embodiments, by increasing (or decreasing) the interestingness value of the social triangle based on the audio data, the wearable system can advantageously allow a virtual avatar to look at the speaking individual and avoid the interestingness value decay which may cause the virtual avatar to divert its attention to another object with a higher interestingness value.

FIG. 17 also shows a plurality of gaze boxes 3214a, 3214c, 3214d, and 3216. The gaze boxes can be generated for physical objects (such as a backpack and a cup, corresponding to the gaze boxes 3216 and 3214a respectively) or a portion of the physical object (such as the foot or the hands, corresponding to the gaze boxes 3214c and 3214d respectively). The wearable system can identify the physical objects (or a portion thereof) using the object recognizer 708. For example, the object recognizer 708 can include an image classifier which can provide an object's 3D position and boundaries, which can be transformed into gaze boxes. The gaze boxes can also be inserted into the virtual avatar's knowledge base which can later be used to determine the virtual avatar's attention.

The interestingness of the generated gaze boxes can be modulated using the object type (which can be determined by the object recognizer 708, e.g., as semantic information associated with the object) and the personality (or disposition) of the virtual character. For example, a gaze box may be associated with a soda can and the virtual avatar has a thirsty trait. The interestingness value associated with the generated gaze box of the soda can may be increased. However, if the avatar is not thirsty now because the human counterpart just drank water or because the avatar just drank water (as animated in its virtual environment), the interestingness value associated with the soda can's gaze box may decrease. As another example, if an object of interest is a dog and the virtual avatar has a fear of dogs, the interestingness value associated with the dog (or the gaze box of the dog) can increase. In some implementations, as the dog moves closer to the virtual avatar, the amount of increase in the interestingness value may be faster to represent increased fear. The high interestingness value may be cause the virtual avatar to perform a behavior that reflects a natural human interaction with the dog, e.g., to look at the dog or to move away from the dog. Continuing with this example, as the distance between the avatar and the dog increases, the interestingness value associated with the dog may decrease, and when the interestingness value drops below a threshold (which may represent that the dog is no longer a threat to the avatar), the avatar may be rendered so as to stop moving away from the dog. Thus, the increase and decrease of interestingness values associated with objects in the environment permit the wearable system to render avatar behavior that is natural and realistic.

The interestingness values of interesting objects (e.g., gaze boxes or social triangles) can also be modulated based on the attention of the viewer. For example, if the viewer is looking at a gaze box or a social triangle, the interestingness values associated with the gaze box or social triangle may also increase for virtual avatars in the viewer's environment, thereby increasing the likelihood that the avatar will be rendered to also look at the gaze box or social triangle.

Examples of Identifying a Target Interesting Impulse

The wearable system can periodically scan through a knowledge base of interesting impulses and can select a most interesting impulse as the target interesting impulse. Once a target interesting impulse is selected, the wearable system can render the avatar as interacting with the target interesting impulse, such as, e.g., by orienting the avatar as if the avatar were focusing its attention on the target interesting impulse.

Figure 18:
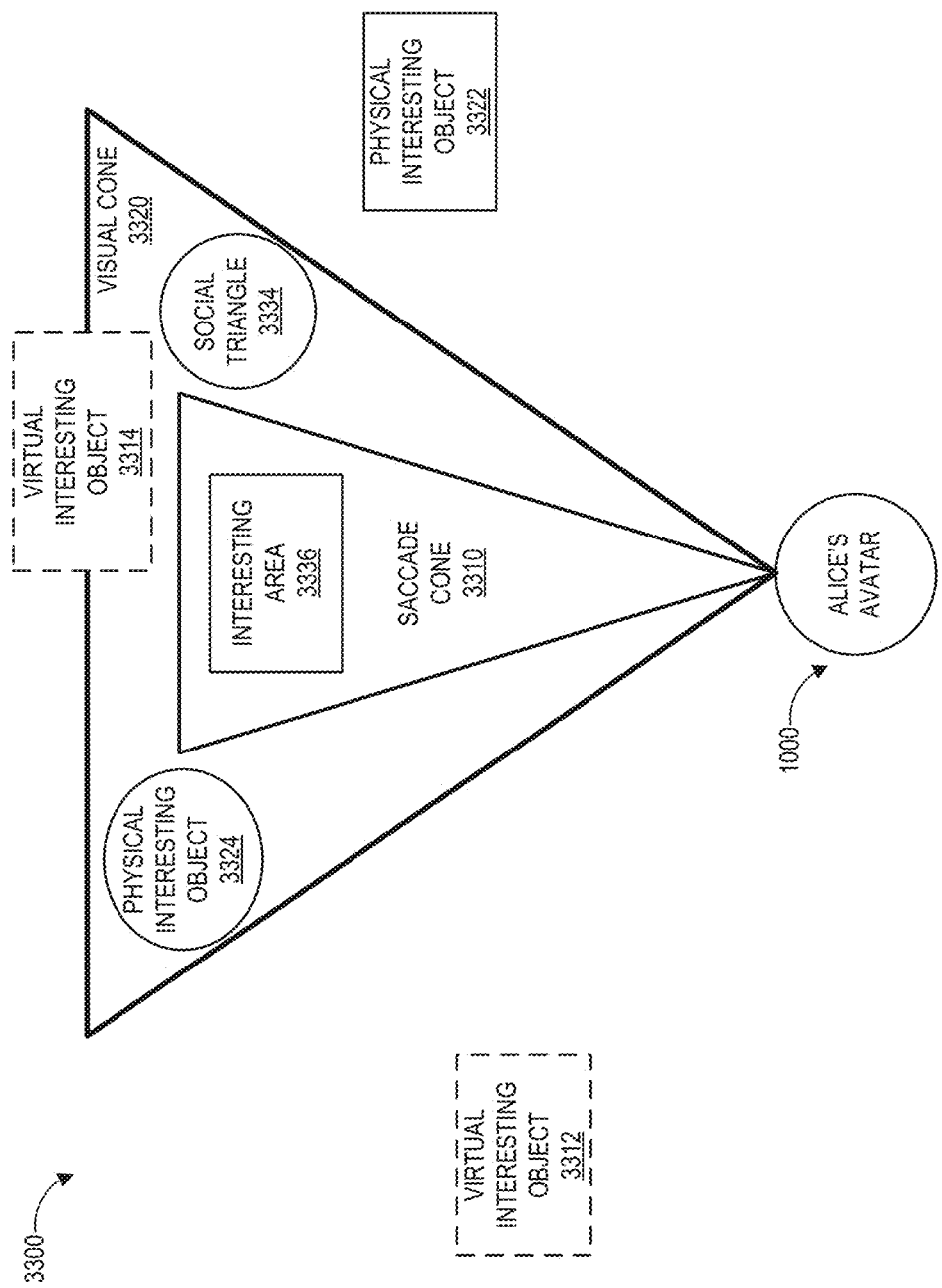
FIG. 18 illustrates an example of identifying a target interesting impulse.

FIG. 18 illustrates an example of identifying a target interesting impulse. The environment 3300 in FIG. 18 may be a mixed reality environment in which Alice's Avatar 1000 is rendered. This mixed reality environment can be rendered by Bob's wearable device 904. The environment 3300 can include physical interesting objects 3324 and 3322 which may be part of a physical object in the environment. For example, the physical interesting objects 3324 and 3322 may be associated with gaze boxes. The environment 3300 can also include virtual interesting objects 3312 and 3314. The virtual interesting objects 3312 and 3314 may be virtual objects which may be shared by Alice's avatar 1000 and Bob in the mixed reality environment 3300. The environment 3300 can also include a social triangle 3334 which may be the social triangle of Bob (who may be a viewer of Alice's avatar 1000). The environment 3300 can also include an interesting area 3336. The physical interesting objects 3324, 3322, the virtual interesting objects 3312, 3314, the social triangle 3334, and the interesting area 3336 (e.g., the location, direction, or boundary of the interesting area) can be part of the virtual avatar's 1000 knowledge base.

In this example, Bob's wearable device 904 can render Alice's avatar to look at the interesting area 3336 by default (as indicated by the saccade cone 3310 indicating a region of eye movements of the avatar 1000). The interesting objects in the environment 3300, however, can be analyzed against a visual cone 3320 which may be part of a cone cast performed for the avatar 1000. In some situations, the saccade cone or the visual cone can also be referred to as the saccade frustum or the visual frustum, respectively.

When determining a target interesting impulse, Bob's wearable device 904 can perform the cone casting based on the virtual avatar's 1000 head pose and eye gaze. For example, the parameters of the cone can be generated based on the avatar's 1000 current eye direction, horizontal angle, or vertical angle of the virtual avatar's 1000 head, head speed, or eye speed. For example, during the cone casting, a virtual cone may be cast from the virtual avatar 1000 into the mixed reality environment (as shown by the visual cone 3320). As the virtual avatar moves its head or eye gaze direction, the direction or movement (e.g., the movement speed) may be adjusted according to the avatar's head or eye movements and direction. In certain implementations, the horizontal angle or vertical angle of the cone are modulated by the virtual avatar's personality and disposition, while the head speed and current eye direction can be determined from the animation of the character. For example, if the avatar 1000 is in a thinking mode, the avatar 1000 may be looking down at a floor of the environment 3300. As another example, if the avatar has an active personality, the virtual avatar may move its head around frequently.

In the example shown in FIG. 18, the visual cone 3320 can capture the physical interesting object 3324, the interesting area 3336, the social triangle 3334, and the virtual interesting object 3314. The wearable system can calculate the interestingness value (e.g., described with reference to FIGS. 30A and 30B) associated with these interesting objects and interesting area to determine a target interesting impulse. For example, the wearable system can select an interesting impulse as a target interesting impulse when that interesting impulse has the highest interestingness value.

In certain implementations, the wearable system maintains a list of interesting impulses for objects and areas within the avatar's field of view (which may be determined and represented by the visual cone 3320). If an interesting impulse is not in the avatar's field of view, the interesting impulse may be culled from the list. For example, when the virtual avatar looks to its right, the physical interesting object 3324 may become outside of the visual cone 3320 while the physical interesting object 3322 may move inside of the visual cone 3320. As a result, information of the physical interesting object 3324 is removed from the list of interesting impulses while information associated with the physical interesting object 3322 (which had been outside the avatar's field of view) may be added to the list of interesting impulses. The physical interesting object 3324 may remain in the avatar's knowledge base even though the physical interesting object 3324 is no longer in the virtual avatar 1000's field of view. Additionally or alternatively, as an object passes outside the avatar's field of view, the interestingness value associated with the object may be decreased to reflect the decreased likelihood that the avatar will interact with the object. Conversely, as an object passes into the avatar's field of view, the interestingness value associated with the object may be increased to reflect the increased likelihood that the avatar will interact with the object.

The list of interesting impulses may be sorted based on an interestingness value of the objects (real or virtual) in the environment 3300 or in the visual cone 3320. The interestingness value can be calculated based on an inherent interestingness of an object minus an interestingness decay. The inherent interestingness of the object may be based on contextual factors, such as, e.g., the environment information, the interaction or triggering event associated with an interesting impulse, the object's characteristics (e.g., a moving object may have a higher interestingness value than a static object), the avatar's (or its human counterpart's) personality, the characteristics or interactions of the viewer, etc. For example, an interesting object may have a boost in its interestingness value, if the avatar 1000 or a viewer is interacting with the interesting object. As another example, if the viewer is speaking, the social triangle 3334 associated with the viewer may have an increased interestingness value. In certain implementations, rather than increasing or decreasing the inherent interestingness, one or more of these contextual factors can also be used to adjust the interestingness decay as described herein.

The interestingness decay can be associated with a rate of decay or growth associated with the interestingness value. The interestingness decay can be based on the time or triggering events. For example, flipping a page of a virtual book can cause a decrease in the interestingness decay (which amounts to an increase in the interestingness value) or slow down the interestingness decay associated with the virtual book. As another example, a sound of explosion in the environment would cause a sudden increase (in addition to the inherent interestingness) to the interestingness value associated with the area having the explosion.

Examples of Avatar Animation Based on a Target Interesting Impulse

Once an interesting impulse is selected as the target interesting impulse, the characteristics of the interesting impulse (e.g., the type of the interesting impulse, the type of reactions associated with the interesting impulse, etc.) can determine an avatar's interactions from overt behaviors such as potential animations and dialog lines to more subtle behaviors such as emotional response, eye attention, and saccade motion. For example, when the target interesting impulse is a sound, the viewer's wearable system can present a dialog line near the avatar stating "what happened?" and/or animate the avatar to look toward the direction of the sound. As another example, if the target interesting impulse is a social triangle of another's face, the wearable system can direct the avatar's attention to the social triangle by rendering the avatar's eye movements as saccadic motions within the social triangle.

The saccadic motion can be regulated through a saccade rate which can control how often an avatar's eye gaze is switched from one saccade point to another. To determine when and where an avatar's saccadic eye movement is switched, a sample saccade point can be selected from a randomized window of saccade timing, and once that time has expired, a new saccade point can be chosen. The saccade rate can be modulated by characteristics of the virtual avatar, such as, e.g., the disposition and emotion of the virtual avatar. For example, being excited or angry can increase the saccade rate, while being bored or lethargic can decrease the saccade rate. The saccade rate for an avatar can be representative of the saccade rate for humans. For example, a saccade can last from about 20 ms to about 200 ms, can have angular speeds from about 10 degrees per second to several hundred degrees per second, and so forth.

Figure 19:
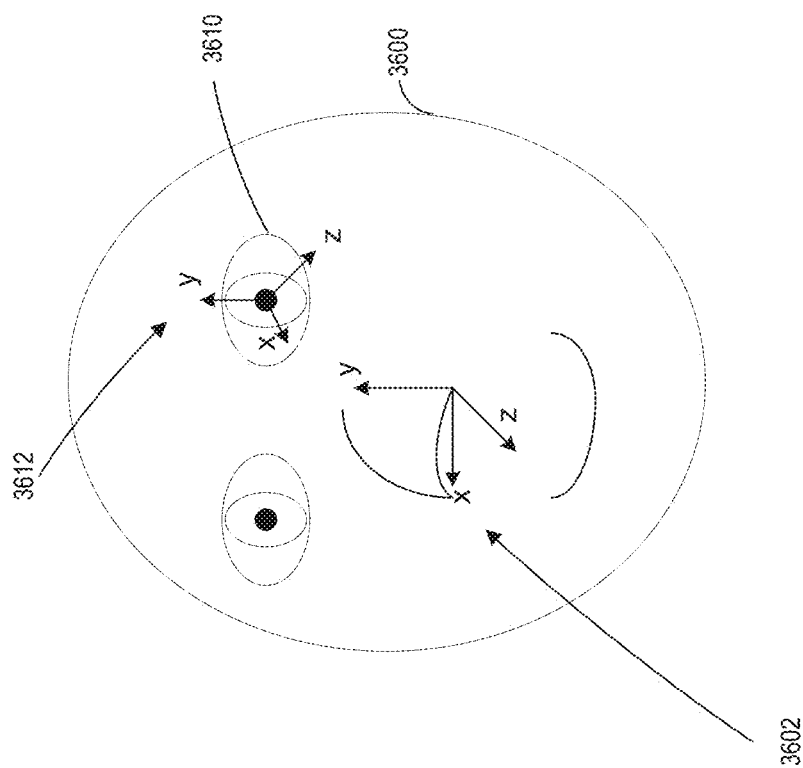
FIG. 19 illustrates an example of eye pose and face transform for animating an avatar based on saccade points.

FIG. 19 illustrates an example of eye pose and face transform for animating an avatar based on saccade points. FIG. 19 shows an eye 3610 and a face 3600. The eye 3610 can be associated with an eye coordinate 3612 and the face 3600 can be associated with a face coordinate 3602.

The wearable system can record a resultant eye pose (e.g., as determined based on the selected saccade point) with respect to the face in a proprioception system. The proprioception system can maintain any kind of knowledge of the avatar's body, such as, e.g., knowing when the avatar's arm is raised, without needing for a user to look at the avatar. The proprioception system can also hold the formulas for rotations with respect to different body parts, such as e.g., a relative rotation between the head and torso or between the head and eyes, which may be part of the discomfort curves described with reference to FIGS. 38A-39. The proprioception system may reference an avatar's local frame for maintaining the relative positions of the avatar's body parts. The proprioception system can be implemented as a component of the avatar processing and rendering system 690, e.g., as part of the anatomy adjustment system 698.

With reference back to FIG. 19, the resultant eye pose with respect to the face can be calculated as an eye to face delta. The eye to face delta can be broken down into two angles: a horizontal angle and a vertical angle, where the horizontal angle can be an angle with respect to the x-axis and z-axis shown in the coordinates 3612 and 3602, and the vertical angle can be an angle with respect to the x-axis and y-axis shown in the coordinates 3612 and 3602. The horizontal angle in the face coordinate 3602 can be used to drive an animation of the avatar's head turning from left to right (or right to left), while the vertical angle in the face coordinate 3602 can used to drive an animation of the head pitching from looking down to looking up (or from looking up to looking down). The horizontal and vertical angles in the face coordinate 3602 can be used to drive an animation of the eye 3610 from looking left or right or rolling up or down.

In some embodiments, the animation of eye pose and head pose can be determined based at least partly on a discomfort curve which can reduce or minimize a value representative of the biological discomfort (as if the avatar were human) due to the relative positions between head and eye. For example, the avatar may turn the head slightly if the position of an eye is too close to the edge of the eye socket.

Example User Gaze Evaluation & Avatar Customization

In some embodiments, avatar characteristics may be determined based on a context associated with the avatar to optimize accuracy with which a user can judge the direction of the avatar's gaze. As noted above, context (or context parameters) may include any characteristic of or related to a virtual reality environment, such as a type of device (e.g., a virtual reality headset, augmented reality headset, mobile computing device, smart phone, etc.), characteristics of the user device (e.g., graphics card specifications, screen size, etc.), environment of the avatar (e.g., lighting conditions in an area where the avatar is currently positioned or will be positioned), and/or accuracy of an eye tracking system, for example. These context parameters can have an effect on how well a user can judge the avatar's gaze direction, which may be important for nonverbal communication.

As discussed further below, example processes for evaluating gaze detection accuracy under various combinations of context parameters and/or avatar characteristics may initially be performed, and then the results of this testing may be used to determine avatar characteristics for a particular context. Avatar characteristics may include, for example, properties of the avatar, such as photorealism/fidelity or shading of the avatar's face and/or eye, ratio of visible iris to sclera, eye movements (e.g., saccade type). Thus, the gaze evaluation process can serve to inform the selection and/or design of optimal avatar characteristics of an avatar for a particular context. In some embodiments, avatar characteristics include and/or are associated with context parameters. For example, a context parameter indicating lighting within an area of a mixed reality environment may be associated with one or more shading, texture, color, and/or similar avatar characteristics for an avatar rendered in that area of the mixed reality environment.

Figure 21A:
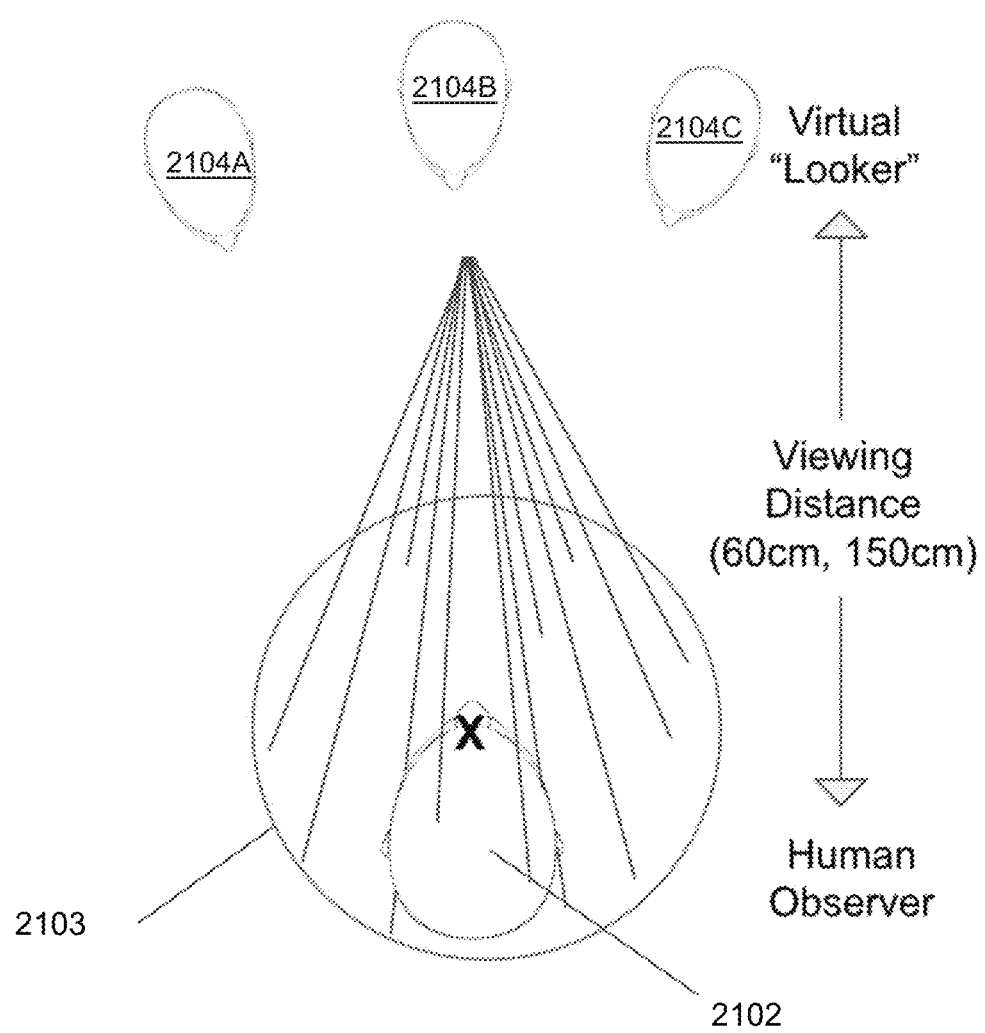
FIGS. 21A and 21B illustrate examples of gaze evaluation testing environments.
Figure 21B:
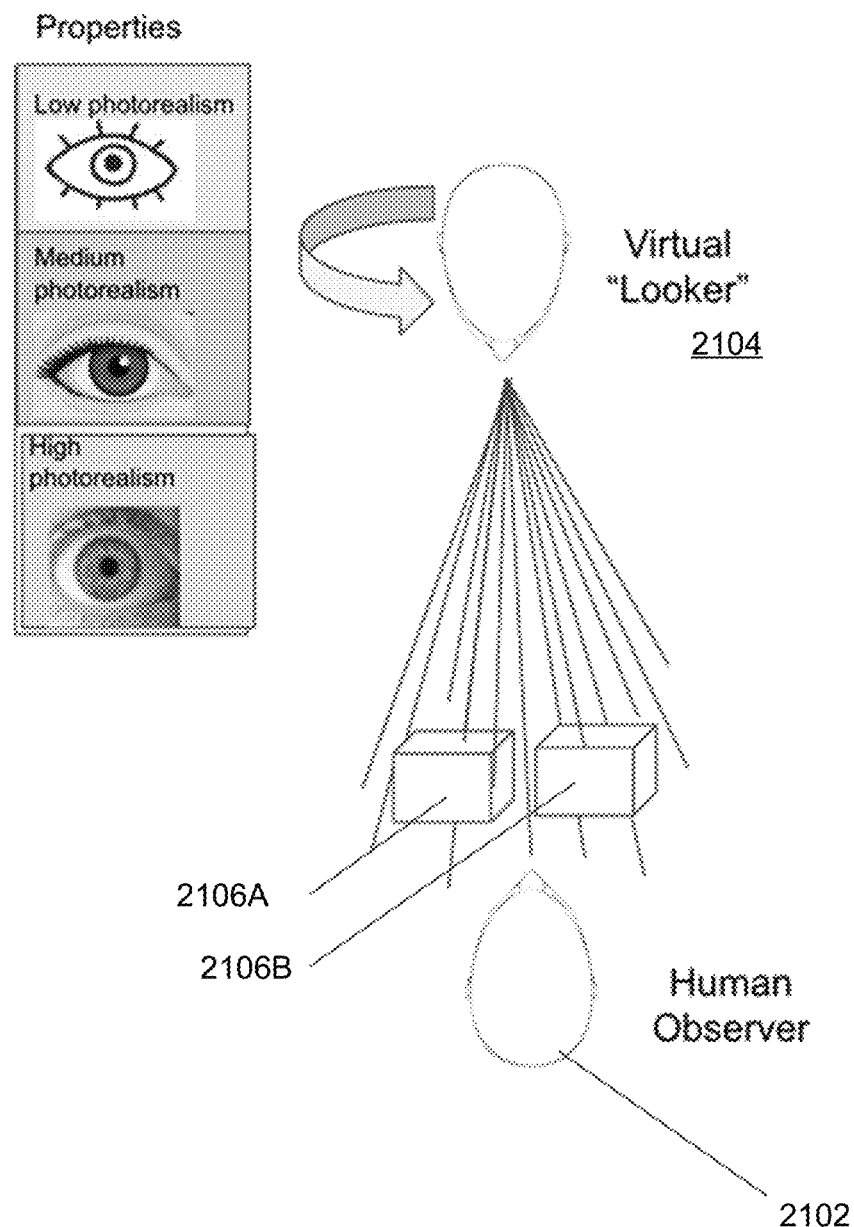

The gaze evaluation system may include selection of optimal avatar characteristics for accurate perception of direct gaze, which refers to when the avatar is looking directly at the human observer (see, e.g., FIG. 21A), as well as referential gaze, which refers to when the avatar draws the user's attention to an object of interest by gazing at it (see, e.g., FIG. 21B). Identification of avatar characteristics that give rise to the most accurate (and least accurate) discrimination of the avatar's gaze by the user, in a particular context (e.g., context can be environment lighting conditions, visual rendering/processing constraints of the headset, eye-tracking system on the headset, and/or other context parameters) may then be automatically selected by the user system based on contextual parameters.

Figure 20:
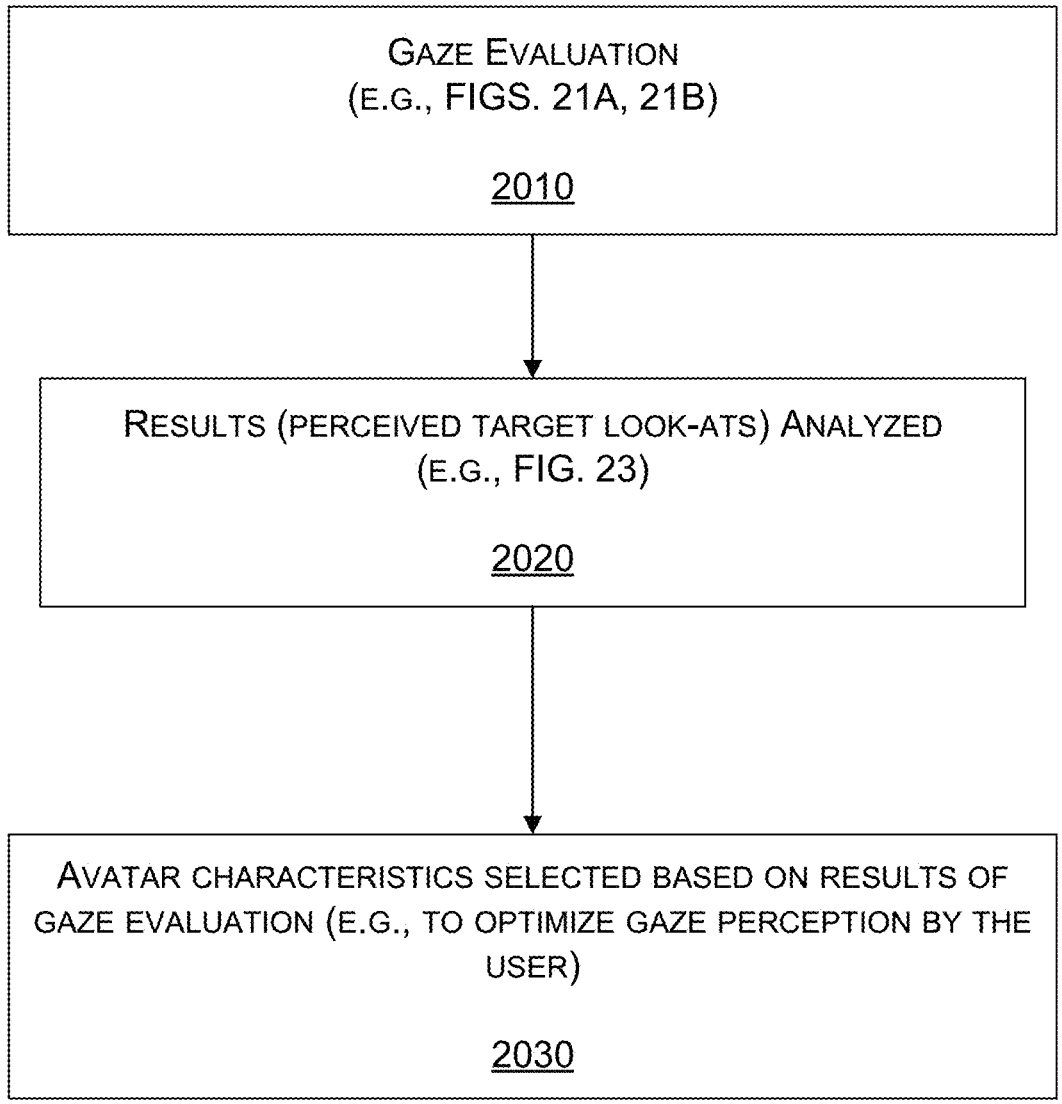
FIG. 20 is a flowchart illustrating an example overview of a gaze evaluation and implementation system.

FIG. 20 is a flowchart illustrating an example overview of a gaze evaluation and implementation system. The process may be performed by a wearable headset and/or a local or remote computing system. Beginning with block 2010, one or more gaze evaluation processes are performed to determine relationships between various combinations of context parameters and users' abilities to accurately detect gaze direction of an avatar within those environments. For example, FIGS. 21A and 21B illustrate examples of gaze evaluation testing environments.

Figure 22:
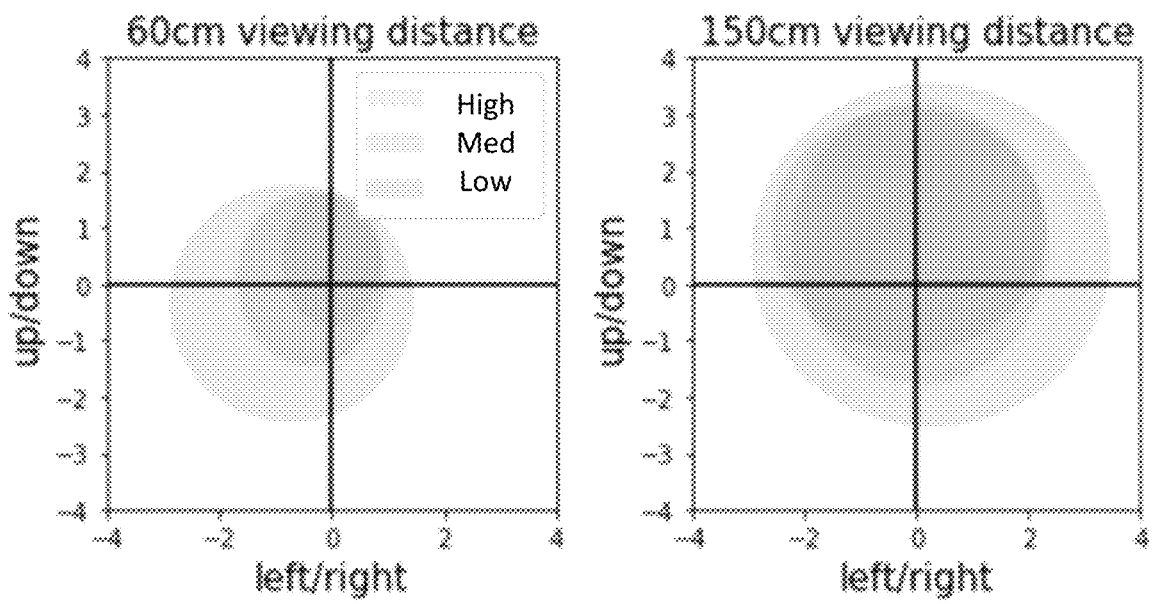
FIG. 22 illustrates results from the example testing discussed with reference to FIGS. 20-21.
Figure 23:
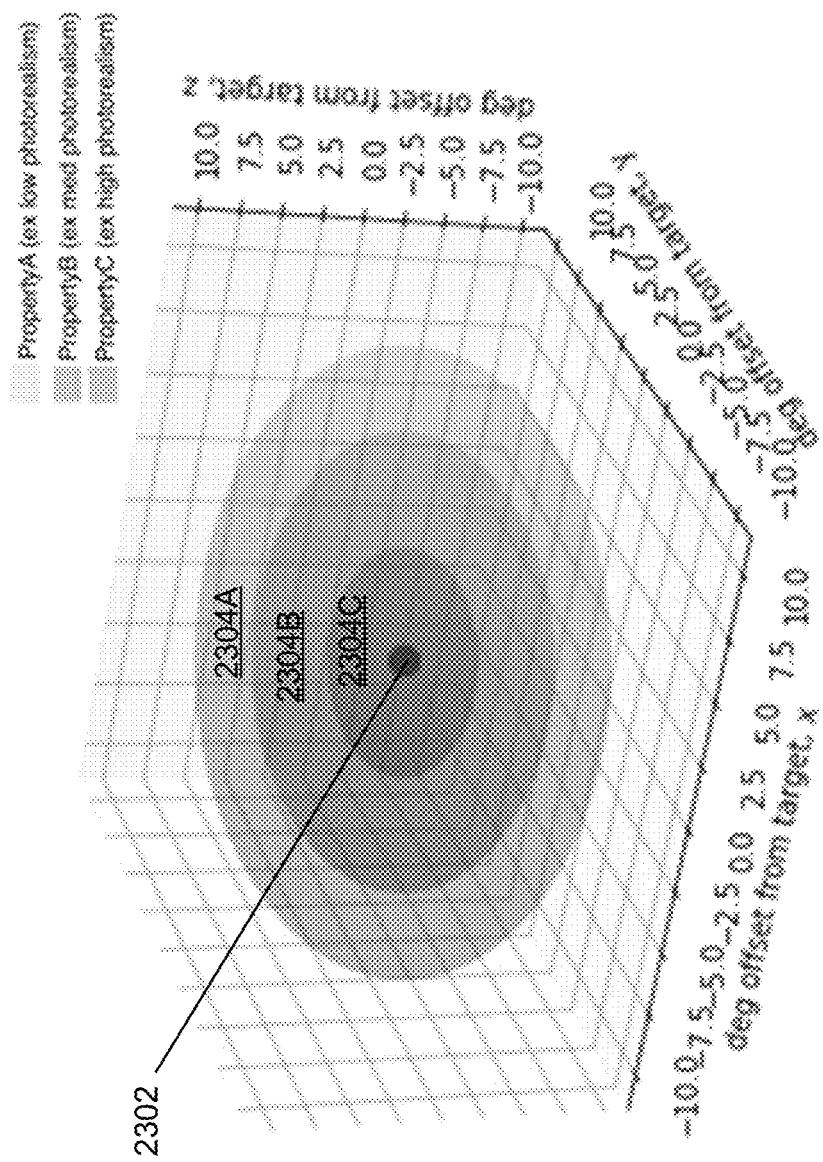
FIG. 23 is a graph illustrating example results compared across avatar characteristics and context parameters across multiple evaluation sessions.

Next, at block 2020, results of the gaze evaluation testing (e.g., block 2010) are evaluated, such as across tests for particular context parameters performed with multiple users. The results of the analysis may indicate how particular combinations of context parameters impact gaze detection accuracy of certain cohorts of users (e.g., users with a particular virtual reality device or device processing capabilities). FIGS. 22 and 23 illustrate test results from an example gaze evaluation process.

At block 2030, avatars that are presented in virtual environments may be custom selected based on context parameters associated with the virtual environment.

Example Gaze Evaluation

In general, gaze evaluation may be performed by having a human observer view an avatar through a wearable headset (and/or other display device), as the avatar saccades or changes fixation between randomly distributed invisible look-at points around the target (in x, y, z direction). The user may then be asked for their perception of whether the avatar was gazing at a particular target, such as the user himself or another object of interest. Thus, the human observer makes a judgement about the avatar's gaze that is associated with the context of the environment.

In the example test environment of FIG. 21A, the process evaluates avatar gaze across three different avatars 2104 of varying photorealism. In this example, the user 2102 makes a judgement of direct gaze, that is, if they feel that the avatar 2104 is looking directly at them. The range of gaze identified as a look-at may then be aggregated across trials and users. In each session, properties of the avatar that may have an impact on these gaze judgements, e.g., avatar characteristics such as photorealism/fidelity, shading of the avatar face and/or eye, ratio of visible iris to sclera, eye movements (e.g., saccade type), are adjusted. Thus, these evaluation processes may provide gaze accuracy data that allows selection of optimal avatar characteristics (e.g., high photorealism) for a particular context (e.g., high lighting condition).

In the particular example of FIG. 21A, photorealism (or fidelity) of an avatar is alternated. In this example, three avatars are illustrated: a high photorealism avatar 2104C, a medium photorealism avatar 2104B, and a low photorealism avatar 2104A. The avatars may be shown in a randomized order looking at randomly distributed invisible look-at targets around the user 2102. A sphere 2103 containing the invisible targets is centered around the user's headpose, demarcated by X. In this example, context parameters are also alternated. For example, viewing distance is varied between 60 cm-150 cm (or any other smaller or larger distance range). In other embodiments, other avatar characteristics and/or context parameters may be adjusted as part of a feedback obtaining process wherein users provide information regarding gaze direction of the avatar for various combinations of avatar characteristics and/or context parameters.

In one example test environment, a plurality of participants (e.g., tens, hundreds, thousands, or more) with normal vision wearing a particular wearable headset (e.g., a particular model and brand of AR/VR/MR headset) view an avatar in a custom testing application. Each participant may experience a set of conditions (e.g., six combinations of avatar characteristics and context), such as multiple characters (e.g., 3 characters) of varying photorealism (e.g., high photorealism avatar 2104C, medium photorealism avatar 2104B, and low photorealism avatar 2104A) at each of multiple viewing distances (e.g., two, three, four, or more), such as 60 cm and 150 cm. In this example test environment, the avatar heads are approximately the size and shape of an adult human head shown at the participant's height. On-device hardware and algorithms may be used to predict the participant's location (e.g., denoted by tracking the point between their eyes). The testing application is configured to cause the avatar to look at randomly selected invisible target points on and around the participant, in all directions (X,Y, Z). For example, the random distribution of look-at targets may be selected from a distribution with target standard deviation in each direction of about 5 cm with a min/max of about −70/70. The avatar's gaze may be driven by a realistic gaze system with a model of saccadic motion. For example, the avatars may saccade or change fixation between 15 invisible targets, holding each look-at for a duration of 2-3 seconds, although other numbers of targets and/or look-at durations may be used.

In some implementations of the test environments, the participants hold a remote control and are instructed to press the control trigger whenever they felt that the avatar is looking directly in their eyes. In other embodiments, other input devices may be used to receive input for the user regarding gaze perceptions of the user. For example, speech input may be used in some embodiments, e.g., the use speaks "now" or some other word(s) when the user perceives an avatar looking directly in their eyes. The accuracy of perception can then be quantified by the degree with which the perceived look-ats (e.g., where users pressed the trigger) clustered around the user's headpose (the point between their eyes). Users may also rate their confidence in the avatar's gaze and/or perception of other social presence cues. In some implementations, the results are analyzed to develop a "gaze cone" that describes a range within which users perceive an avatar to be looking directly at them.

FIG. 22 illustrates results from example gaze discrimination testing. These graphs show offsets (e.g., in cm) from the headpose (0,0) of users of all look-ats perceived as direct gaze from the virtual characters, including a high photorealism avatar, a medium photorealism avatar, and low photorealism avatar. Results from each of these avatars is shown via a different color of ellipse. The ellipse centers represent the mean offset from the participant's headpose across subjects (e.g., gaze cone center). The width and height of the ellipses represent the mean, across subjects, of all Standard Deviations of all look-at offsets perceived as direct gaze (e.g., gaze cone range) in the left/right and up/down direction. The left and right graphs show results for 60 cm and 150 cm viewing distance conditions. As discussed further below, the region of gaze perceived as direct gaze is generally larger for low photorealism avatars and/or avatars viewed at a greater viewing distance. Additionally, with less visual detail, observers generally assume direct gaze, but are also less confident in their judgements of gaze direction.

As shown in FIG. 22, particularly at the shorter viewing distance (e.g., 60 cm in the left chart) a center of the gaze cone is offset differently for each of the low, medium, and high photorealism avatars. For example, the gaze cone centers are approximately (0,1) for the high photorealism avatar, (−0.5, 0.25) for the medium photorealism avatar, and (−0.8, −0.25) for the low photorealism avatar. These gaze cone centers may be used in determining an appropriate offset of gaze pose for an avatar based on the level of photorealism of the avatar. FIG. 22 further illustrates that a gaze cone width (e.g., a width and/or height of the ellipses) generally increases as the level of photorealism increases at closer distances (e.g., 60 cm viewing distance). At larger viewing distances (e.g., 150*cm* viewing distance), differences in gaze cone widths at different levels of photorealism may not be as extensive. For example, in FIG. 22, the gaze cone widths for the high and medium photorealism avatars are similar. Together, these findings suggest that photorealistic avatars allow for improved gaze perception.

As eye-tracking technology in AR/VR continues to develop for driving avatar gaze, this gaze evaluation testing and results analysis can help determine accuracy requirements for varying avatar photorealism. For example, a tolerance range for judging direct gaze can be taken as the threshold of allowed eye-tracking error for a particular avatar. Thus, avatars can be designed in line with the accuracy of the particular eye-tracking system. Avatar characteristics (e.g., head and body direction) may be adjusted based on results of this or similar gaze perception testing. In some implementations, gaze perception may be measured as a first order behavioral metric for assessing interpersonal communication between humans and avatars, prior to second order metrics that measure outcome. While second order outcome metrics, such as completion time on a joint task, provide a high level assessment of communication success, they may not offer information on the specific aspects of communication in which the system is lacking. The present evaluation paradigm offers a means to assess perception of mutual gaze, referential gaze, or other foundations of non-verbal communication.

In the example test environment of FIG. 21B, the user makes a judgement of referential gaze, that is, which block 2106 (e.g., block 2106A and/or block 2106B) they perceive that the avatar 2104 is looking at. The range of gaze identified as a look-at may then be aggregated across trials and users. In each session, properties of the avatar that may have an impact on these gaze judgements, e.g., avatar characteristics such as photorealism/fidelity, shading of the avatar face and/or eye, ratio of visible iris to sclera, eye movements (e.g., saccade type), are adjusted. Thus, these evaluation processes may provide gaze accuracy data that allows selection of optimal avatar characteristics (e.g., high photorealism) for a particular context (e.g., high lighting condition).

FIG. 23 is a graph illustrating example results (e.g., including user and/or target look-ats indicated by users) compared across avatar characteristics (e.g., low, medium, and high photorealism avatars) and context parameters (e.g., degrees or distance from the target) across multiple evaluation sessions. In this example, each sphere represents the area around the target 2302 that 95% of users perceive to be a direct look at the target (e.g., the target in FIG. 21A is the user and the targets in FIG. 21B are the blocks 2106). Thus, the smaller the sphere, the more accurately the user perceives the avatar's gaze. Each color of sphere represents gaze evaluation testing with a different avatar characteristic, e.g., sphere 2304A is associated with a low photorealism avatar, sphere 2304B is associated with a medium photorealism avatar, and sphere 2304C is associated with a high photorealism avatar. As noted above, other avatar characteristics may be varied and visualized in a similar manner (e.g., shading of the avatar face and/or eye, ratio of visible iris to sclera, eye movements, etc.). As shown, high avatar photorealism (sphere 2304C) results in more accurate judgements of gaze look-ats and thus is considered optimal.

Example Avatar Customization

As noted above, in some embodiments the results of gaze detection testing, such as discussed with reference to FIGS. 21A and 21B, may be used in selection of an optimal avatar (and/or specific avatar characteristics of a selected avatar) based on various context parameters. For example, optimal avatar characteristics may be largely based on the particular hardware on which the avatar is to be rendered. For example, the processing speed, bandwidth, graphics capabilities, eye tracking capabilities, and the like of a particular VR headset may dictate avatar characteristics for one or more avatars to be rendered on the VR headset. Accordingly, a VR headset with higher graphics capabilities, for example, may use a higher photorealism avatar as a default, while a VR headset with lower graphics capabilities may use a lower photorealism avatar as a default. Other avatar characteristics may be adjusted, e.g., when an avatar is initially rendered and/or dynamically as context parameters change, based on any one or more context parameters. In some embodiments, the user may select (e.g., and potentially override default avatar characteristics) based on particular needs of the user. For example, if a user desires accurate gaze discrimination (e.g., they are having a conversation with a family member) and there are no processing/rendering constraints of the user's device, then avatar characteristics that result in accurate gaze discrimination may be selected by the system. As another example, if a user desires privacy and/or there are processing/rendering constraints, avatar characteristics that result in less accurate gaze discrimination may be selected by the system.

In another example implementation, if several avatars are in a virtual environment (e.g., engaging in a group conversation), different avatar characteristics may be selected for each avatar. The avatar characteristics may be adjusted as context parameters (e.g., associated with particular avatars) change. For example, one avatar may have simple cartoonish eyes, while others may have highly photorealistic eyes, depending on how important gaze discrimination is for each avatar. As another example, the system may select avatar characteristics that results in more accurate gaze discrimination for a presenting avatar than for participants/listening avatars. Thus, these other participants may be made less photorealistic, for example, even at the expense of accurate gaze discrimination, which may reduce the processing load on the system.

In some embodiments, an avatar's gaze may be driven by eye-tracking, and accuracy of the eye-tracking may be a context parameter that is used in selecting appropriate avatar characteristics. For example, if eye-tracking accuracy is low, then an avatar with properties that do not engender accurate gaze discrimination may be preferred (e.g., the user may prefer a simple cartoonish avatar with no detail in the eyes that may be more forgiving to errors in eye-tracking-driven gaze). Relationships between accuracy of eye-tracking and avatar characteristics may be tested using an evaluation process such as discussed above to determine the levels of error in gaze discrimination by users for each of multiple combinations of avatar characteristics.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A computing system comprising:
   one or more hardware computer processors;
   one or more non-transitory computer readable storage device storing software instructions executable by the one or more hardware processors to perform operations comprising:
   determining avatar characteristics associated with gaze perception accuracy;
   for each of a plurality of combinations of the determined avatar characteristics:
   rendering an avatar having the combination of determined avatar characteristics on a wearable headset of a user, and
   for each of a plurality of gaze directions of the avatar around a head pose of the user, receiving input from the user indicating whether the avatar is perceived as looking directly at the user; and
   analyzing the received inputs to determine relationships between combinations of avatar characteristics and accuracy of gaze direction perception by the user.

2. The computing system of claim 1, wherein the one or more avatar characteristics includes photorealism, and the combinations of determined avatar characteristics include at least a highly photorealistic avatar and a lower photorealistic avatar.

3. The computing system of claim 1, wherein the one or more avatar characteristics include one or more context parameters.

4. The computing system of claim 3, wherein the context parameters include distance between the avatar and the user.

5. The computing system of claim 3, wherein the context parameters include at least a first viewing distance between the avatar and the user and a second viewing distance between the avatar and the user.

6. The computing system of claim 5, wherein the first viewing distance is about 60 centimeters and the second viewing distance is about 150 centimeters.

7. The computing system of claim 3, wherein the context parameters include one or more of wearable headset characteristics, environmental characteristics, or accuracy of an eye tracking system associated with the avatar.

8. The computing system of claim 7, wherein the wearable headset characteristics include one or more of a type of wearable headset or characteristics of the wearable headset.

9. The computing system of claim 8, wherein the type of wearable headset includes one or more of a virtual reality headset, an augmented reality headset, a mobile computing device, a smart phone, or a desktop computing device.

10. The computing system of claim 8, wherein the characteristics of the wearable headset include one or more of graphics card specifications, processor specifications, screen resolution, or screen size.

11. The computing system of claim 7, wherein the environmental characteristics include lighting conditions in an area where the avatar is currently positioned or will be positioned.

12. A computing system comprising:
   one or more hardware computer processors;
   one or more non-transitory computer readable storage device storing software instructions executable by the one or more hardware processors to perform operations comprising:

determining avatar characteristics associated with gaze perception accuracy;

for each of a plurality of combinations of the determined avatar characteristics:

rendering an avatar having the combination of determined avatar characteristics on a wearable headset of a user, and for each of a plurality of gaze directions of the avatar, receiving input from the user indicating one of a plurality of objects the avatar is perceived as looking; and analyzing the received inputs to determine relationships between combinations of avatar characteristics and accuracy of gaze direction perception by the user.

13. A computer-implemented method comprising:

determining avatar characteristics associated with gaze perception accuracy;

for each of a plurality of combinations of the determined avatar characteristics:

rendering an avatar having the combination of determined avatar characteristics on a wearable headset of a user, and for each of a plurality of gaze directions of the avatar around a head pose of the user, receiving input from the user indicating whether the avatar is perceived as looking directly at the user; and analyzing the received inputs to determine relationships between combinations of avatar characteristics and accuracy of gaze direction perception by the user.

14. The method of claim 13, wherein the one or more avatar characteristics includes photorealism, and the combinations of determined avatar characteristics include at least a highly photorealistic avatar and a lower photorealistic avatar.

15. The method of claim 13, wherein the one or more avatar characteristics include one or more context parameters.

16. The method of claim 15, wherein the context parameters include distance between the avatar and the user.

17. The method of claim 15, wherein the context parameters include at least a first viewing distance between the avatar and the user and a second viewing distance between the avatar and the user.

18. The method of claim 17, wherein the first viewing distance is about 60 centimeters and the second viewing distance is about 150 centimeters.

19. The method of claim 15, wherein the context parameters include one or more of wearable headset characteristics, environmental characteristics, or accuracy of an eye tracking system associated with the avatar.

20. The method of claim 19, wherein the wearable headset characteristics include one or more of a type of wearable headset or characteristics of the wearable headset.

* * * * *